United States Patent
Tabibnia

(10) Patent No.: US 9,410,296 B2
(45) Date of Patent: Aug. 9, 2016

(54) APPARATUS AND RELATED METHODS OF PAVING A SUBSURFACE

(71) Applicant: Ramin Tabibnia, Los Angeles, CA (US)

(72) Inventor: Ramin Tabibnia, Los Angeles, CA (US)

(*) Notice: Subject to any disclaimer, the term of this patent is extended or adjusted under 35 U.S.C. 154(b) by 0 days.

(21) Appl. No.: 14/657,977

(22) Filed: Mar. 13, 2015

(65) Prior Publication Data

US 2015/0184398 A1 Jul. 2, 2015

Related U.S. Application Data

(63) Continuation of application No. 14/253,818, filed on Apr. 15, 2014, now Pat. No. 9,284,693, which is a continuation-in-part of application No. 13/564,628, filed on Aug. 1, 2012, now Pat. No. 8,850,753, which is a continuation-in-part of application No. 12/732,755, filed on Mar. 26, 2010, now Pat. No. 8,453,391.

(51) Int. Cl.
| | |
|---|---|
| *E04C 5/00* | (2006.01) |
| *E04F 15/024* | (2006.01) |
| *E01C 5/00* | (2006.01) |
| *E04C 1/39* | (2006.01) |

(Continued)

(52) U.S. Cl.
CPC ... *E01C 5/00* (2013.01); *E04B 5/48* (2013.01); *E04C 1/392* (2013.01); *E04D 11/007* (2013.01); *E04F 15/0247* (2013.01); *E04F 15/02447* (2013.01); *E04F 15/02452* (2013.01); *E04F 15/02464* (2013.01); *E04F 15/02482* (2013.01); *F24D 3/122* (2013.01); *F24D 3/127* (2013.01); *F24D 3/142* (2013.01)

(58) Field of Classification Search
CPC .............. E04F 15/024; E04F 15/02464; E04F 15/0247; E04F 15/02183; E04F 15/02452; E04F 15/02476; E04F 15/02482; E04F 2015/02127; E04D 11/00; E04D 11/07; E04D 11/005; E04D 11/007; F16L 47/14; F16L 47/16; F16L 23/024
USPC ............ 52/126.5, 126.6, 263, 704, 705, 708, 52/298; 248/188.2, 188.4, 188.8, 677; 108/150; 114/363; 285/388, 414; 138/96 T, 109; 297/451.5
See application file for complete search history.

(56) References Cited

U.S. PATENT DOCUMENTS

| | | | |
|---|---|---|---|
| 223,835 A * | 1/1880 | Boyle | 285/336 |
| 1,265,516 A * | 5/1918 | Beck | 108/166 |

(Continued)

FOREIGN PATENT DOCUMENTS

| | | | | |
|---|---|---|---|---|
| FR | 2559529 A1 * | 8/1985 | | E04D 11/00 |
| FR | 2598779 A1 * | 11/1987 | | E04D 11/00 |
| GB | 2427416 A * | 12/2006 | | |

*Primary Examiner* — Robert Canfield
(74) *Attorney, Agent, or Firm* — Cislo & Thomas, LLP

(57) ABSTRACT

Disclosed may be an intermediate surface for supporting a small paver, wherein the surface can also be used to exchange heat with the pavers. In one embodiment, the apparatus may be a hextray defined by a frame with a hexagonal lattice for supporting pavers. The hextray preferably features a tubing track throughout the lattice to accommodate heat exchange tubing. In operation the hextray may be positioned above a pedestal or directly on a subsurface. In embodiment, the hex tray may be outfitted with insulation and a metal plate so that heat may be exchanged with pedestals via fluid passing through tubing installed throughout the hexagonal lattice. In a preferred embodiment, the hextray features a slot in its corners for receiving a locking disk or locking slider.

22 Claims, 84 Drawing Sheets

(51) Int. Cl.
*F24D 3/12* (2006.01)
*E04B 5/48* (2006.01)
*F24D 3/14* (2006.01)
*E04D 11/00* (2006.01)

(56) References Cited

U.S. PATENT DOCUMENTS

| | | | | |
|---|---|---|---|---|
| 1,534,630 A * | 4/1925 | Avery | | 297/166 |
| 2,141,139 A * | 12/1938 | Howe et al. | | 40/563 |
| 2,247,356 A * | 7/1941 | Browne, Jr. | | 362/378 |
| 3,037,512 A * | 6/1962 | Aruar | | 131/213 |
| 3,040,902 A * | 6/1962 | Dunn | | 211/105.4 |
| 3,065,506 A * | 11/1962 | Tremer | | 52/126.6 |
| 3,195,848 A * | 7/1965 | Miller et al. | | 248/411 |
| 3,222,030 A * | 12/1965 | Thorpe | | 254/100 |
| 3,224,795 A * | 12/1965 | Conley | | 285/114 |
| 3,381,635 A * | 5/1968 | Pforr | | 108/150 |
| 3,388,620 A * | 6/1968 | Rudolph | | 408/112 |
| 3,470,663 A * | 10/1969 | Tate | | 52/126.6 |
| 3,689,017 A * | 9/1972 | Harvey | | 248/354.3 |
| 3,713,259 A * | 1/1973 | Tkach | | 52/111 |
| 4,133,312 A * | 1/1979 | Burd | | 604/8 |
| 4,160,347 A * | 7/1979 | Logsdon | | 52/199 |
| 4,388,502 A * | 6/1983 | Cohn | | 73/649 |
| 4,592,574 A * | 6/1986 | Vollmuth et al. | | 285/31 |
| 4,728,336 A * | 3/1988 | Cooper | | 623/38 |
| 4,745,715 A * | 5/1988 | Hardwicke et al. | | 52/126.6 |
| 4,780,571 A * | 10/1988 | Huang | | 174/484 |
| 5,027,665 A * | 7/1991 | Hayward | | 74/18.1 |
| 5,392,816 A * | 2/1995 | Hagenberg et al. | | 138/89 |
| 5,412,914 A * | 5/1995 | Daw et al. | | 52/126.6 |
| 5,603,187 A * | 2/1997 | Merrin et al. | | 52/58 |
| 5,611,514 A * | 3/1997 | Oliver et al. | | 248/357 |
| 5,762,671 A * | 6/1998 | Farrow et al. | | 55/496 |
| 5,791,096 A * | 8/1998 | Chen | | 52/126.6 |
| 6,206,613 B1 * | 3/2001 | Elkins | | 405/157 |
| 6,332,292 B1 * | 12/2001 | Buzon | | 52/126.6 |
| 6,347,489 B1 * | 2/2002 | Marshall et al. | | 52/169.9 |
| 6,349,512 B1 * | 2/2002 | Berkey et al. | | 52/126.6 |
| 6,360,491 B1 * | 3/2002 | Ullman | | 52/22 |
| 6,363,685 B1 * | 4/2002 | Kugler | | 52/745.05 |
| 6,442,906 B1 * | 9/2002 | Hwang | | 52/126.6 |
| 6,467,843 B1 * | 10/2002 | Rossborough | | 297/344.18 |
| 6,588,717 B2 * | 7/2003 | Carnahan et al. | | 248/188.8 |
| 6,869,058 B2 * | 3/2005 | Tung | | 248/519 |
| 7,287,732 B2 * | 10/2007 | Balistreri | | 248/188.4 |
| 7,610,728 B1 * | 11/2009 | Manocchia | | 52/299 |
| 8,453,391 B2 * | 6/2013 | Tabibnia | | 52/126.6 |
| 8,479,455 B2 * | 7/2013 | Schaefer et al. | | 52/58 |
| 8,850,753 B2 * | 10/2014 | Tabibnia | | 52/126.6 |
| 8,898,999 B1 * | 12/2014 | Kugler et al. | | 52/747.1 |
| D728,185 S * | 4/2015 | Pelc et al. | | D34/31 |
| 9,038,324 B2 * | 5/2015 | Kugler et al. | | 52/126.6 |
| 2002/0026757 A1 * | 3/2002 | Scissom et al. | | 52/220.2 |
| 2002/0121583 A1 * | 9/2002 | Jones et al. | | 248/346.01 |
| 2003/0070372 A1 * | 4/2003 | Favero | | 52/220.1 |
| 2004/0035064 A1 * | 2/2004 | Kugler et al. | | 52/126.6 |
| 2004/0261329 A1 * | 12/2004 | Kugler et al. | | 52/126.6 |
| 2005/0193660 A1 * | 9/2005 | Mead | | 52/263 |
| 2007/0186498 A1 * | 8/2007 | Buzon | | 52/263 |
| 2007/0204539 A1 * | 9/2007 | Owen | | 52/263 |
| 2008/0222973 A1 * | 9/2008 | Lee et al. | | 52/126.1 |
| 2009/0173018 A1 * | 7/2009 | Buzon | | 52/126.6 |
| 2009/0188189 A1 * | 7/2009 | Repasky | | 52/291 |
| 2009/0199494 A1 * | 8/2009 | Lee et al. | | 52/126.6 |
| 2010/0058679 A1 * | 3/2010 | Greaves | | 52/126.6 |
| 2011/0016809 A1 * | 1/2011 | Knight et al. | | 52/263 |
| 2011/0023385 A1 * | 2/2011 | Knight et al. | | 52/126.6 |
| 2011/0138703 A1 * | 6/2011 | Repasky | | 52/126.6 |
| 2011/0185675 A1 * | 8/2011 | Knight et al. | | 52/741.1 |
| 2011/0192941 A1 * | 8/2011 | Lalancette et al. | | 248/70 |
| 2011/0239550 A1 * | 10/2011 | Kugler et al. | | 52/126.6 |
| 2012/0272588 A1 * | 11/2012 | Kugler et al. | | 52/126.6 |
| 2012/0272589 A1 * | 11/2012 | Kugler et al. | | 52/126.6 |
| 2012/0291369 A1 * | 11/2012 | Knight et al. | | 52/126.6 |
| 2014/0123576 A1 * | 5/2014 | Meyer | | 52/126.6 |

* cited by examiner

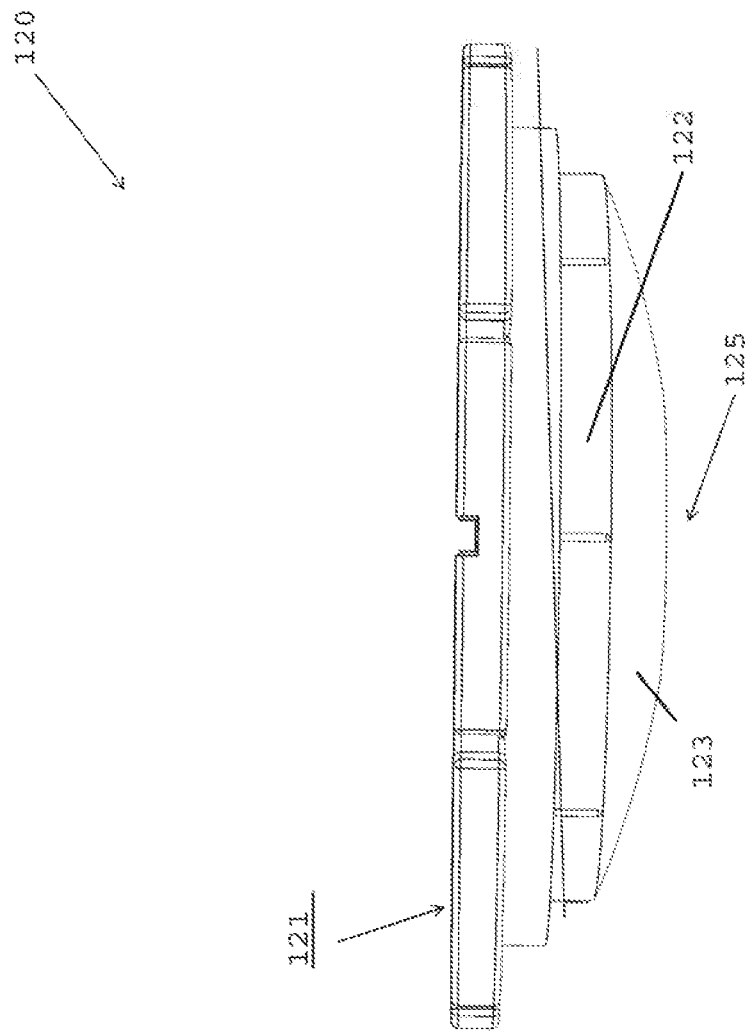

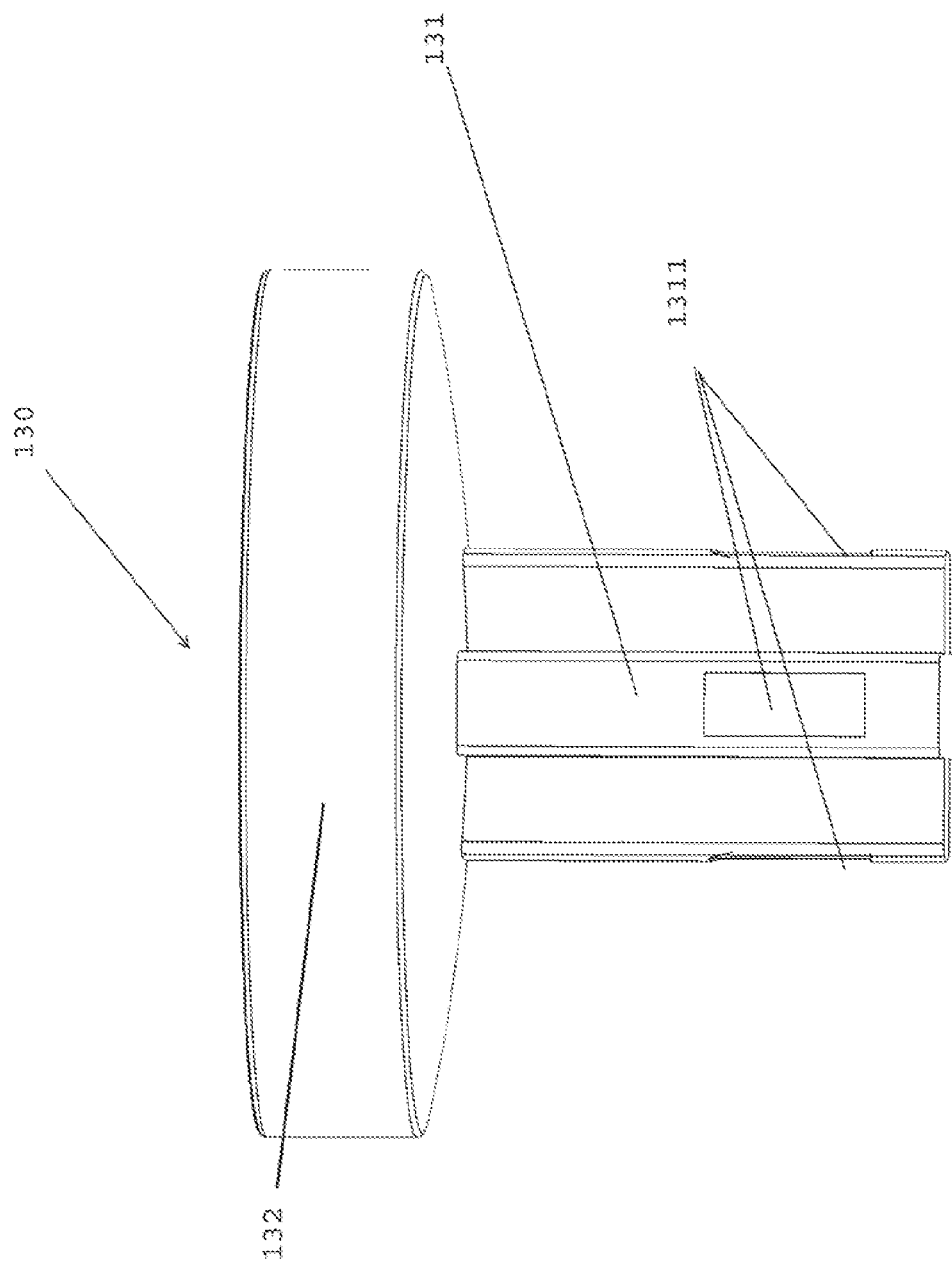

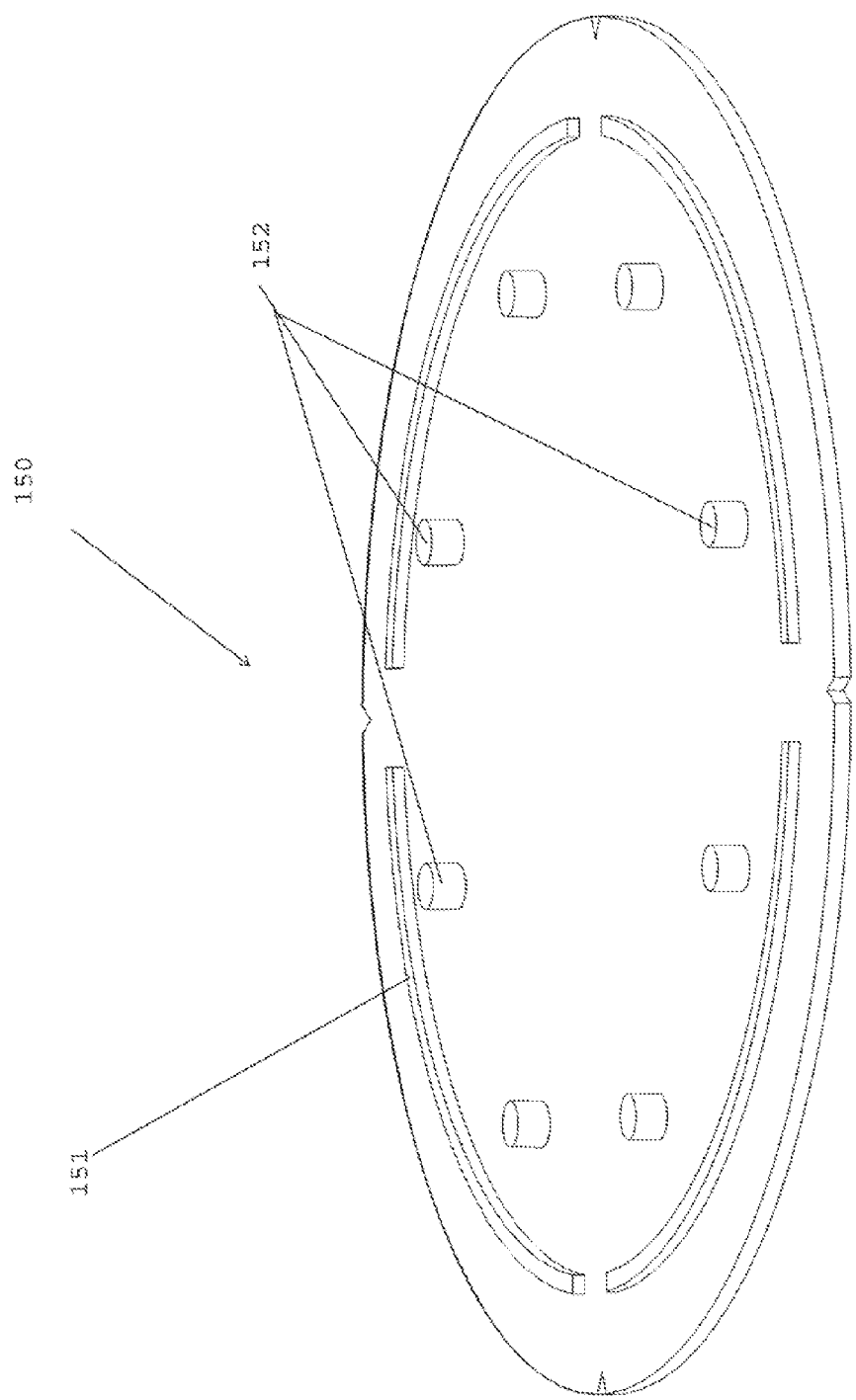

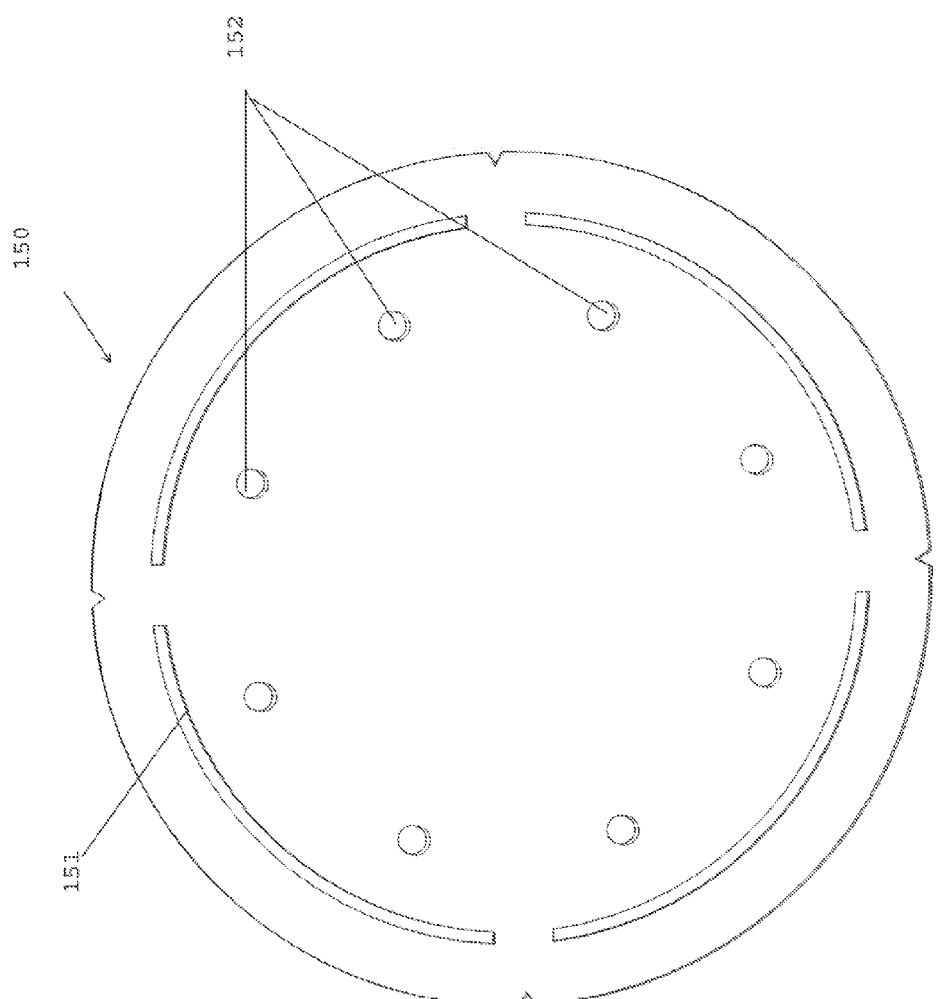

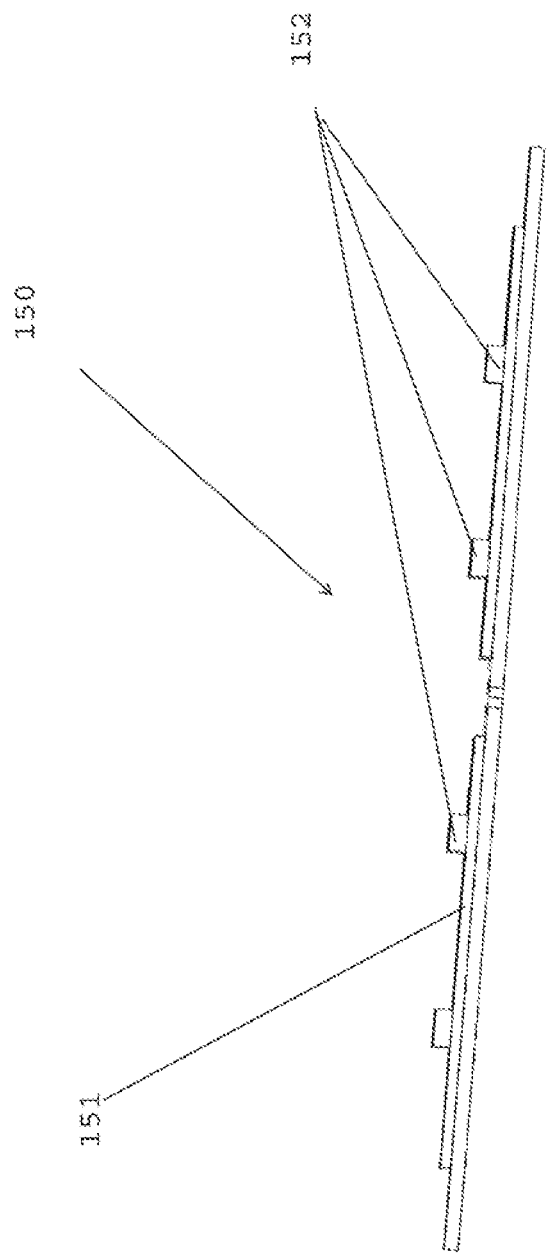

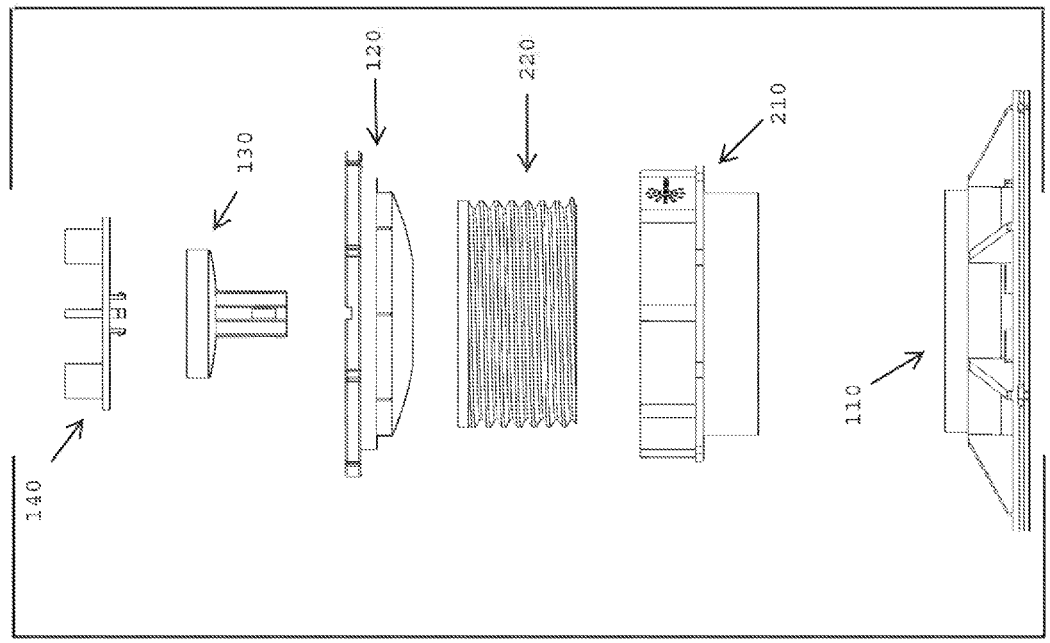
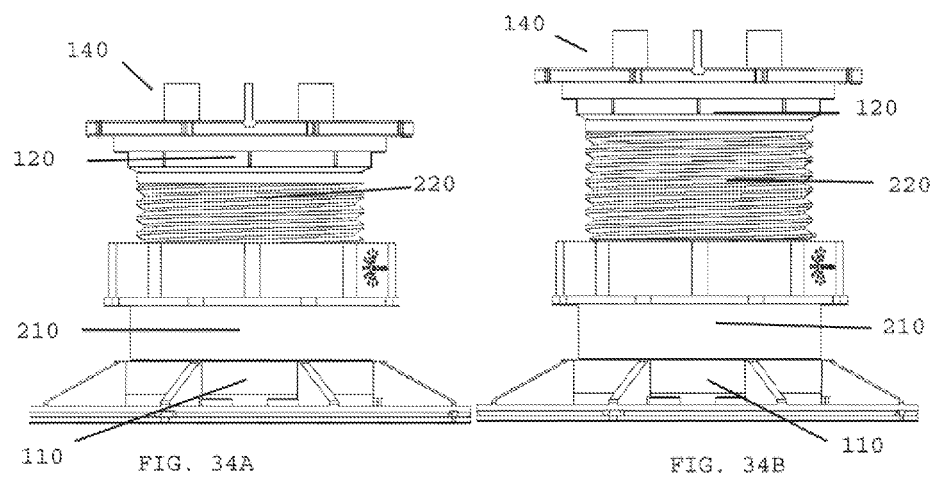
FIG. 34C
FIG. 34A
FIG. 34B

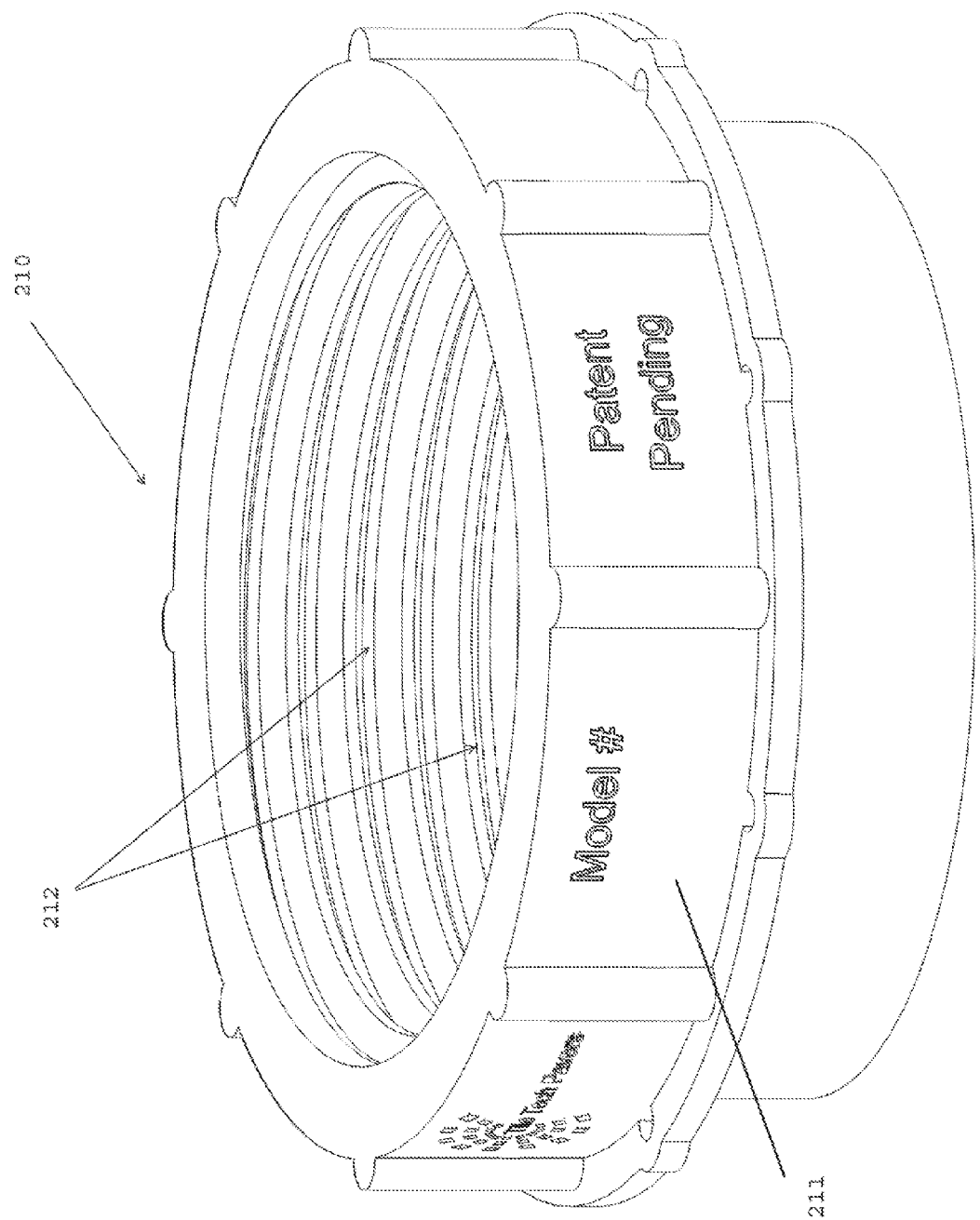

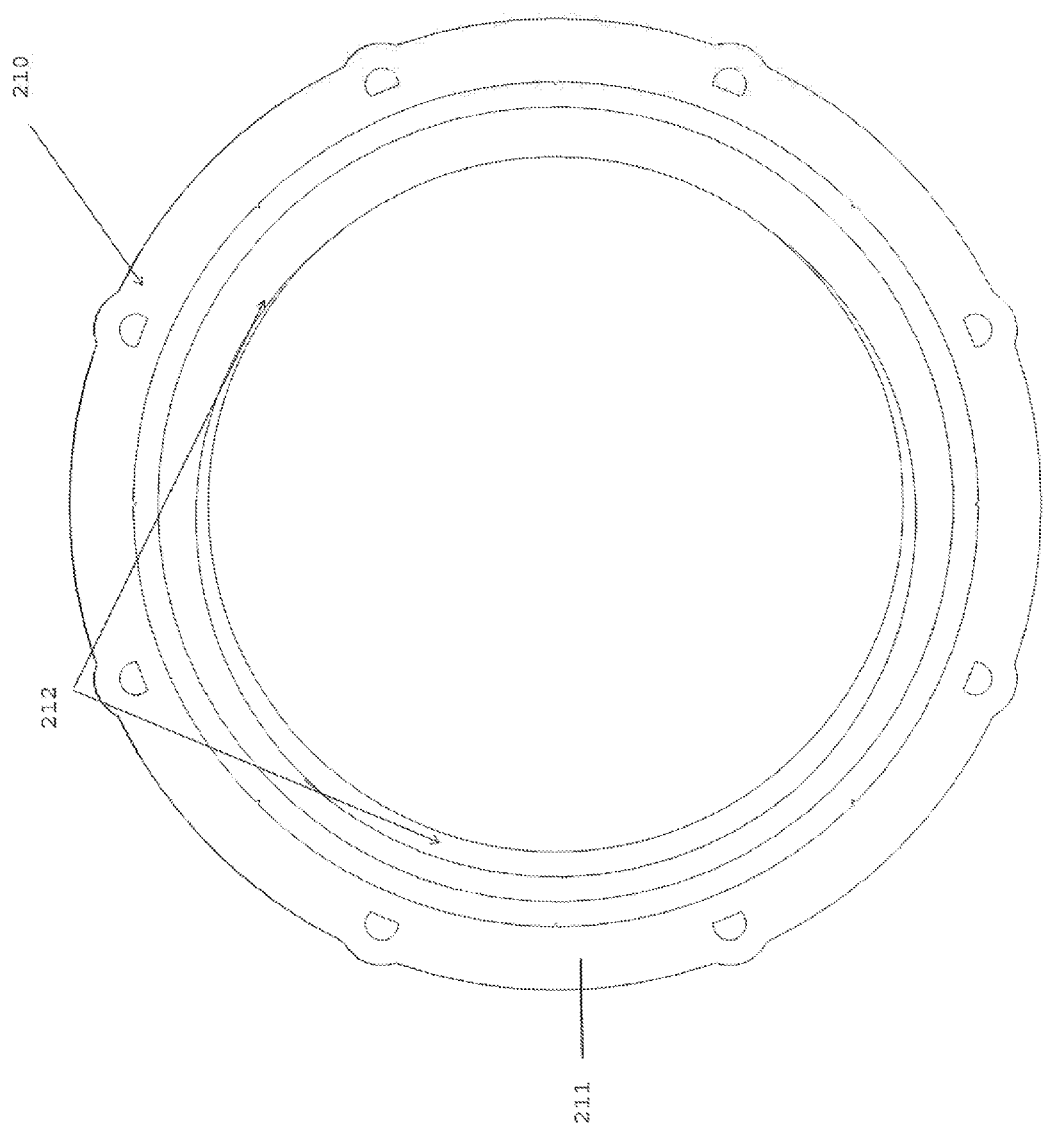

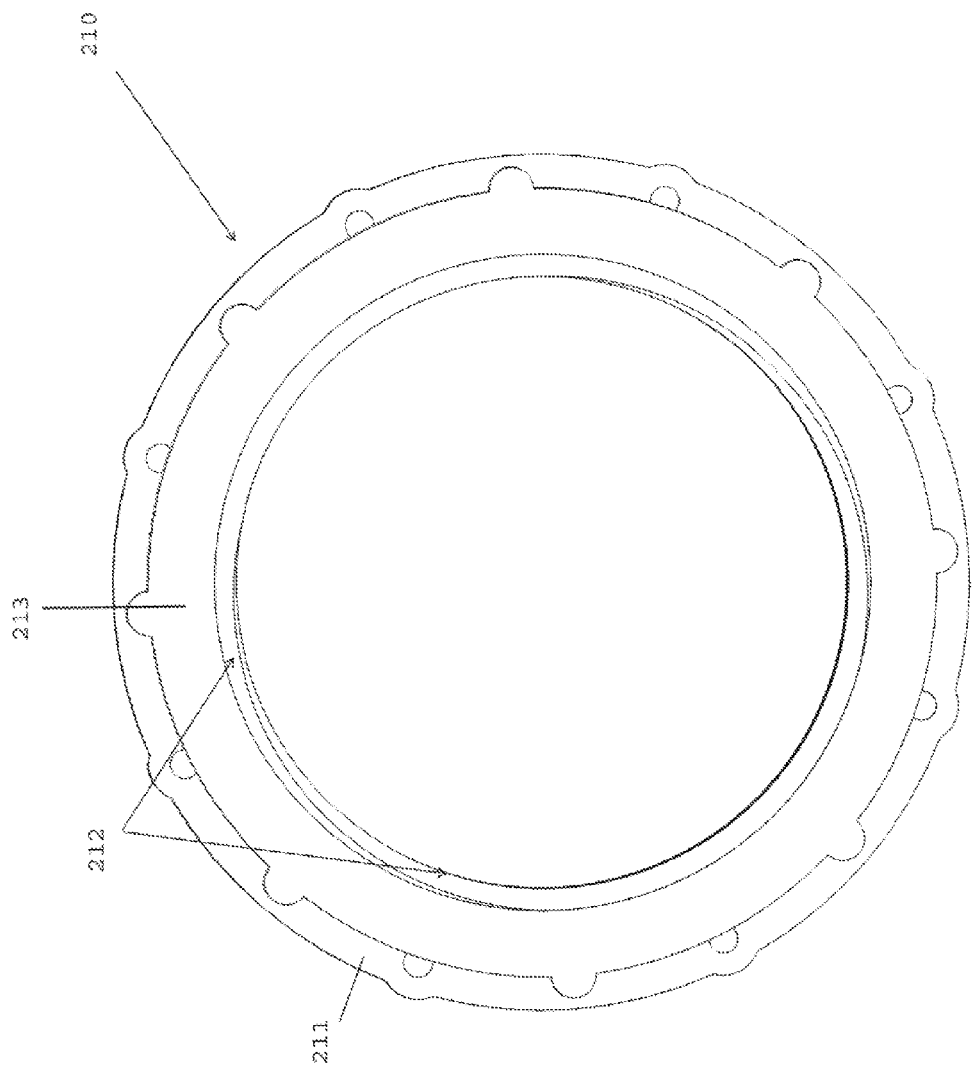

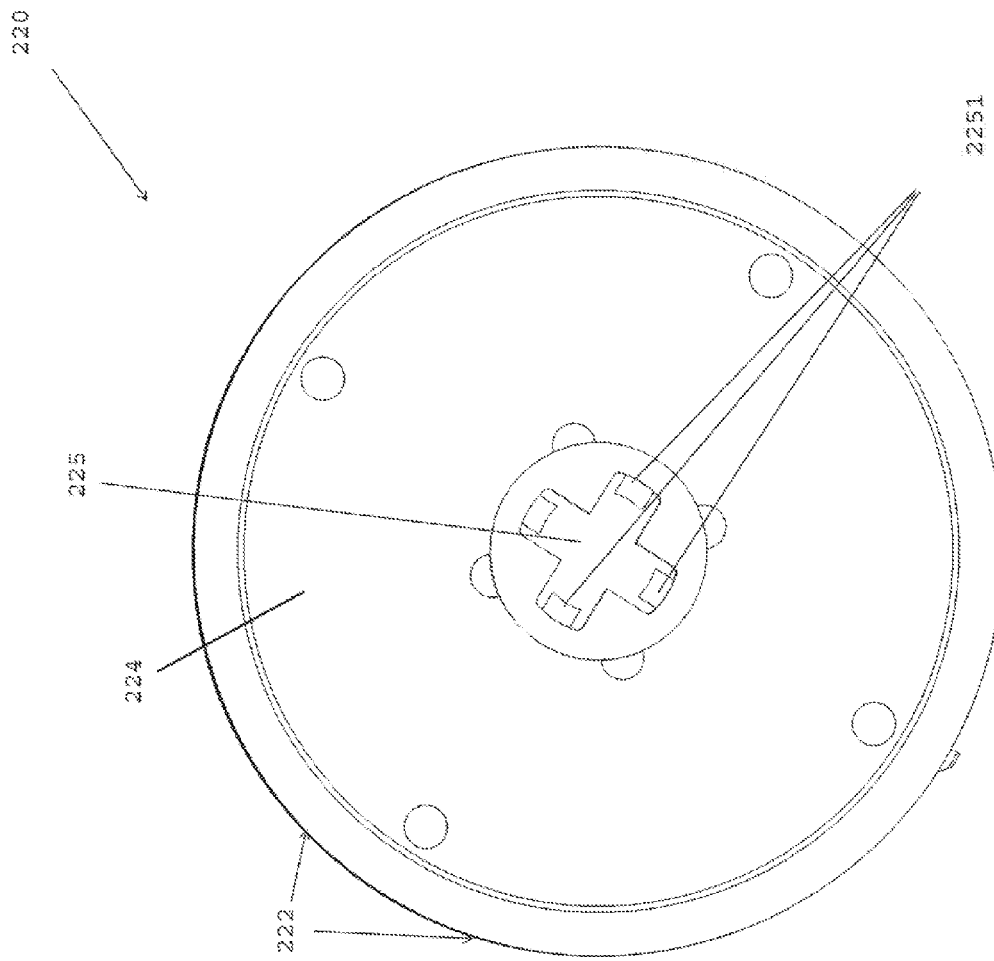

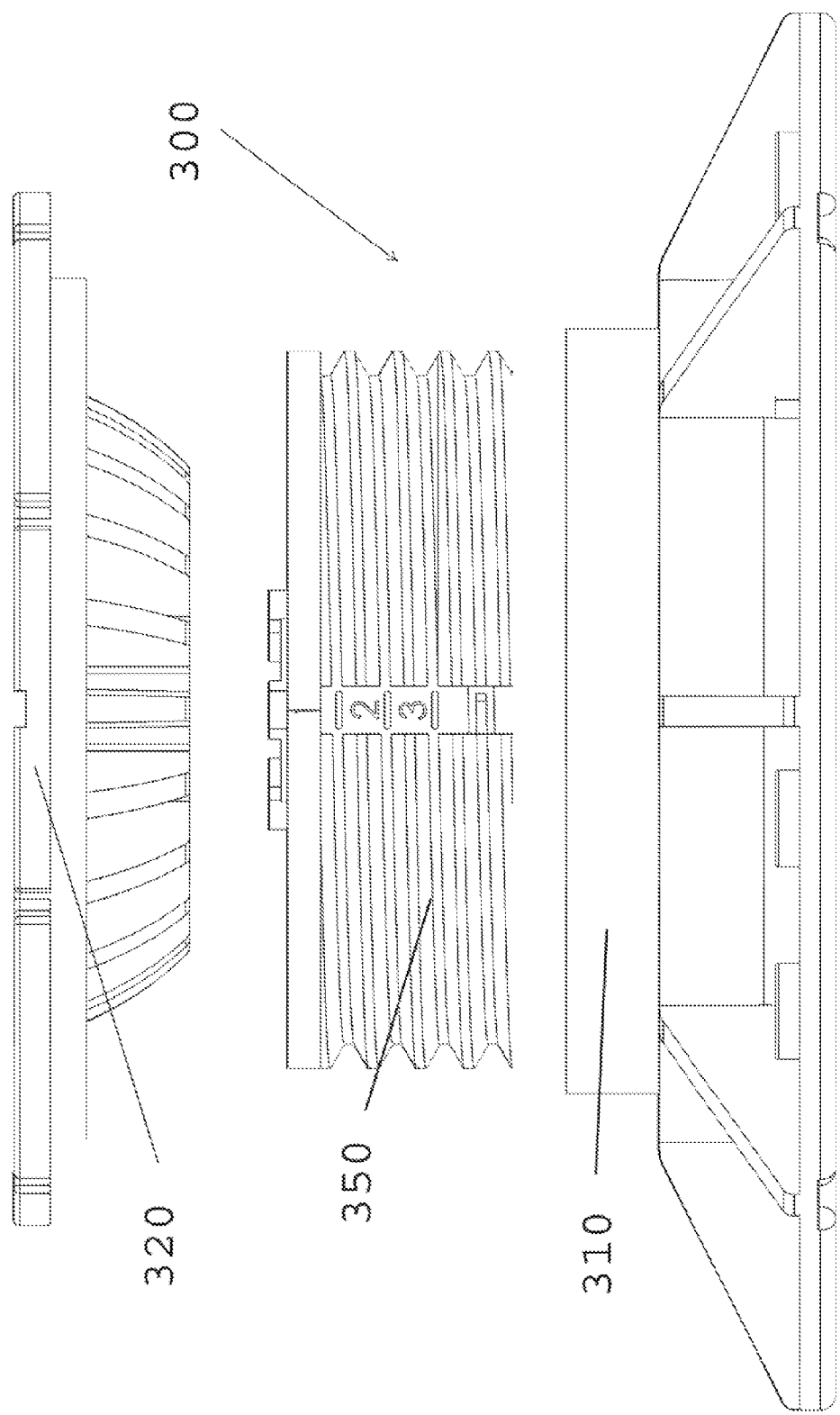

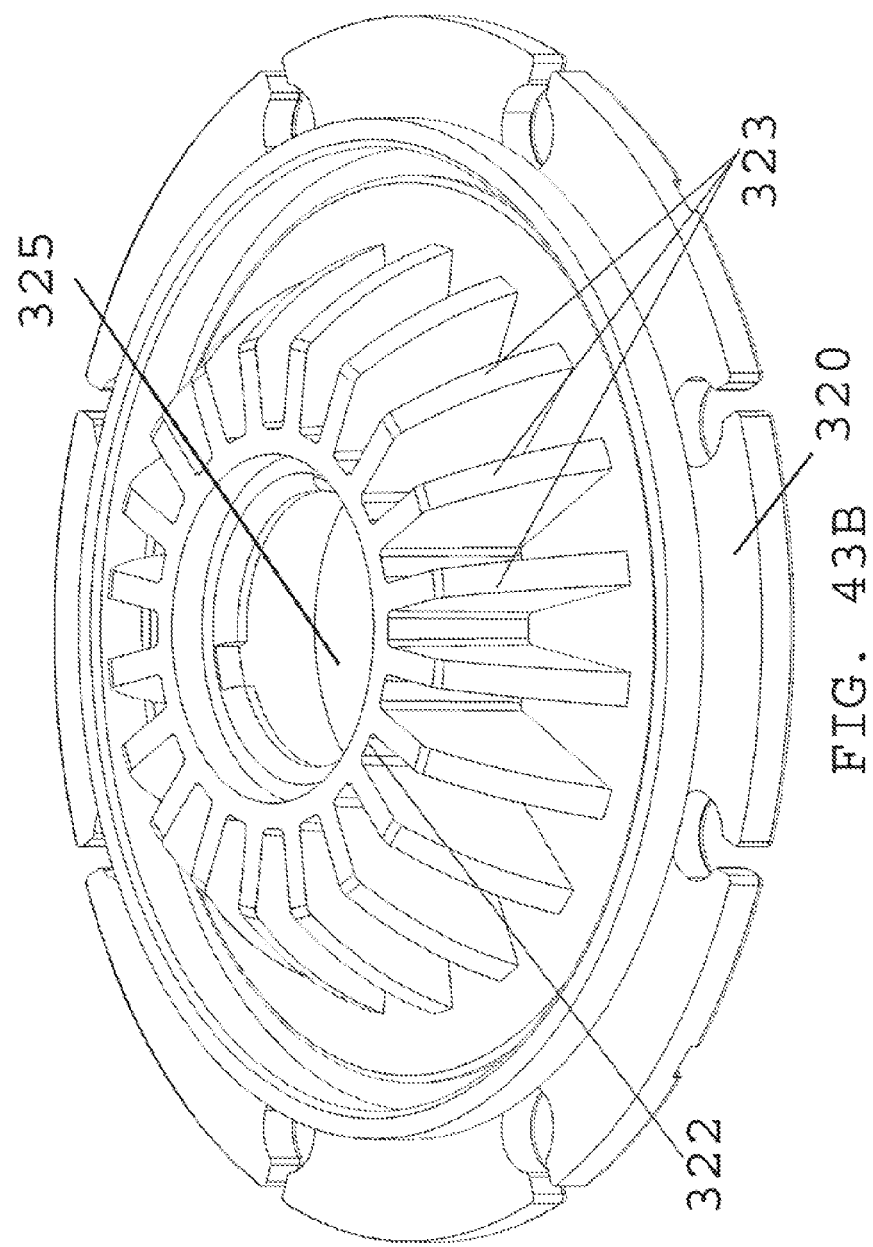

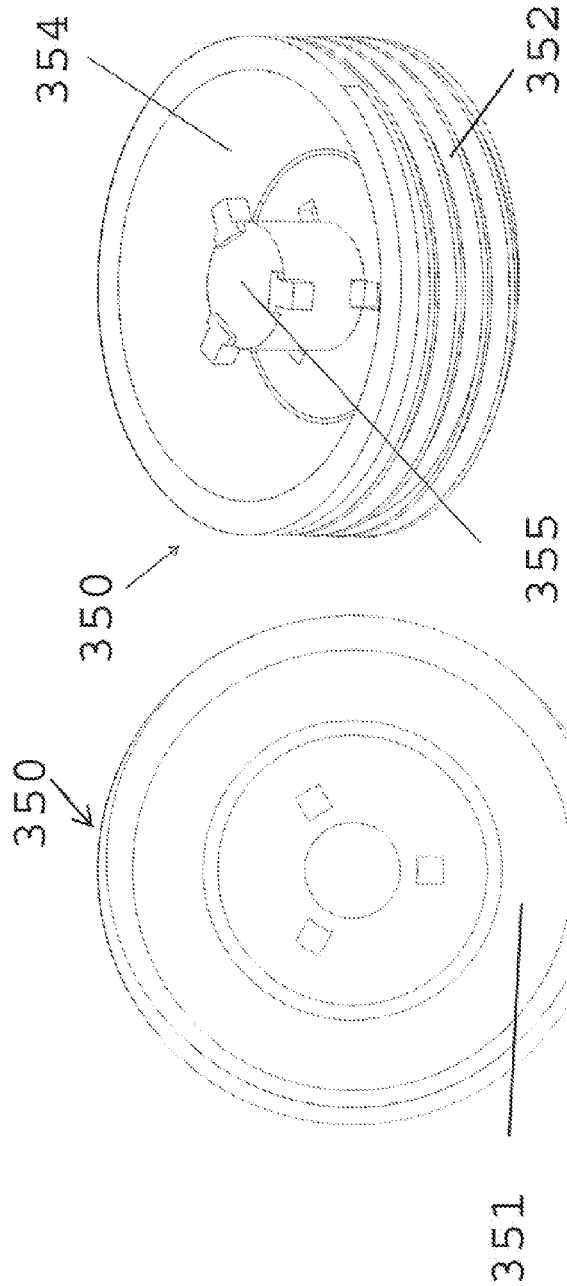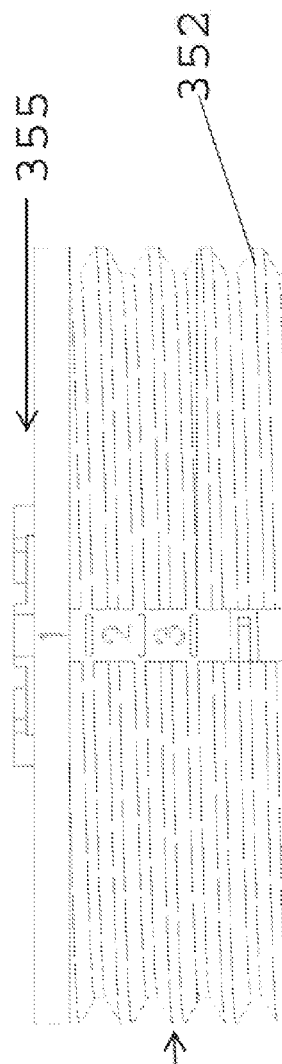
FIG. 45A
FIG. 45B
FIG. 45C

540

540

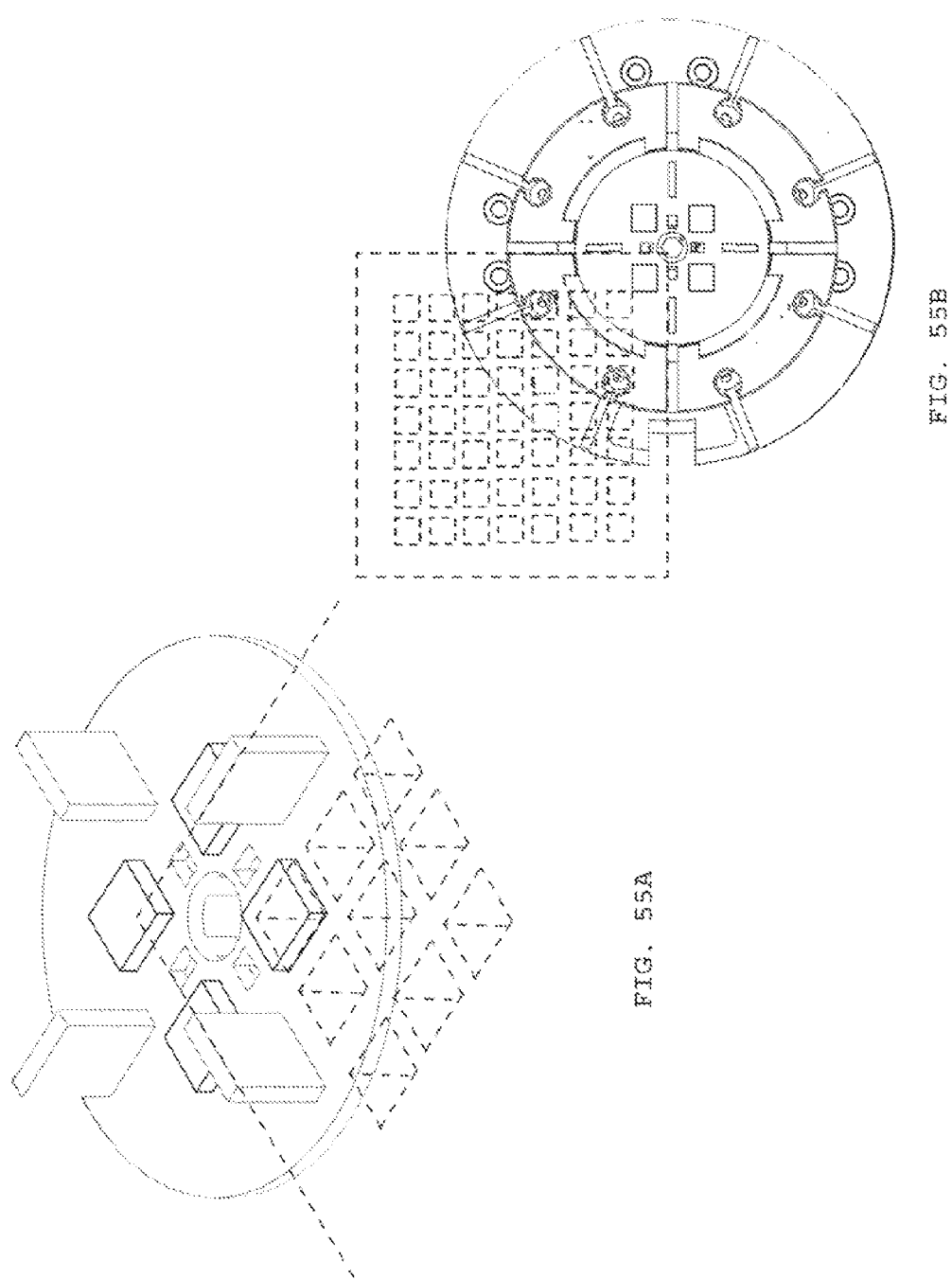

APPARATUS AND RELATED METHODS OF PAVING A SUBSURFACE

CROSS-REFERENCE TO RELATED APPLICATIONS

This application is a continuation of U.S. patent application Ser. No. 14/253,818 (filed Apr. 15, 2014), which is a continuation-in-part of U.S. patent application Ser. No. 13/564,628 (filed Aug. 1, 2012), which is a continuation-in-part of U.S. patent application Ser. No. 12/732,755 (filed Mar. 26, 2010). All applications are entitled "Apparatus for establishing a paver over a subsurface" and are incorporated by reference as if fully set forth herein.

STATEMENT REGARDING FEDERALLY SPONSORED RESEARCH OR DEVELOPMENT

Not applicable.

BACKGROUND OF THE INVENTION

1. Field of Invention

The present application is in the field of methods and apparatus for establishing a level paver surface with heat-exchange functionality.

2. Background of the Invention

Subsurfaces are frequently paved to adjust the aesthetic and/or physical properties of the subsurface. Sometimes, paving is accomplished via placing an array of pavers onto the subsurface. Therefore, a need exists for an apparatus and related methods that facilitate the paving of a subsurface with a paver.

Often, leveling and/or elevation of the paved surface relative to the subsurface are necessary. For instance, raising or elevating the paved surface relative to the subsurface can facilitate drainage of the paved surface or provide for air circulation between the paved surface and the subsurface (e.g., to prevent the buildup or mold or other residue). Furthermore, leveling the paved surface can correct an undesirably irregular or sloped undersurface. As a result, there is a need for an apparatus and related methods which facilitate the elevated and leveled placement of a paved surface onto a subsurface.

Pedestals can be used to elevate a paved surface relative to a subsurface. For instance, in U.S. Pub. App. No. 2013/0219809, we disclosed a pedestal that supports the corners of an elevated paver. Pedestals frequently feature slope compensating mechanisms for leveling the elevated paver surface relative to the subsurface. Two common slope compensating mechanisms are: cooperating twist slope adjustment (see e.g., U.S. Pat. Nos. 6,332,292 and 5,442,882); concave/convex interacting surfaces (see e.g., U.S. Pat. No. 3,318,057). Twist slope manipulation only allows for slope adjustment at the paver support surface instead of at the pedestal base whereby the pedestal can become unbalanced. Concave/convex surface slope compensation is not adequate since the concave/convex surface interactions are relatively frictionless and unstable so that additional components are needed to keep the paver support surface from shifting orientation. See U.S. Pat. No. 3,318,057, FIG. 2, element 70; see also U.S. Pub. Pat. App. No. US2008/0222973, FIGS. 4 and 5, element 132, 134 and 72. Accordingly, a need still exists for a pedestal and related methods which facilitate the elevated and leveled placement of a paved surface onto a subsurface.

When pedestals are used for elevation or slope compensation of a paved surface, problems can arise when the pavers are not coupled to the pedestal. For example, a paver can fall or otherwise shift position to increase paver installation time or ruin the paver pattern. Thus, many have designed mechanisms for coupling the paver to a pedestal. In the pedestal disclosed by Knight, III et al. (U.S. Pat. No. 8,302,356), the corners of four wooden pavers are anchored to a support pedestal via a washer that turns into a notch in the pavers' corner. See FIGS. 9-11. This washer features a cut-away portion so that the panels can be unanchored to the pedestal via aligning the cut-away portion with one of the four anchored corners. Problems can arise when the cut-away portion accidentally aligns with one of the paver corners wherein the paver may still be allowed to fall out of place or otherwise misalign. Thus, a need exists for apparatus and related methods of anchoring a paver to a pedestal.

Problems also arise in elevated and slope adjusted paved surfaces when small pavers are used because such small pavers cannot span between two pedestals. As a result, support surfaces are provided between the paver and the pedestal. See, e.g., U.S. Pat. No. 8,128,312. However, intermediate surfaces can be problematic for adding or removing heat from the paver surface. Exchanging heat with a paved surface is sometimes desirable. Heat is frequently provided to cold paved surfaces to melt snow on paved surfaces (e.g., a driveway of a home) in cold environments. Similarly, heat may be removed from a paved surface in hot environments to prevent discomfort to those walking bare-foot on the paved surface (e.g., a pool-side paved surface). As a result, there is a need for a pedestals, intermediate paver support surfaces, and related methods which facilitate the elevated, leveled, heated or cooled placement of a paved surface onto a subsurface.

SUMMARY OF THE INVENTION

It is an object of the present application to disclose apparatus and related methods for facilitating the elevated and leveled placement of a paver array onto a subsurface. In one embodiment, such an apparatus may be defined by two cooperating slope compensation panels that are disposed underneath a paver support pedestal. Each panel has a top surface and a bottom surface, wherein the bottom surface of one panel is configured for receiving the top surface of the other panel, and wherein the top surface is configured to be received by the bottom surface of the other panel or by the bottom of the pedestal. Suitably, the bottom surface of one panel features a slope relative to the top surface of the bottom panel so that the slopes of each panel compound or offset with the relative rotation of each panel with respect to each other. In one mode of operation, (A) the panels may be coupled and rotated relative to each other to compensate for a slope of an undersurface and (B) a pedestal may be positioned on the panels so that the pedestal's paver support surface is level relative to the subsurface.

It is also an object of the present application to disclose an anchoring mechanism for securing a paver to a pedestal. In one embodiment, the apparatus is a locking disk that may be positioned at the corners of a plurality of pedestals and inserted into a disk slot through the corners. In a preferred embodiment, the locking disk is a full circle that features a perforated break-away to assist in the unanchoring of the pavers whenever necessary. In operation, the locking disk works similar to the apparatus disclosed in by Knight, III et al. (U.S. Pat. No. 8,302,356) except the pavers are anchored with a full disk without a cutout. In another embodiment, the apparatus is a locking slider that may be positioned between two pavers and slid into slots in the corners of the two pavers, and then slid backward into so that the slider is positioned in the slot of four paver corners.

Finally, it is an object to provide an intermediate surface for supporting a small paver and that can also be used to exchange heat with the pavers. In one embodiment, the apparatus may be a hextray defined by a frame with a hexagonal lattice for supporting pavers. The hextray preferably features a tubing track throughout the lattice to accommodate heat exchange tubing. In operation the hextray may be positioned above a pedestal or directly on a subsurface. In embodiment, the hex tray may be outfitted with insulation and a metal plate so that heat may be exchanged with pedestals via fluid passing through tubing installed throughout the hexagonal lattice. In a preferred embodiment, the hextray features a slot in its corners for receiving a locking disk or locking slider.

Other objectives and desires may become apparent to one of skill in the art after reading the below disclosure and viewing the associated figures.

BRIEF DESCRIPTION OF THE FIGURES

The manner in which these objectives and other desirable characteristics can be obtained is explained in the following description and attached figures in which:

FIG. 29E is a side profile view of the cap 120;
FIG. 30C is a side profile view of the key 130;
FIG. 32A is a top perspective view of a buffer 150;
FIG. 32C is a top plan view of the buffer 150;
FIG. 32E is a side profile view of the buffer 150;
FIG. 34A is a perspective view of an assembly 200 in a first configuration;
FIG. 34B is a perspective view of the assembly 200 in a second configuration;
FIG. 34C is an exploded view of the assembly 200;
FIG. 35A is a top perspective view of a threaded collar 210;
FIG. 35C is a top plan view of the threaded collar 210;
FIG. 35D is a bottom plan view of the threaded collar 210;
FIG. 36C is a top plan view of the threaded insert 220;
FIG. 382E is a side profile view of the arm 230;
FIG. 41 is an exploded view of the assembly 300;
FIG. 43B is a bottom perspective view of the cap 320;
FIG. 45A is a top perspective view of a threaded insert 320;
FIG. 45B is a top plan view of the threaded insert 320;
FIG. 45C is a side profile view of the threaded insert 320.

FIGS. 55A, 55B, 55C and 55D are a perspective views and top environmental views of a spacer 640.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

Disclosed may be an apparatus and related methods for facilitating the elevated and leveled placement of a paver array onto a subsurface. In one embodiment, such an apparatus may be defined by two cooperating slope compensation panels that are disposed underneath a paver support pedestal. Each panel has a top surface and a bottom surface. Suitably, the bottom surface of a top panel features a slope relative to the top surface of a bottom panel so that the slopes of each panel compound or offset via the relative rotation of each panel with respect to each other. In one mode of operation, (A) the panels may be coupled and rotated relative to each other to compensate for a slope of an undersurface and (B) a pedestal may be positioned on the panels so that the pedestal's paver support surface is level relative to the subsurface. The details of the preferable panel are best disclosed by reference to FIGS. 1 through 10.

It should be noted that, now, and throughout the application the terms "top" and "bottom" or "lower" and "upper", or any other orientation defining term should in no way be construed as limiting of the possible orientations of the panel 1000 (i.e., the panel 1000 may be positioned sideways, or in reversed vertical orientations even though the specification refers to a "top" and "bottom" parts).

Figure 1:
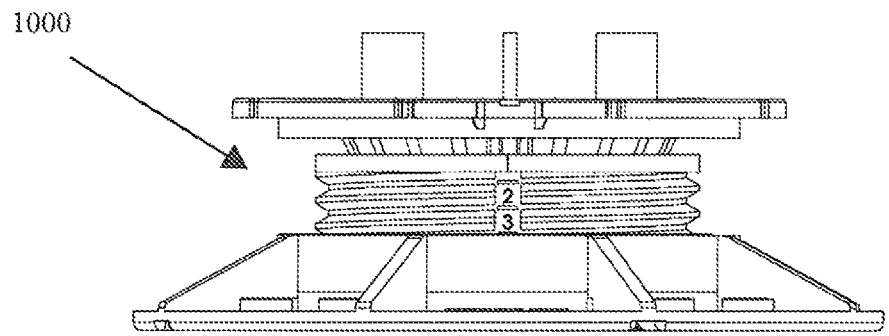
FIG. 1 is a pedestal 1000.

FIG. 1 is a pedestal 1000 for elevating a paver surface. The pedestal 1000 is disclosed in U.S. Pub. App. No. 2013/0219809, and that document is hereby incorporated in its entirety. As disclosed in that document, the pedestal 100 has a slope compensation mechanism at its paver support surface, but not its base. In one embodiment, the disclosed apparatus is slope compensation disk that, when staked with a like disk, provides a footing for a pedestal that is configured to compensate for the slope of the subsurface.

Figure 2:
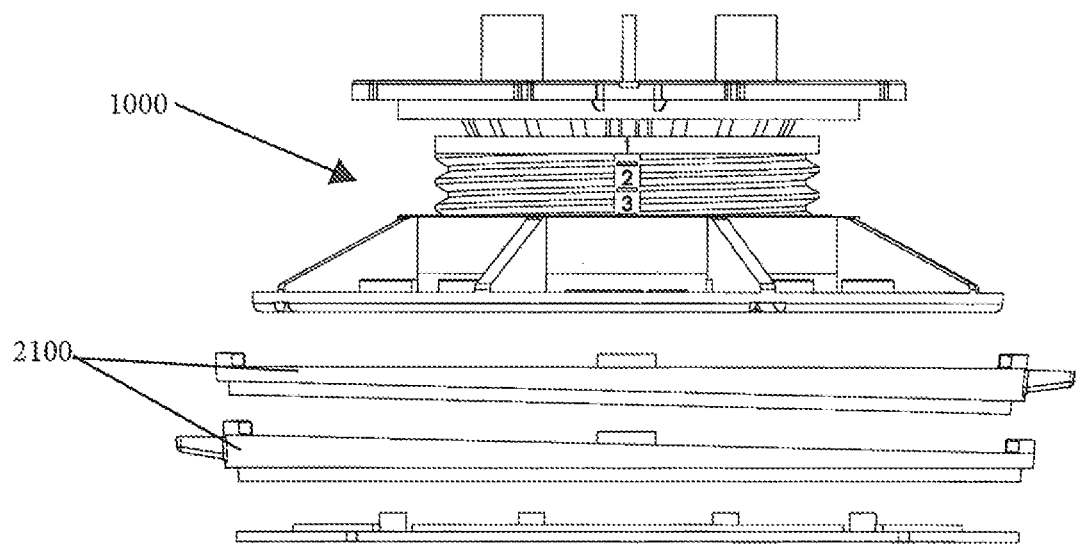
FIG. 2 is an exploded view of the pedestal 1000 over a base and two slope compensation panels 2000.
Figure 3:
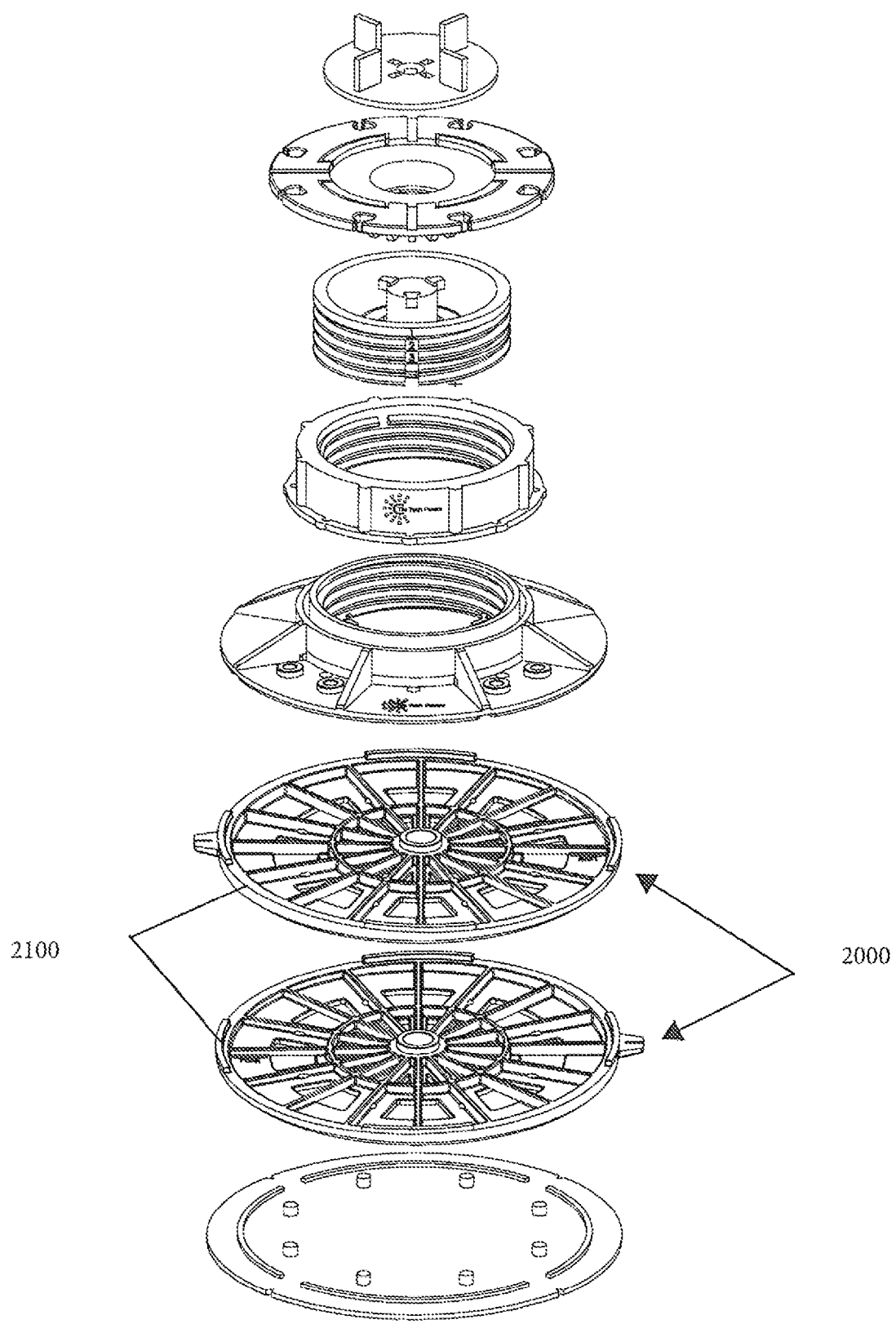
FIG. 3 is an exploded view of the pedestal 1000 and the slope compensation panels 2000.
Figure 4:
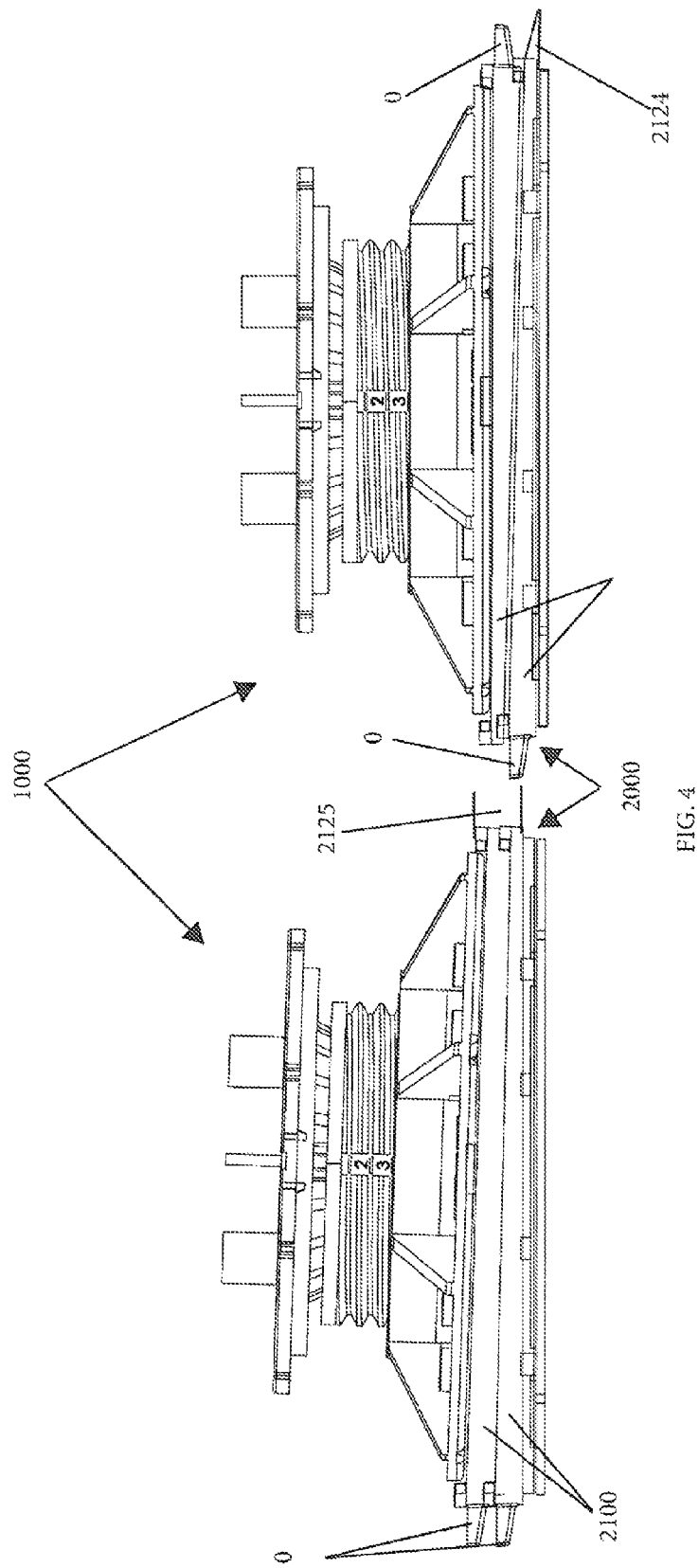
FIG. 4 is a side-by-side view of a pedestal and a slope compensated pedestal.

Referring now to FIG. 4, the pedestal 1000 may be positioned on a slope compensation pad 2000 defined by two or more slope compensation disks 2100. FIGS. 2 and 3 illustrate how two panels might be stacked. As alluded to above, the panels 2100 are configured with a top surface plane that is angled relative to the plane of its bottom surface. The top surface plane of a first panel 2100 may interact with a bottom surface plane of a second panel to result in the compounding or offsetting of panels 2100 respective angle. As shown in the figure, the pedestal 1000 on the right is on a pad 2000 that has the angles of its panels 2100 offset while pedestal 1000 on the left is on a pad 2000 that has had the angles of the stacked panels 2100 compounded. FIG. 2 is a side view of the pedestal 1000 being positioned over two slope compensation panels 2000.

Figure 5:
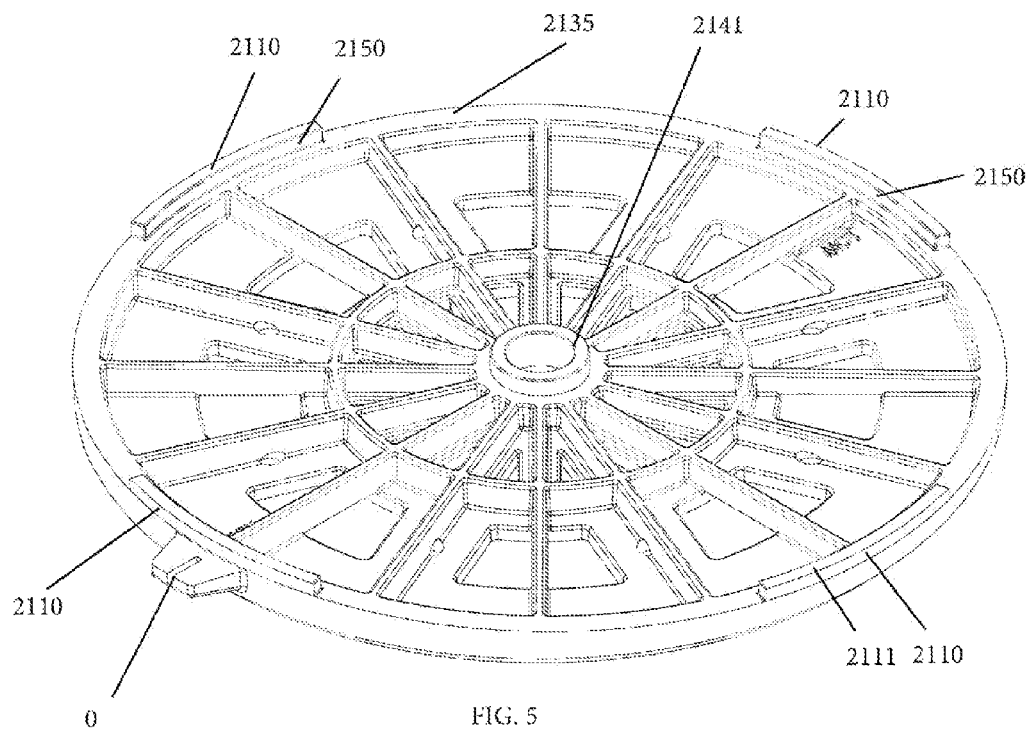
FIG. 5 is a top perspective of a slope compensation panel 2000.
Figure 6:
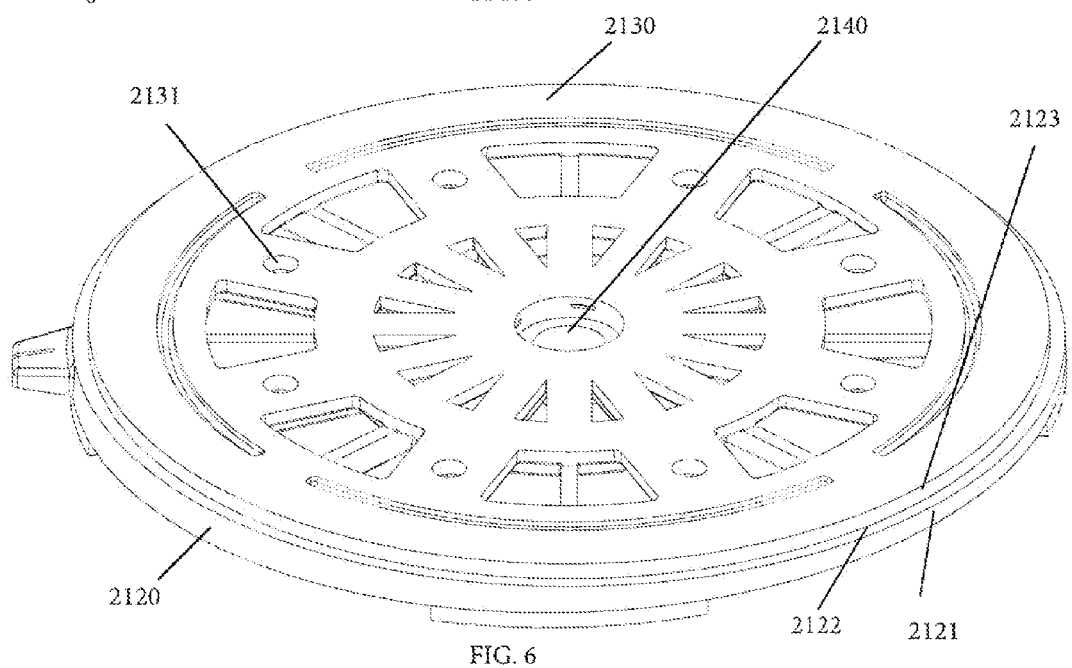
FIG. 6 is a bottom perspective of a slope compensation panel.
Figure 7:
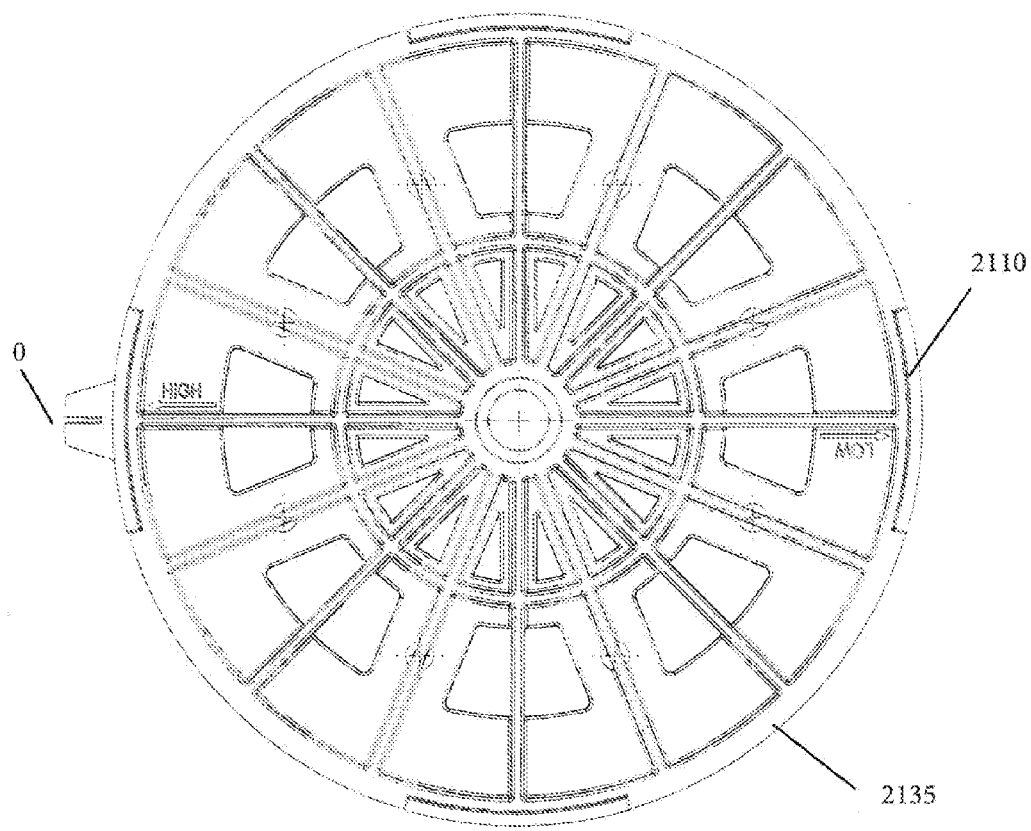
FIG. 7 is a top view of the slope compensation panel
Figure 8:
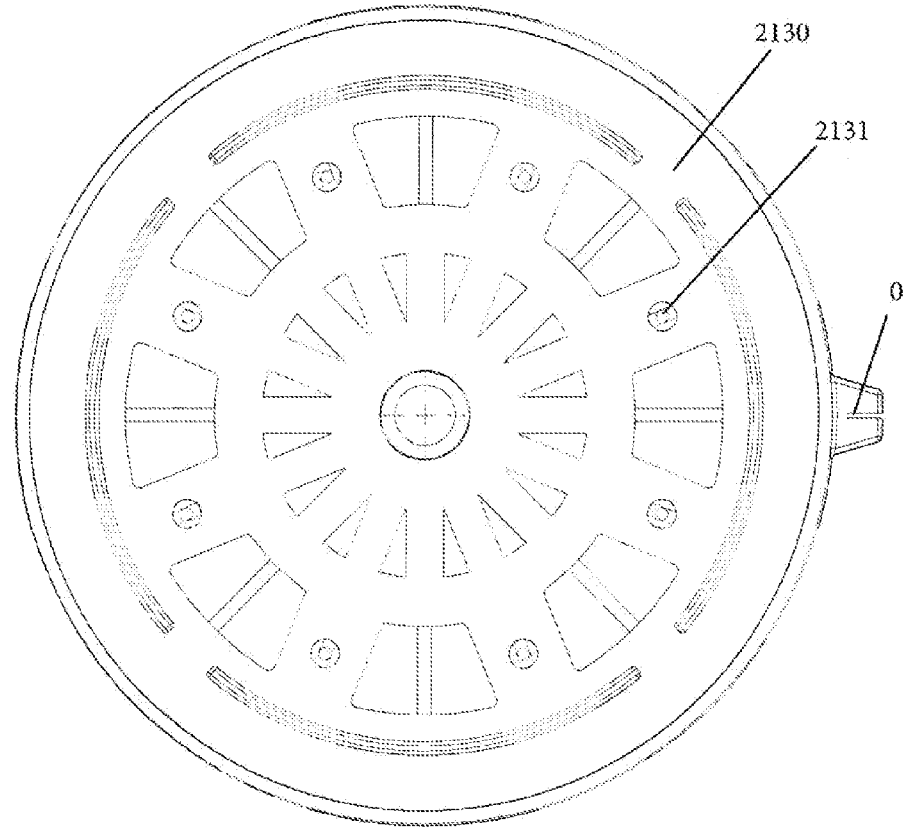
FIG. 8 is a bottom view of the slope compensation panel.

FIGS. 5 and 6 respectively depict bottom and top perspective views of the slope compensation panel 2100. FIGS. 7 through 10 respectively depict top, bottom, left side, and right side view of the compensation panel 2100. As can be seen in the referenced drawings, the panel 2100 is generally a truncated tubiform and may comprise: feet 2110; an outer wall 2120; an established surface 2130 on at least a part of one end of the truncated tubiform; an established surface 2135 on the underside of the panel 2100; an attachment receptacle 2140 on the surface 2130; an inner wall 2150 accessible at the unclosed end of the component's 1 truncated tubiform; and the underside 2160 of the surface 2130. FIGS. 5 through 10 suitably illustrate the above referenced components of the depicted panel 2100.

The feet 2110. The feet 2110 are best depicted in FIGS. 5, 6, 7, 9, and 10. As seen in the cited figures, the feet 2110 may generally be a rim or portion thereof or distal projection around the open end of the panels 2100 truncated tubiform. As such, the feet 2110 feature lower 2112 (see FIG. 7) surfaces. Operably, the feet 2110, via the lower surface 2112, may uprightly support a panel 2100 on a subsurface when such is positioned with its open end against the subsurface. In an alternate embodiment (see, e.g., FIG. 4, the feet 2110 may be positioned on a base plate). Further, as discussed below, because the panel 2100 is configured to receive/retain items within its tubiform, the foot 2100 may further define a gripping means for facilitating the receipt/retention and/or removal of such items.

Figures 9, 10:
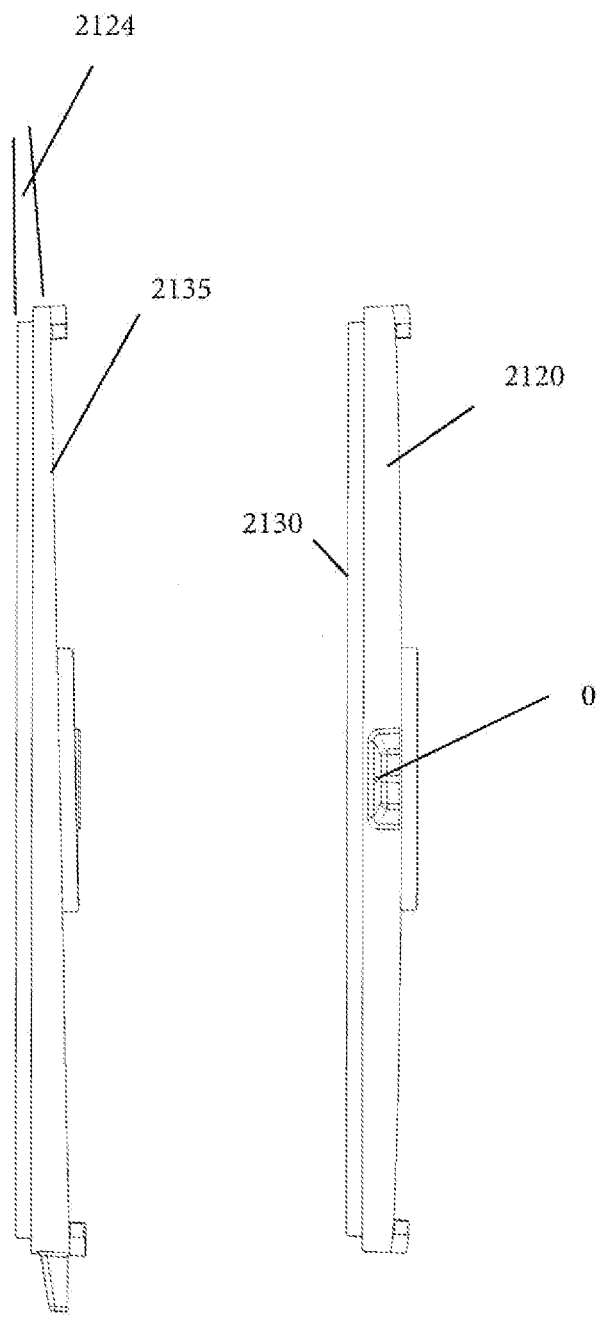
FIG. 9 is a side view of the slope compensation panel.
FIG. 10 is a rear-view of the slope compensation panel.

The outer wall 2120. The outer wall 2120 is best depicted in FIGS. 5, 6, 9 and 10. As seen in the figures, the outer wall 2120 may suitably be the external portion of the component's tubiform. As such, the outer wall 2120 generally extends between the foot 2110 and the surface 2130. As is further depicted, the outer wall 2120 is suitably divided at a midpoint by a step 2122 into lower 2121 and upper 2123 sections. As seen in FIGS. 9 and 10, the upper portion 2123 is offset from the lower portion 2121 in terms of the component's external diameter to generally define the step 2122 (see also FIG. 5). As further seen in FIGS. 5, 9, and 10, the step 2122 generally defines a plane that is oblique to the plane of the bottom surface 2135. The oblique angle is generally referenced by angle 2124. Preferably, the step 202 is disposed on the outer wall 200 at a location that is more toward the surface 2130 end of the panel 2100, but the plane of the surface 2130 should suitably be above the plane of the step 2122 and the plane of the under surface 2135.

When a panel is used in isolation, as discussed further below, the top surface 2130, the step 2122, and undersurface 2135 suitably serve only aesthetic purposes. However, when used in conjunction with a like panel 2100 (i.e., more than one panel 2100) the step 2122 and surface serves as a means for altering the slope of the surface 2130 with respect to a subsurface. This functionality is discussed later below.

The top surface 2130 and bottom surface 2135. The top and bottom surfaces 2130, 2135 are best seen in FIGS. 5, 6, 7, and 8. Referring to these figures, the surface 2130 generally encloses one end of the component's 1 tubiform to establish a load bearing surface. The bottom surface, 2135 generally defines a plane on the bottom of the panel 2100. Operably, the surface 2130 is adapted for receiving a pedestal (see e.g., FIG.

2) whereby the pedestal is supported above a subsurface by the panel. For example, a panel 2100 used in isolation may, after being placed feet 2110 down on a subsurface or base plate, receive a pedestal, on its surface 2130 whereby the paver is above the subsurface.

The attachment receptacle 2140. Referring now to FIGS. 5, 6, 7 and 8, the surface 2130 features at least one mortise 211 and an attachment receptacle 2140. The mortise 2131 is generally an aperture or depression around the periphery of the surface 2130. The mortise 2131 are generally for receiving a corresponding tennon for securing a pedestal to the top surface 2130. The attachment receptacle 2140 is generally a larger, central depression or aperture. The attachment receptacle 2140 is generally for receiving a corresponding extension 2141 from the bottom surface 2135 of a panel that has been stacked on the top surface.

The inner wall 2150. The inner wall 2150 is best viewed in FIG. 6. As seen in the figures, the inner wall 2150 may suitably be the internal portion of the panel's 2100 tubiform. As such, the inner wall 2150 generally extends internally between the foot 2110 and the underside 2135 of the surface 300. As further depicted in the figures, the inner wall 2150 ends at the bottom surface 2135. As further seen in FIGS. 5, 6, 7, and 8 the bottom surface 2135 generally defines a plane that is oblique to the plane of the foot surface 102 and the plane of the top surface 2130. The oblique angle has generally been identified by angle 2124. Preferably, the plane of the feet surface 2111 should suitably be below the plane of the bottom surface 2135.

FIG. 4 depicts two like panels coupled in stacked configurations. The panel 2100, as best seen in FIG. 6, features a receptacle which is generally defined by the inner wall 2150 and is adapted to femininely receive the surface 2130 end of a like panel 2100 until the bottom surface of the receiving panel (2135) interfaces with the top surface 2135 and the feet 2110 interface with the step 2122 of the inserting panel 2100. Referring still to FIG. 4 through 10, the orientation of the interface of the upper and lower surfaces 2130 and 2135 may be manipulated to change the slope of the top surface 2100 of the receiving panel 2100 with respect the feet plane 2111 of the lower panel 2100. The stated change in slope can be viewed by comparing the rotated pad 2000 of FIG. 4.

Referring first to FIG. 4, the upper and lower panels 2100 on the right are oriented with respect to one another whereby the angles 2124 of the panels are approximately alternate interior angles with respect to the panel interface, the surface 2130 of the upper panel 2100, and the lower surface 2111 of the bottom panel. (i.e., the surface 2130 of the upper panel and the lower surface 2111 of the feet of the bottom panel are parallel and the concentric axes of the panels are aligned). The pedestal on the right of FIG. 4, can generally be obtained by identifying an origin point 0 on the pedestal of both panels and subsequently stacking the components whereby the origin 0 on the first panel 2100 is diametrically opposite (one-hundred and eighty degrees around the axis of the insertive panel 2100) to the origin 0 of the second panel. Further, the angle 2125 in this configuration is suitably zero degrees whereby the surface 2130 of the receiving panel is parallel with the feet surface 2111 of the inserting panel 2100.

Referring now to the left side of FIG. 4, the receptive and insertive panels 2100 are oriented with respect to one another whereby the angles 2124 of the insertive and receptive components 1A and 1B compound (i.e., have the same vortex point and share a common reference plane). The above described second configuration typically occurs when the origin point 0 on the first panel is aligned with the origin point 0 on the second panel as depicted on the left in FIG. 4. Further, the angle 2125 in this configuration is suitably the sum of angles 2124.

Preferably, rotating the first panel around the axis of the second panel along the interface of the upper and lower surfaces 2130, 2135 of the panels and between the above-identified configurations (i.e., rotating the origin of the first panel with respect to the axis of component 1B) will vary the size of the angle 2125 between the upper surface 2130 of the upper panel and the relative horizontal. Suitably, a maximum degree for the angle 2125 will be obtained in the identified left configuration of FIG. 4, a zero degree will be obtained as identified in the right configuration of FIG. 4, and an intermediate angle may be elected via positioning the origin of the first panel between zero or one hundred eighty degrees relative to the origin and axis of the second component. Referring again to FIGS. 9 and 10, in the present embodiment the angles 2124 are approximately 1 degree whereby the angle 2125 may vary from between 0 and two degrees. Subject thereto, the angles need not be limited to 1 degree, but rather it is preferable that the angles be in a range of about 0 to 5 degrees whereby the resulting angle 2125 may be selected to between a range of about 0 and 10 degrees depending on the circumstances.

The components of the pad 2000 being or composing a paver load bearing apparatus, slipresistant mechanism, noise dampening mechanism, and protective buffering to the substrate, should preferably be fashioned out of materials that are capable of these functions. As the weight of a paver may vary from extrodinarily heavy to very light, the materials which may be acceptable for fabricating the components will typically vary according to the applicable paver to be supported thereon the pads. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies being or composing a paver load bearing apparatus should preferably be dimensioned to a size that renders the assemblies capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure.

A slope compensation pad 2000 comprised of an above disclosed panels may be used to compensate for variations in the slope of the undersurface with regard to the leveling of a paver surface via a pedestal. For example, the method may comprise the following steps: obtaining a plurality of components comprising a structure having an undersurface and a top surface, said under surface configured to interface with the top surface of a like component; insertably coupling two of said components whereby the under surface of the receptive component interfaces with the top surface of the insertive component; manipulating the orientation of the insertive component with respect to the receptive component along the interface; and, providing a pedestal to the support surface.

As alluded to above, the disclosed assembly may used for establishing a level paver surface over a sloped subsurface. FIG. 21A depicts a side view of the assembly 2000 and illustrates one mode establishing such leveled surface. Referring first to FIGS. 21A and 21B, the threaded insert 3200 suitably features a concave surface 3240 and the cap 3200 suitably features a convex surface 3230 whereby the slope of the paver support surface 3230 may be skewed in any direction relative to the plane of the foot 3110 of the base 3100 via sliding the convex surface 3230 of the cap 3200 along the concave surface 3240 of the insert 3200. In one embodiment, the paver support surfaces 3210 of four assemblies 4000 positioned at the four corners of a square paver will self level with respect to one another under the weight of the pavers installed thereon the assemblies 2000.

Figure 11:
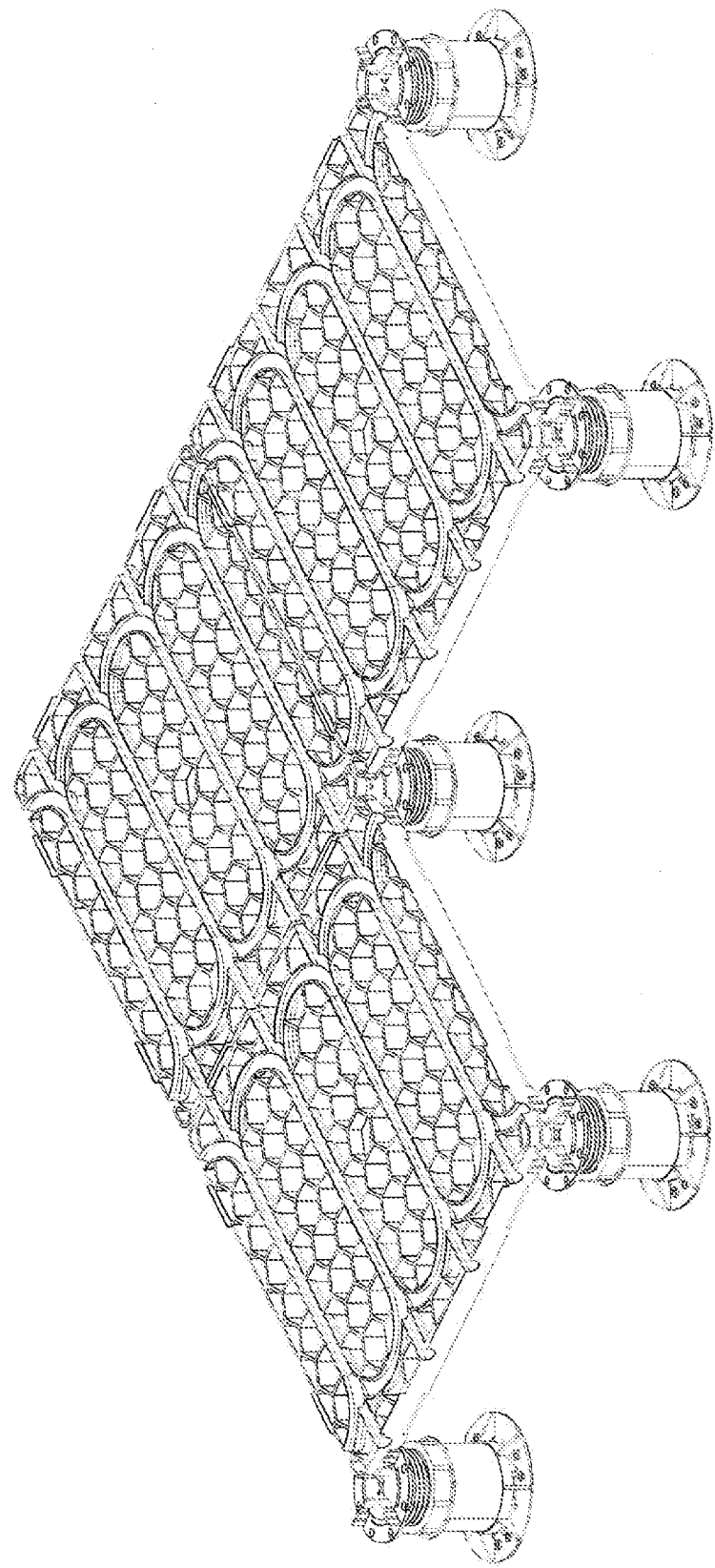
FIG. 11 is an environmental view of a pedestal array supporting a paver support panel.
Figure 12:
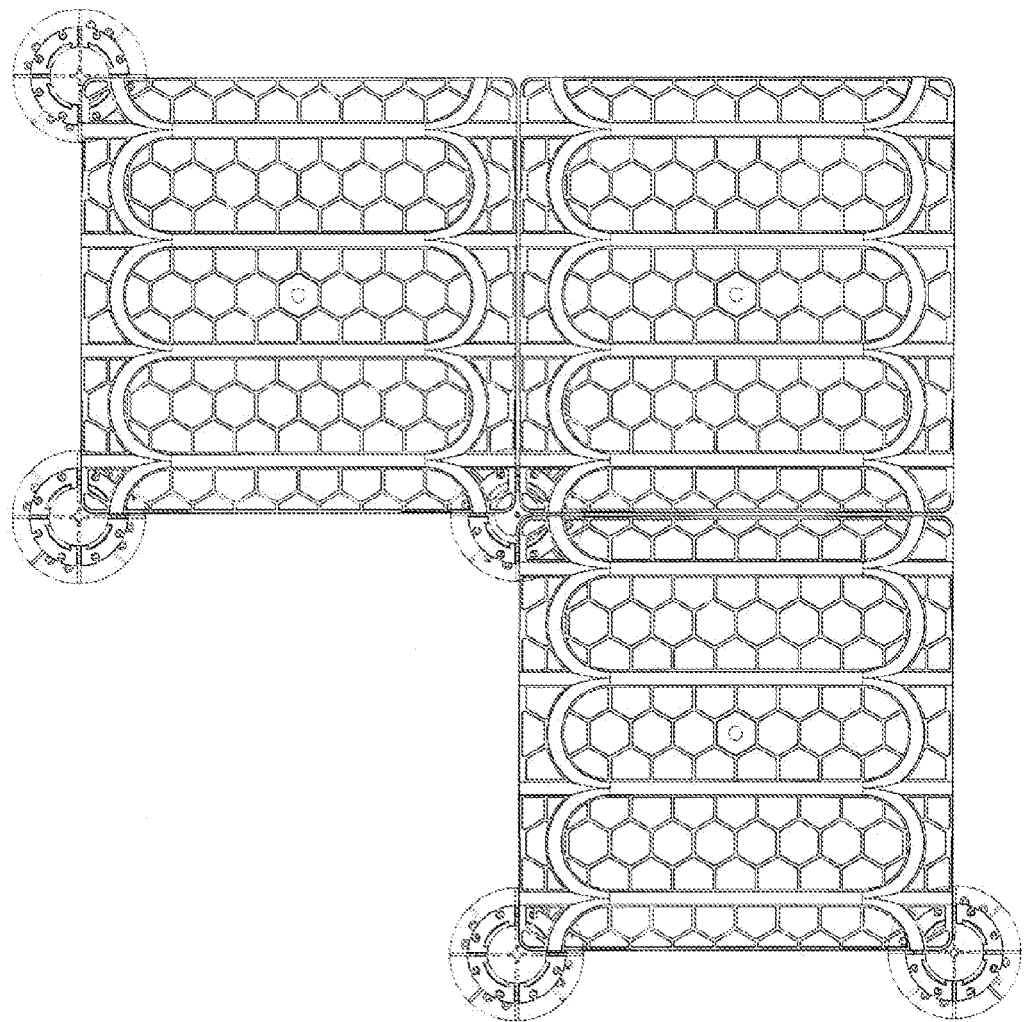
FIG. 12 is a top view of FIG. 11.
Figure 13:
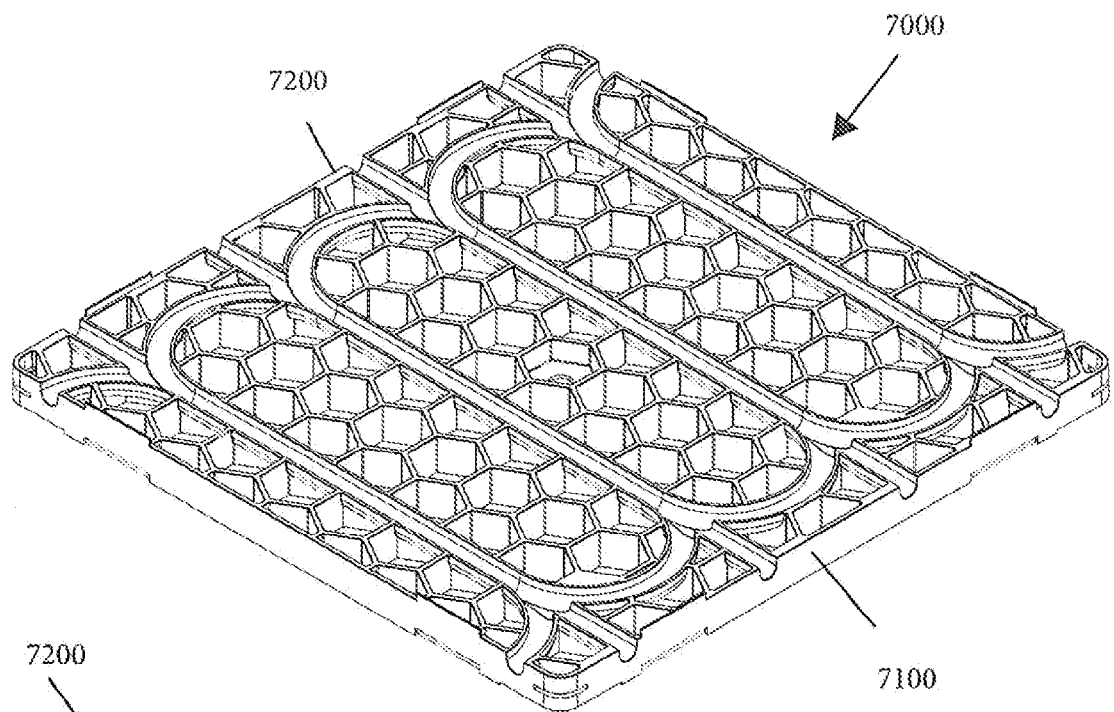
FIG. 13 is a perspective view of a paver support panel.
Figure 14:
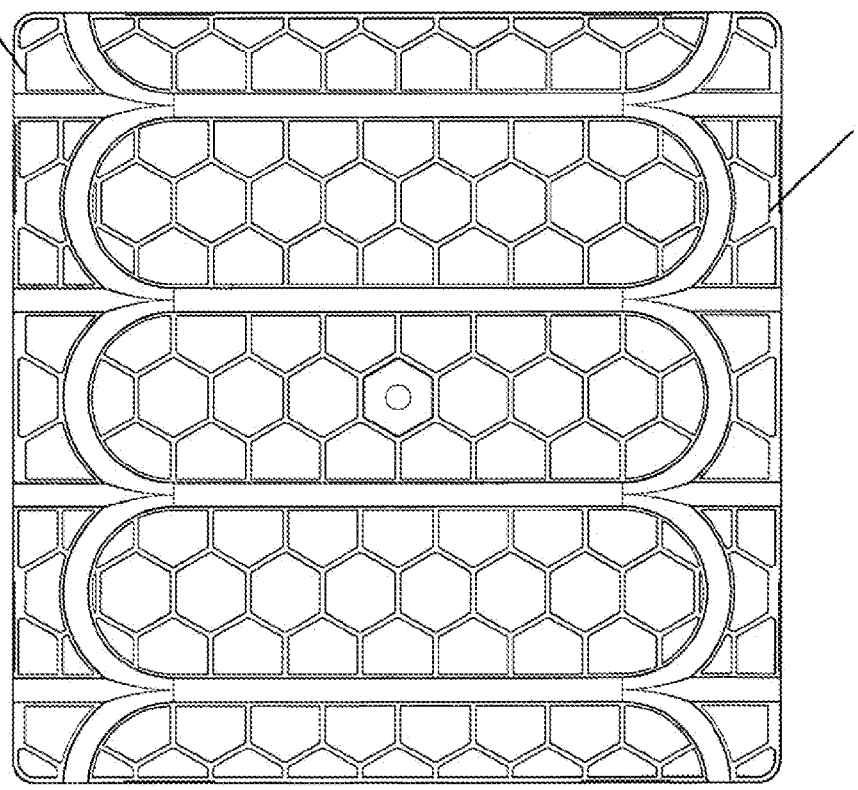
FIG. 14 is a top view of the paver support panel.
Figure 14A:
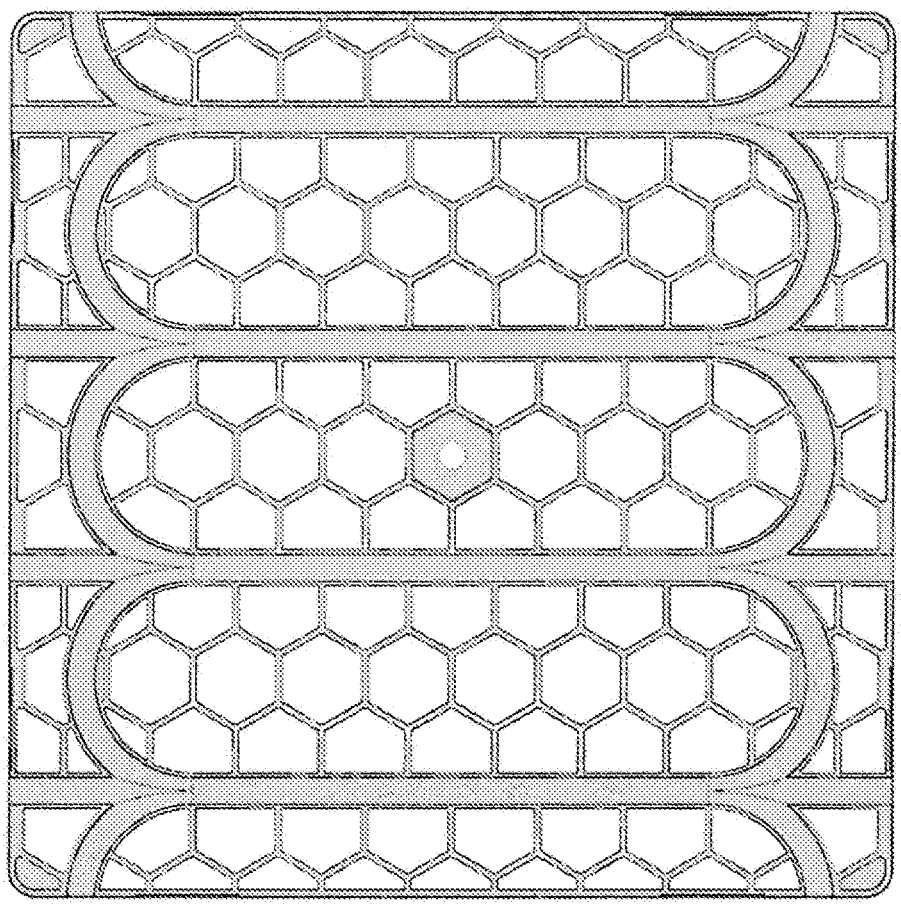
FIG. 14A is a top view of the paver support panel.

FIGS. 11 and 12 depict a plurality of hextrays 7000 installed on top of a plurality of paver pedestals. FIG. 13 is a perspective view of a hextray 7000, which is an intermediate paver support surface. FIG. 14 is a top view of the hextray 7000 of FIG. 13. In operation, a hextray 7000 may be provided to a paver pedestal in the manner of a large paver and as shown in FIGS. 11 and 12 and small pavers deposited thereon in an array. In an alternate embodiment, the hextray 7000 may be placed directly on the subsurface to provide a larger footprint for said small pavers.

Figure 19:
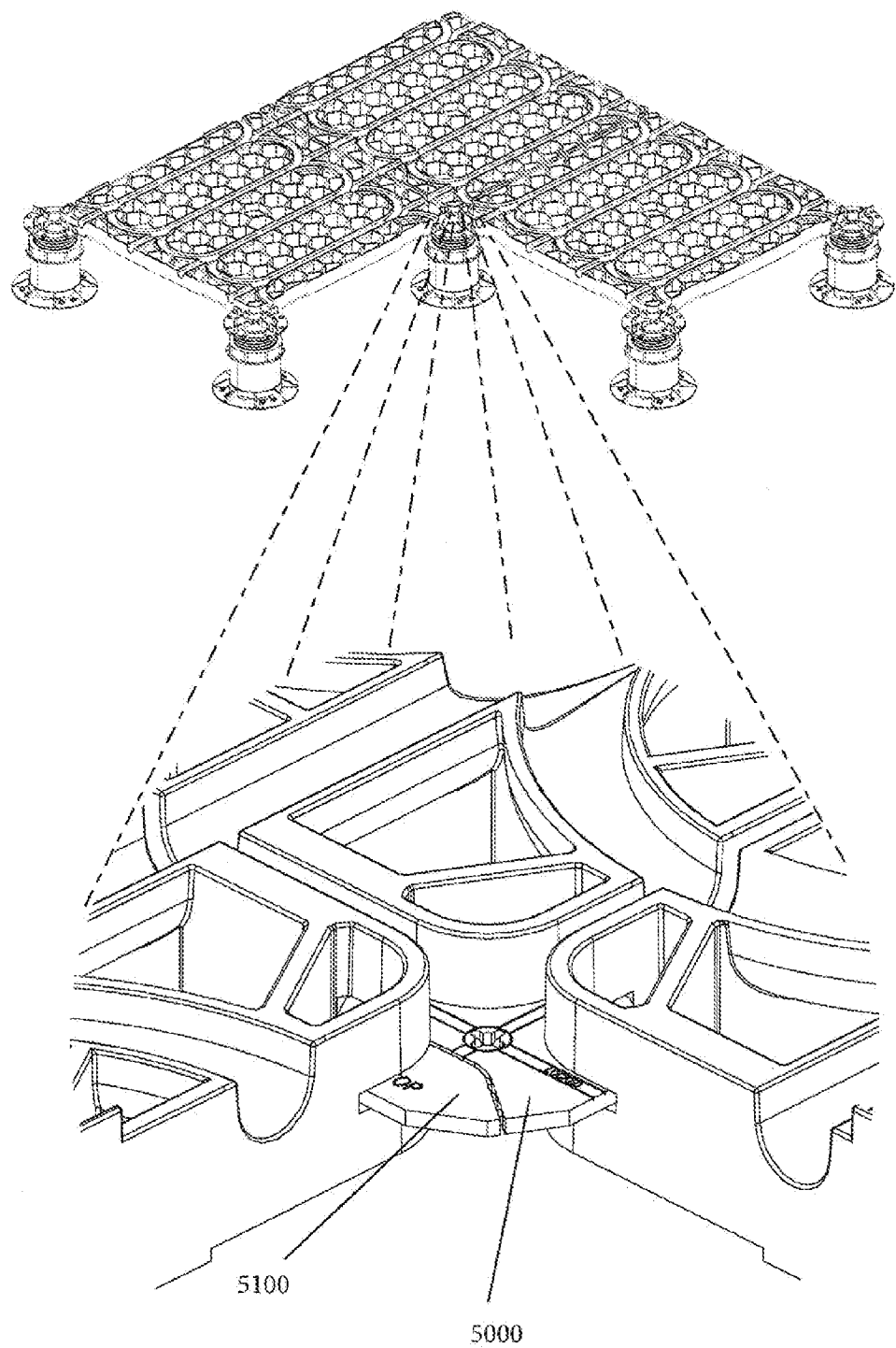
FIG. 19 is an environmental view of a locking disk.

Referring to FIG. 13, the hextray 7000 is generally square and defined by a frame 7100 and a hexagon lattice 7200. As shown in FIGS. 13 and 14, the hextray 7000 features a tubing track 7300 and all of the hexagons in the hexagon lattice 7200 define an aperture through the hextray 7300 except the center hexagon 7310 (See the shaded portion of FIG. 14). In one embodiment, the frame 7100 has holes or other apertures in its corner for securement to a pedestal as described in U.S. Pat. No. 7,140,156 (issued Nov. 28, 2006). As discussed later, each corner of the hextray 7000 features a slot for receiving a locking disk or a locking slider (see FIG. 19).

It should be noted: although the locking hextray 7000 is depicted as a square, any number of suitable shapes may be used. Such shapes will be known by those of skill in the art, and may include, but should not be limited to, squares, rectangles and other quadrilaterals. Also, the hextray should be constructed of suitable material. Such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated. Finally, it should further be noted that, the dimensions of the hextray 7000 will vary with the size of the paver to be retained by the pedestal. In particular, the height of the projections may vary depending on the thickness of a paver, e.g. in a range of about 0 to 100 inches.

Figure 15:
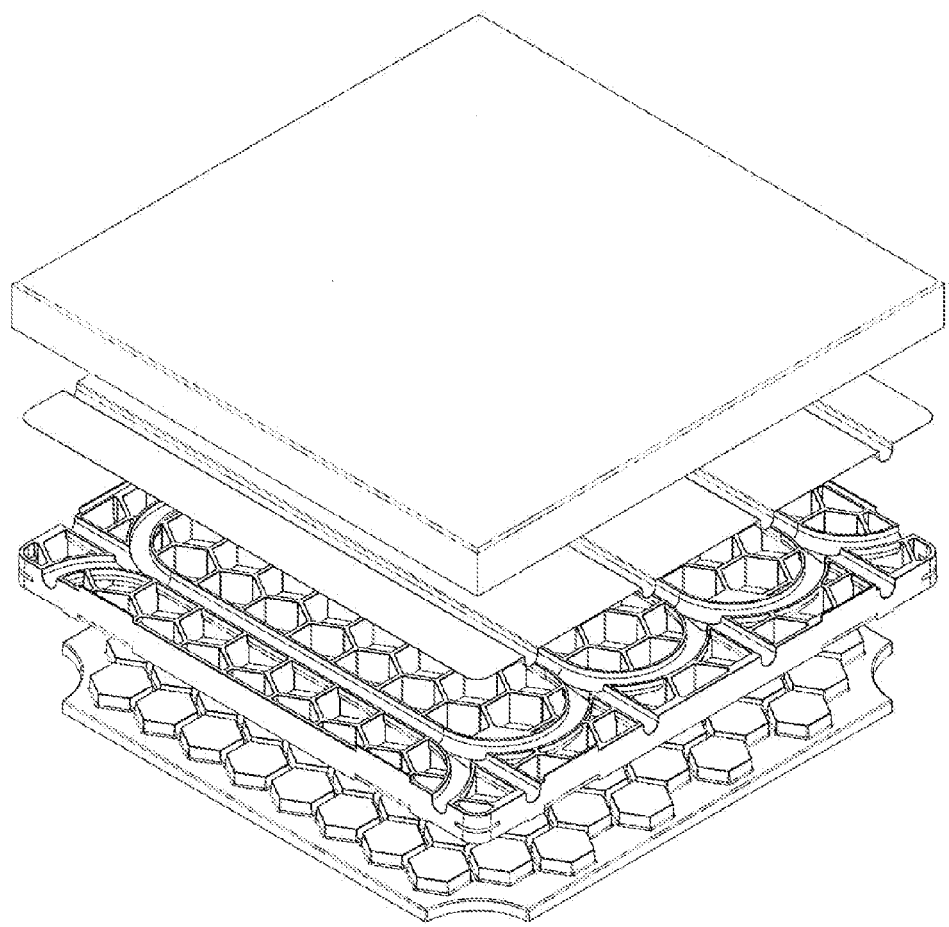
FIG. 15 is an exploded view of a heat exchanger paver support panel.
Figure 16:
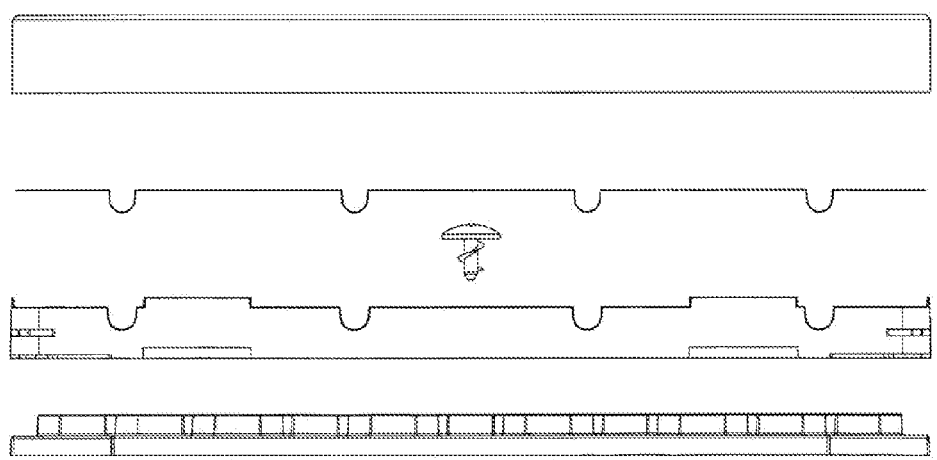
FIG. 16 is a side view of FIG. 15.
Figure 17:
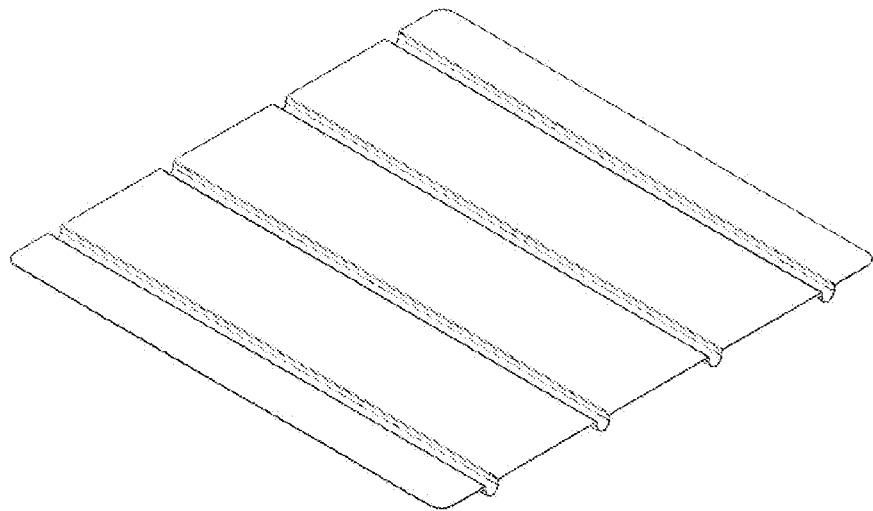
FIG. 17 is a perspective view of an aluminum tray.
Figure 18:
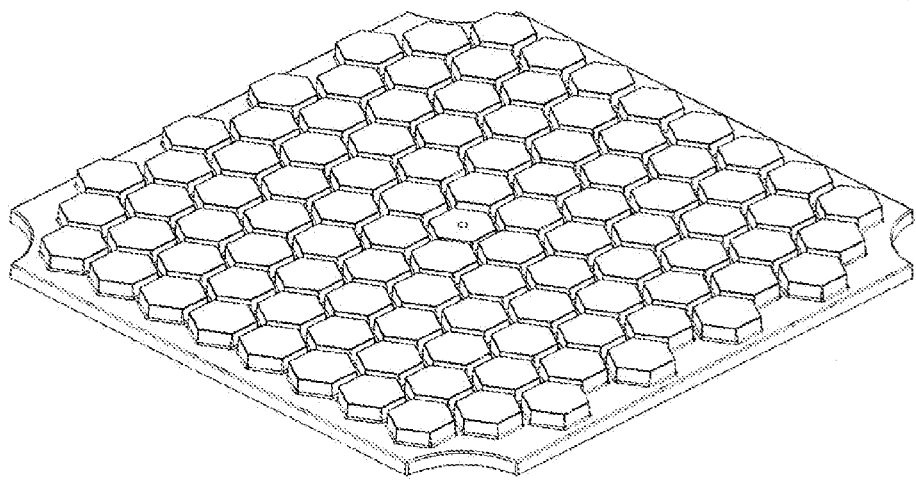
FIG. 18 is a perspective view of a foam tray.

In a preferred embodiment, the hextray 7000 may be used to provide a heat exchanger to a paver for heating or cooling a paver surface. FIG. 15 is an exploded view of a hextray with a heat exchange configuration. FIG. 16 is a side view of the exploded hextray 7000 configuration. As shown, insulation 7200 may be provided to the bottom of the hex board and secured to the hextray 7000 via a screw with large threads for gripping the insulation and retaining the insulation against the hextray 7000. Referring to FIG. 18, the insulation is a pad with hexagonal protrusions that insert into the hexagonal apertures of the hexagon lattice. An aluminum or other heat conducting metal plate with tubing lanes may suitably be positioned on top of the hextray so that the tubing lanes are disposed within the tubing track of the hextray 7000 (see FIG. 19). Tubing (not shown) may be provided through the tubing lanes and connected to a hot or cold water source and discharge. Finally a paver may be positioned above the tubing and aluminum plate.

When constructed as shown in FIGS. 15 and 16, the hextray operates as a heat exchanger for the paver. For cooling a paver surface, cool water may be provided to the tubing so that heat may be conducted through the paver surface, along the heat conducting plate and into the water. For heating a paver surface, hot water may be provided to the tubing for the opposite heat flow. Suitably, the insulation keeps heat from being lost below the hextray 7000.

Although water through tubing is described as the heat transfer mechanism, in an alternate embodiment, a refrigeration unit may be applied to the hextray. In a preferred embodiment, the refrigeration unit is similar to the one disclosed in U.S. Pub. Pat. App. No. 2012/0298331 (published Nov. 29, 2012). In a preferred embodiment, the refrigeration will comprise an aluminum plate with capillary heat exchangers, wherein the plate features hexagonal male inserts that will register in the hexagonal holes of hextray. In other words, the system may be outfitted with a heat exchanging aluminum plate or heat exchanging panel that will fit and align with the hexagonal structures of the tray.

Figure 20:
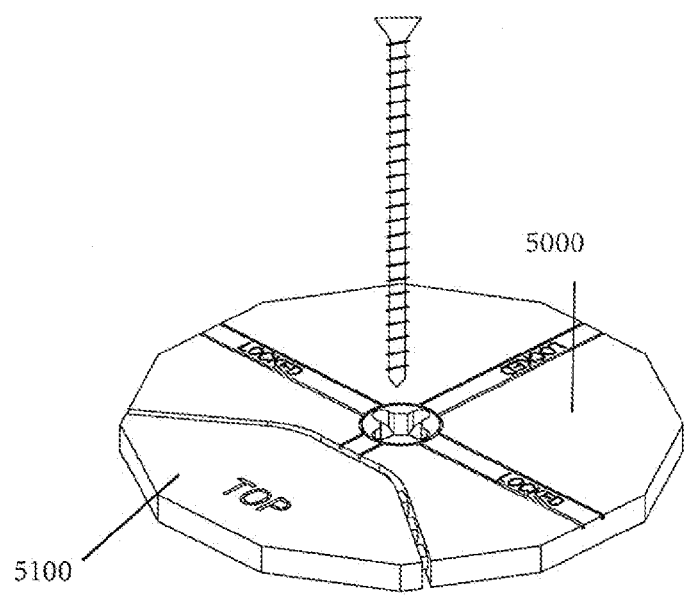
FIG. 20 is a perspective view of a locking disk.
Figure 21:
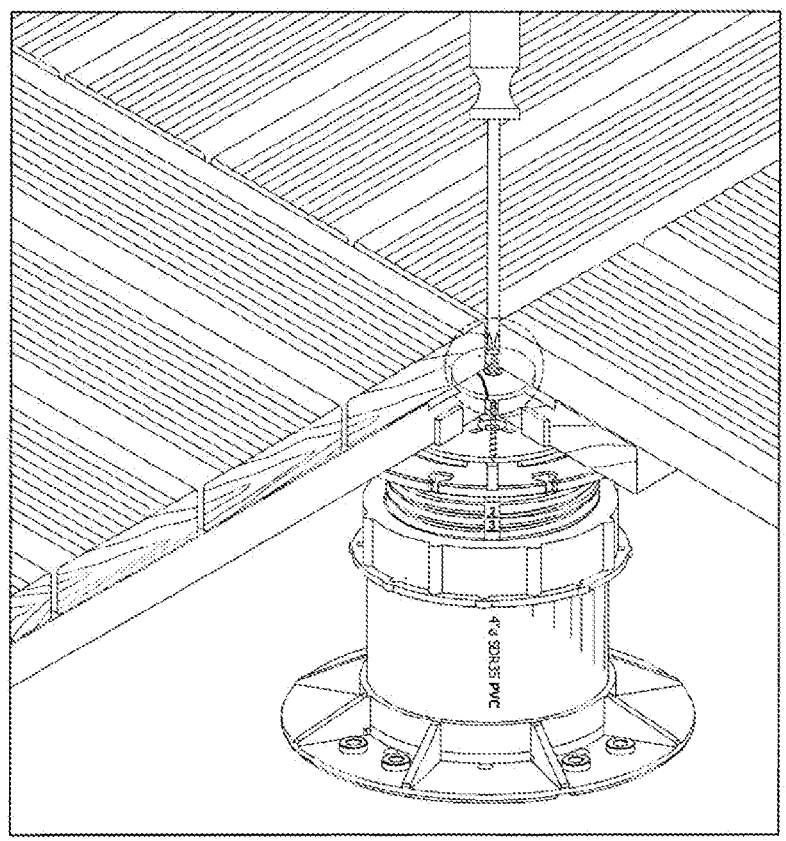
FIG. 21 is an environmental view of the locking disk.
Figure 22:
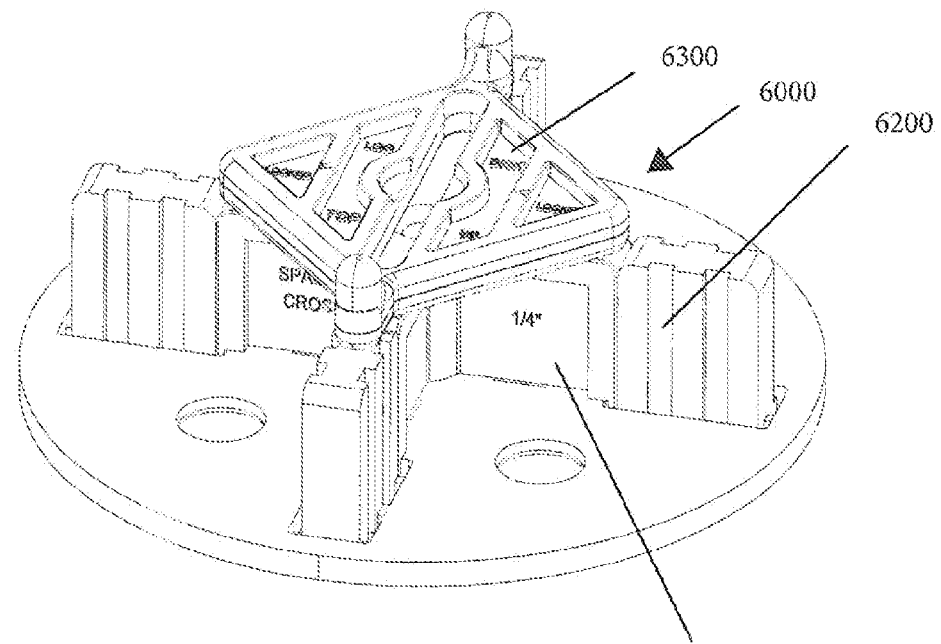
FIG. 22 is a view of a locking slider.

FIGS. 20 and 21 are respectively a view of a locking disk 5000 for securing tiles and an environmental view of the same. As shown in FIG. 20, the disk is circular and features a screw for anchoring the disk 5000 to a pedestal. As shown, the disk 5000 suitably features a break-away portion 5100, with perforation so that said portion 5100 may be broken off or folded away. In general, the disk 5000 may be inserted into corner slots of four adjacent tiles and secured to a pedestal, as shown in FIG. 21. Suitably, the disk 5000 feature indicia so that a user may, by looking between two adjacent tiles, identify when the disk is properly positioned. In one embodiment, the disk may feature teeth for a screwdriver (Phillips or flat head) so that the disk 5000 can be turned when in installed between pavers. A screw may be provided through the center of the disk for anchoring the disk to the pedestal. When the break-away portion of the disk is broken, bent or folded along the perforations, the locking disk suitably operates like the anchoring washer disclosed by U.S. Pat. No. 8,302,356 (issued Nov. 6, 2012), and that patent is hereby incorporated by reference. In a preferred embodiment, the disk 5000 is constructed of plastic.

Instead of a locking disk or anchoring pavers or tiles to the support surface of a pedestal, sliding attachment may be used for that purpose. FIGS. 22 through 25 respectively illustrate perspective, alternate perspective, top, and side views of an attachment for a paver support surface of a pedestal 6000. Referring to these figures, the attachment 6000 is generally a disc adapted for placement within an attachment receptacle of a pedestal's paver support surface whereby the disc and pedestal surface establish a paver support plane. The attachment 6000 is preferably retained within the receptacle via the locking means 6100 deflectively inserting into an aperture until its nibs snap into restrictive interface with the rim of the aperture for restricting the removal of the attachment 6000. As seen in FIGS. 22 through 25 the attachment features projections 6200 that operate to divide the surface 300 into evenly spaced paver receptacles whereby pavers provided to the pedestal may be uniformly oriented and spaced. For example, a paver may be supported above a subsurface via: positioning a pedestal on a subsurface; installing the attachment 6000 on the pedestal's support surface in the manner disclosed above, rotating the attachment 6000 until the orientation of the projections 6200 align with planned paver surface, and providing a corner of the paver to the surface support surface whereby the sides of the paver abut the projections 6200. See also FIG. 26 wherein the depicted pavers 10 are supported, spaced, and oriented by a component fitted with the attachment 6000. In a preferred embodiment, the spacers 6200 define a spacer cross 6400 for dividing the paver support surface of a pedestal into quadrants.

Figure 23:
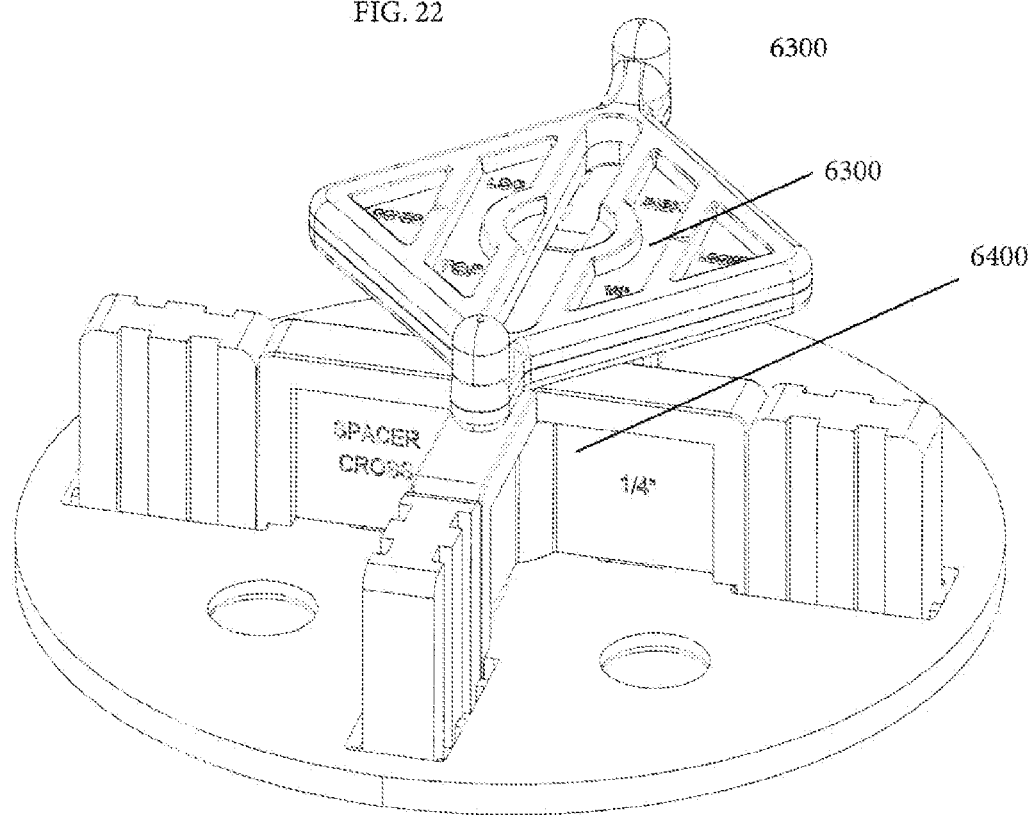
FIG. 23 is a view of a locking slider.
Figure 24:
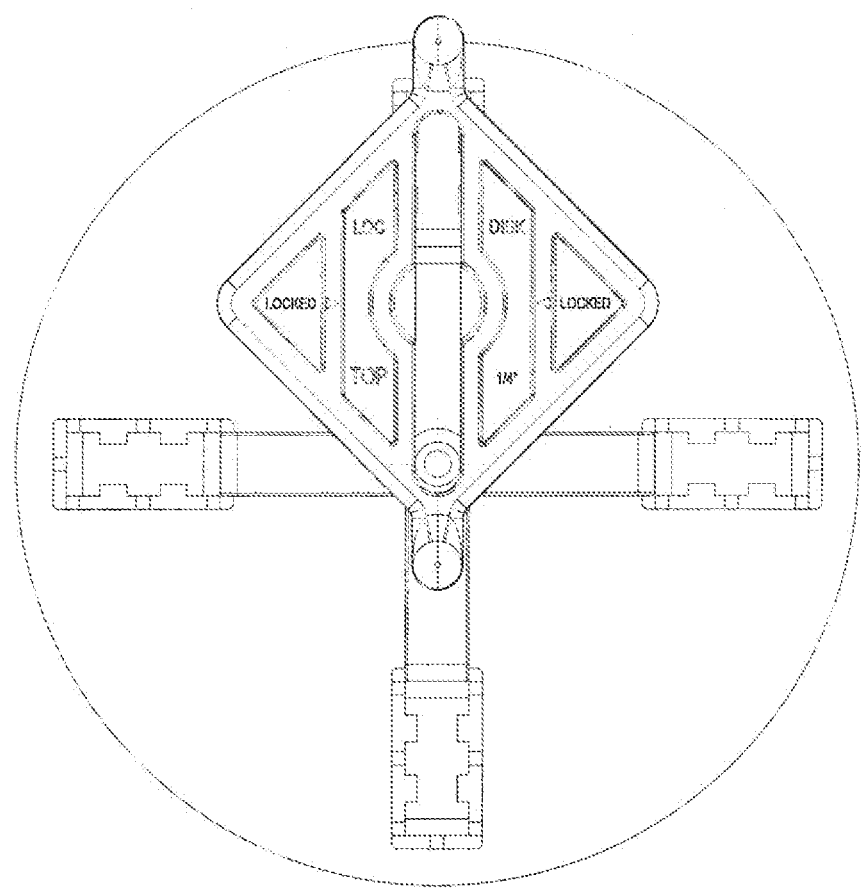
FIG. 24 is a view of a locking slider.
Figure 25:
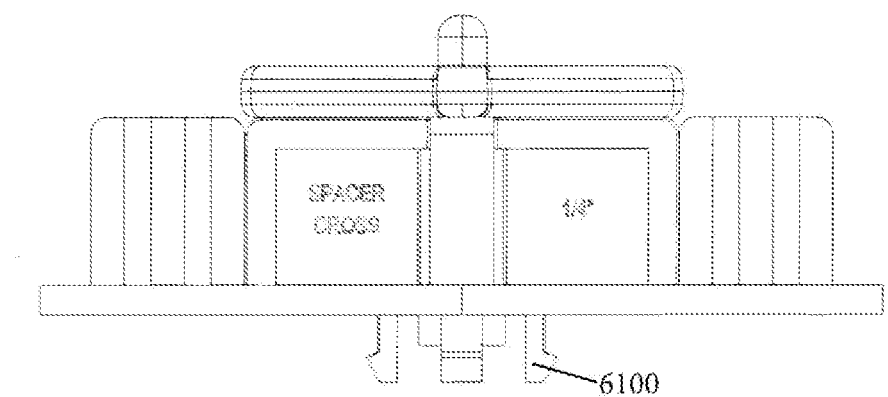
FIG. 25 is a view of a locking slider.
Figure 26:
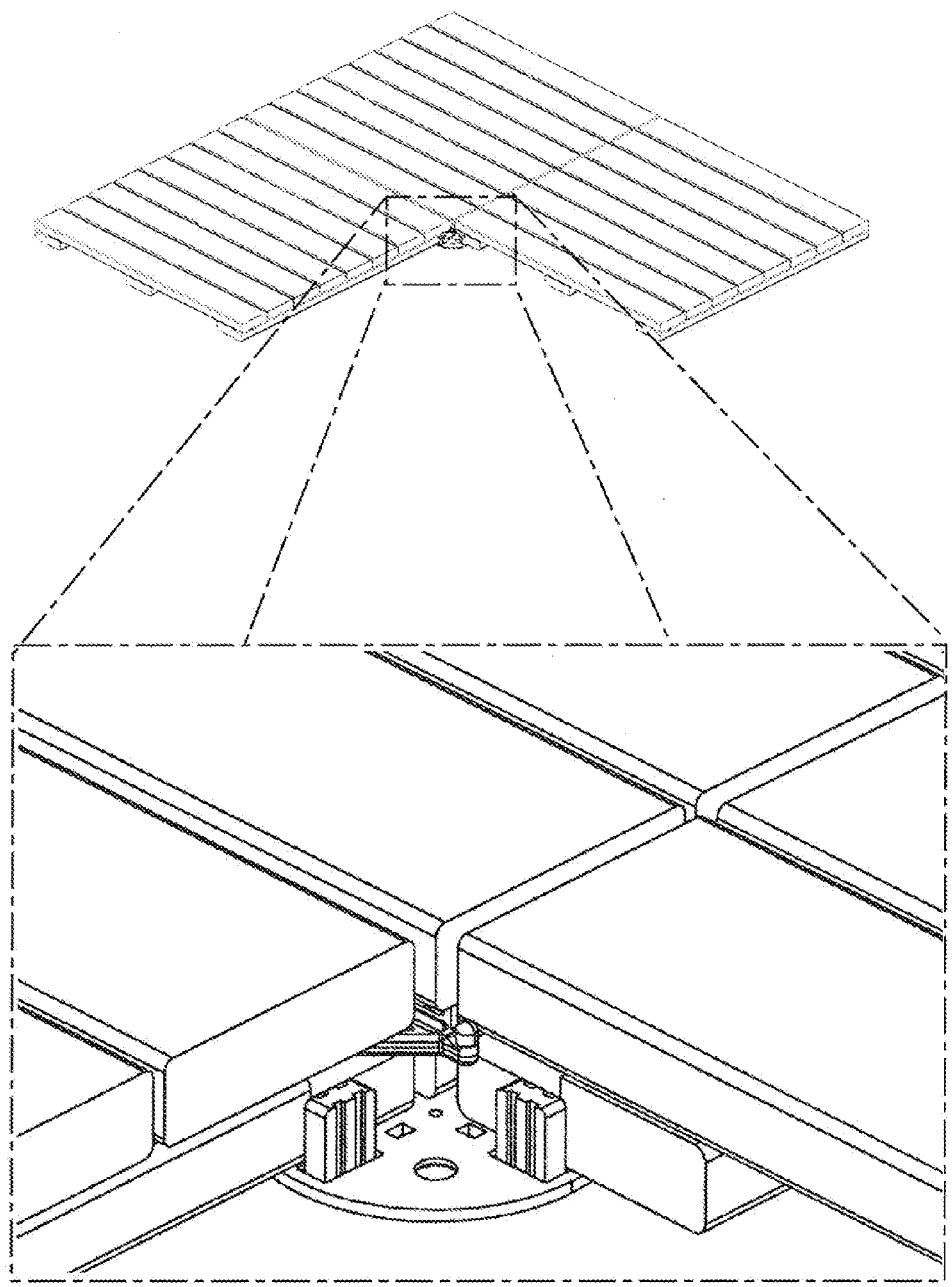
FIG. 26 is a view of a locking slider.

Referring now to FIG. 26, a slider 6300 may suitably be positioned on the projections 6200 so that the slider may suitably be provided to a slot in a paver corner whereby the paver is anchored to the pedestal. Wither reference to FIGS. 22 and 23, the slider 6300 may be slidable between three locations: (1) a first side of the spacer cross 6400 (FIG. 23); (2) the center of the spacer cross 6400 (FIG. 22); and (3) the opposite side of the spacer cross 6400 (opposite of FIG. 23). Referring again to FIG. 26, two pavers may be provided to the first side of the paver cross 6400, the slider slid into the first position, two pavers may be placed on the other side of the paver cross 6400 and the slider 6300 slid to the center position whereby the pavers are anchored to the pedestal (FIG. 26).

It should be noted that the dimensions of the projections 6200, slider 6300 and spacer cross 6400 will vary depending on the desired paver spacing for the planned paver surface. It should be noted: although the locking means is depicted as a projection with a nib for restrictive interaction with an aperture rim, any number of suitable locking means may be used. Such locking means will be known by those of skill in the art, and may include, but should not be limited to, snaps, buttons, bolts, screw and nut mechanisms, and the like (e.g., a screw projecting downward for threaded entry into the aperture 117). Such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated. Finally, it should further be noted that, the dimensions of the attachment 6000 will vary with the size of the paver to be retained by the pedestal. In particular, the height of the projections may vary depending on the thickness of a paver, e.g. in a range of about 0 to 20 inches.

An apparatus comprised of an above disclosed component may be used to compensate for variations in the slope of the undersurface with regard to the leveling of a paver surface. It should be noted that FIGS. 1 through 26 and the associated description are of illustrative importance only. In other words, the depiction and descriptions of the present invention should not be construed as limiting of the subject matter in this application. Additional modifications may become apparent to one skilled in the art after reading this disclosure.

The following disclosure describes embodiments of assemblies of components for facilitating the elevated and leveled placement of a paver array onto a subsurface. Suitably, the disclosed assemblies may be apparatus for supporting a paver surface or may interact with assembly components for establishing an elevated and slope adjusted surface. Yet still, the assemblies may suitably incorporate a riser to produce an apparatus for elevating and leveling a paver surface. The disclosed assemblies may receive attachments for orienting and spacing an array of pavers to be supported by the assemblage. Other embodiments of the present disclosure may be methods of establishing a paver surface using the assemblies. The details of the preferable assemblies are best disclosed by reference to FIGS. 27A through 55D.

Figure 27A:
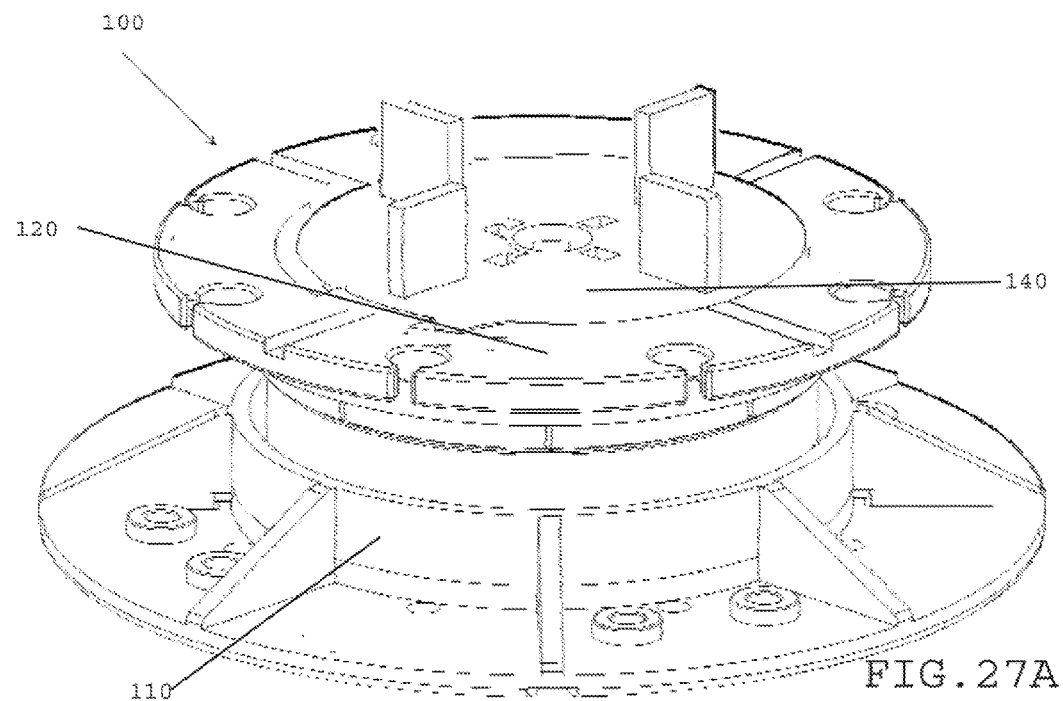
FIG. 27A is a perspective view of an assembly 100.
Figure 27B:
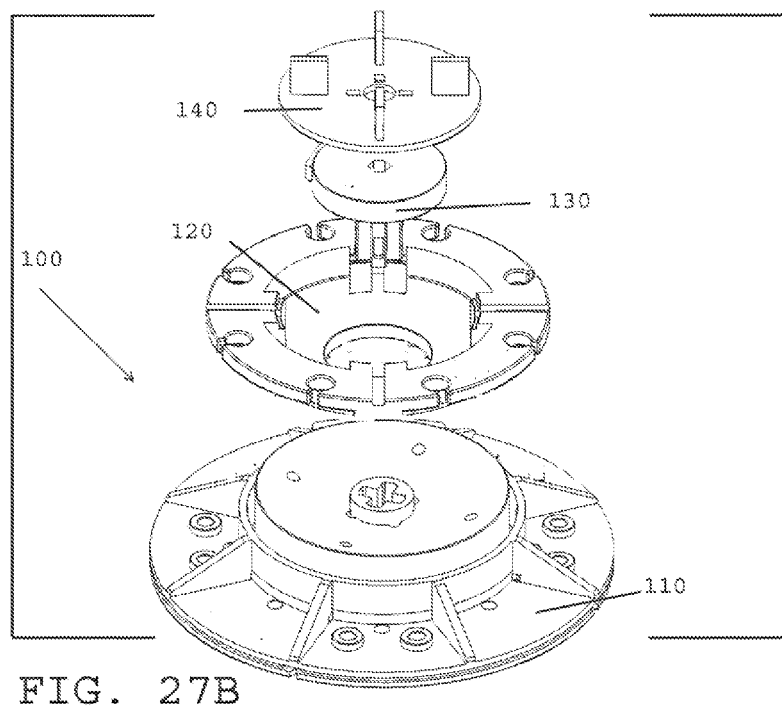
FIG. 27B is an exploded view of the assembly 100.

FIGS. 27A and 27B depict a first embodiment of an assembly 100 for facilitating the elevated and leveled placement of a paver array onto a substrate. FIG. 27A is a perspective view of the assembly 100 and FIG. 27B is an exploded view of the same. As seen in the figures the assembly 100 comprises: a base 110; a cap 120; a pin 130; and, a tile spacer 140.

FIGS. 28A through 28E depict different views of a preferable embodiment of the base 110 component of the apparatus 100 depicted in FIGS. 27A and 27B. Specifically, FIGS. 28A through 28E respectively depict a top perspective, bottom perspective, top plan, bottom plan, and side profile view of the base 110. As can be seen in the referenced drawings, the base is generally a truncated cylinder and may comprise: a foot 111; a support cylinder 112; a riser socket 113 around the cylinder; a concave surface 114 defining the top of the cylinder 112; and a key socket 115 through the concave surface 114 along the axis of the cylinder 112.

Figure 28A:
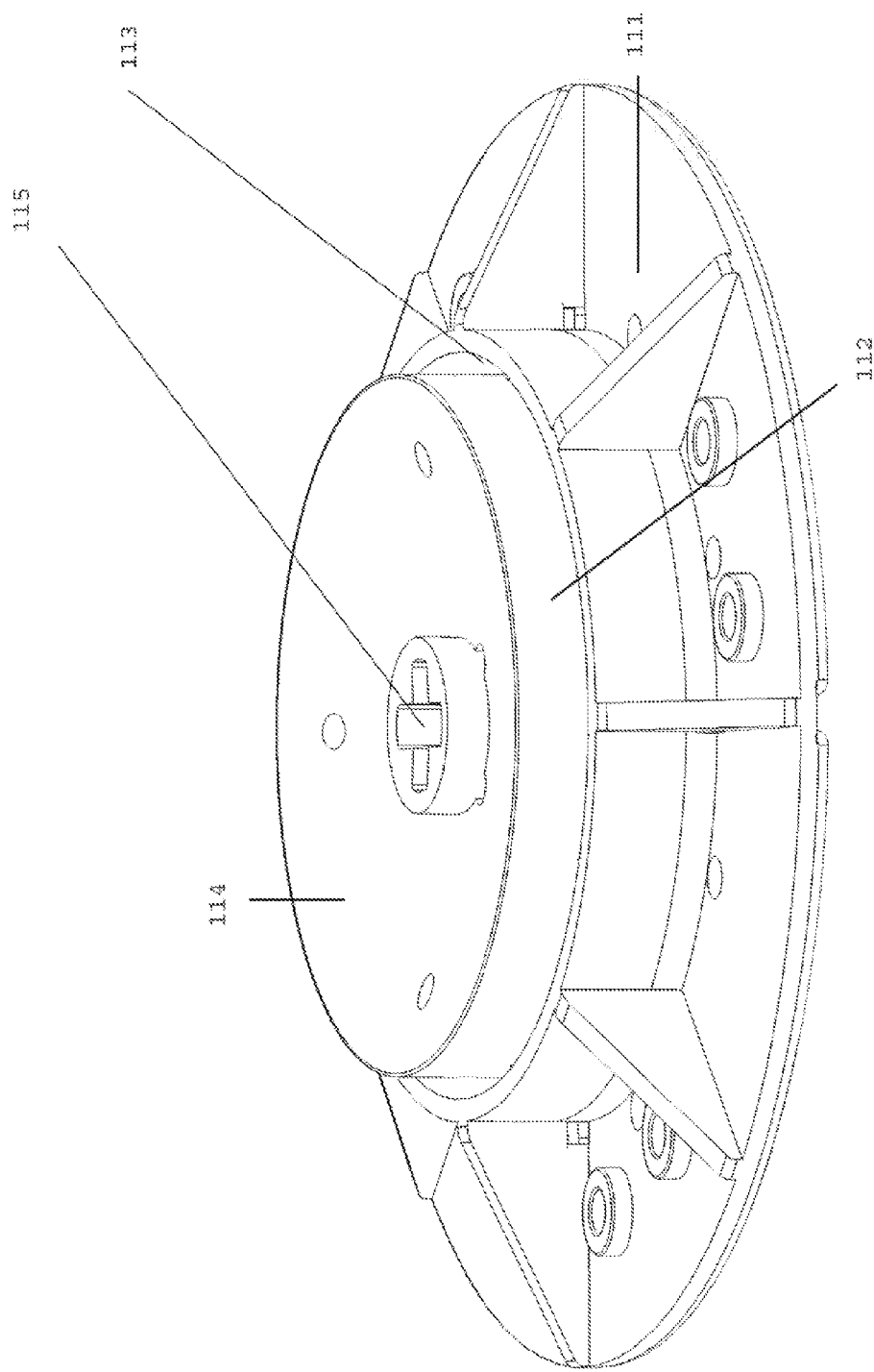
FIG. 28A is a top perspective view of a base 110.
Figure 28B:
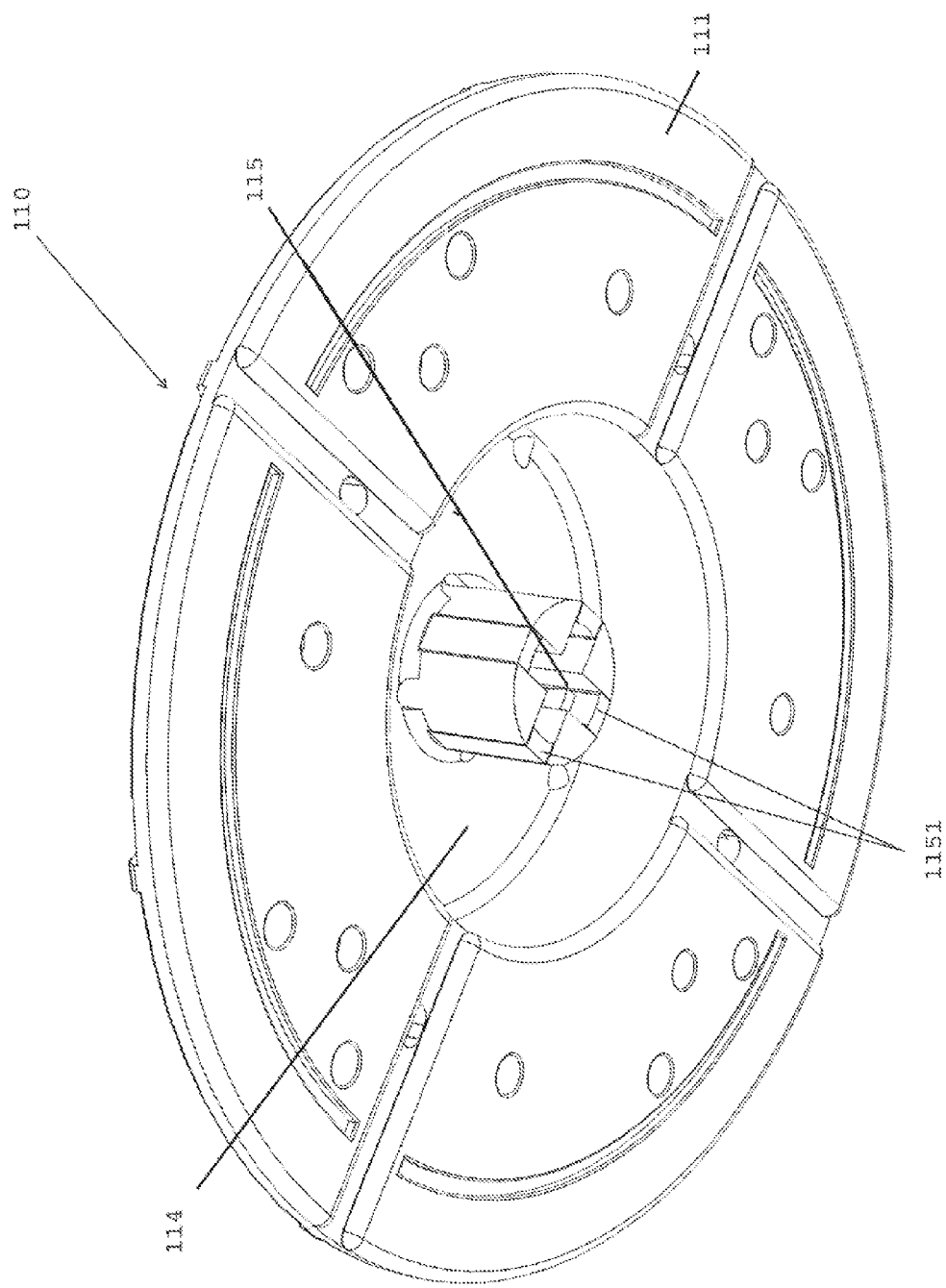
FIG. 28B is a bottom perspective view of the base 110.
Figure 28C:
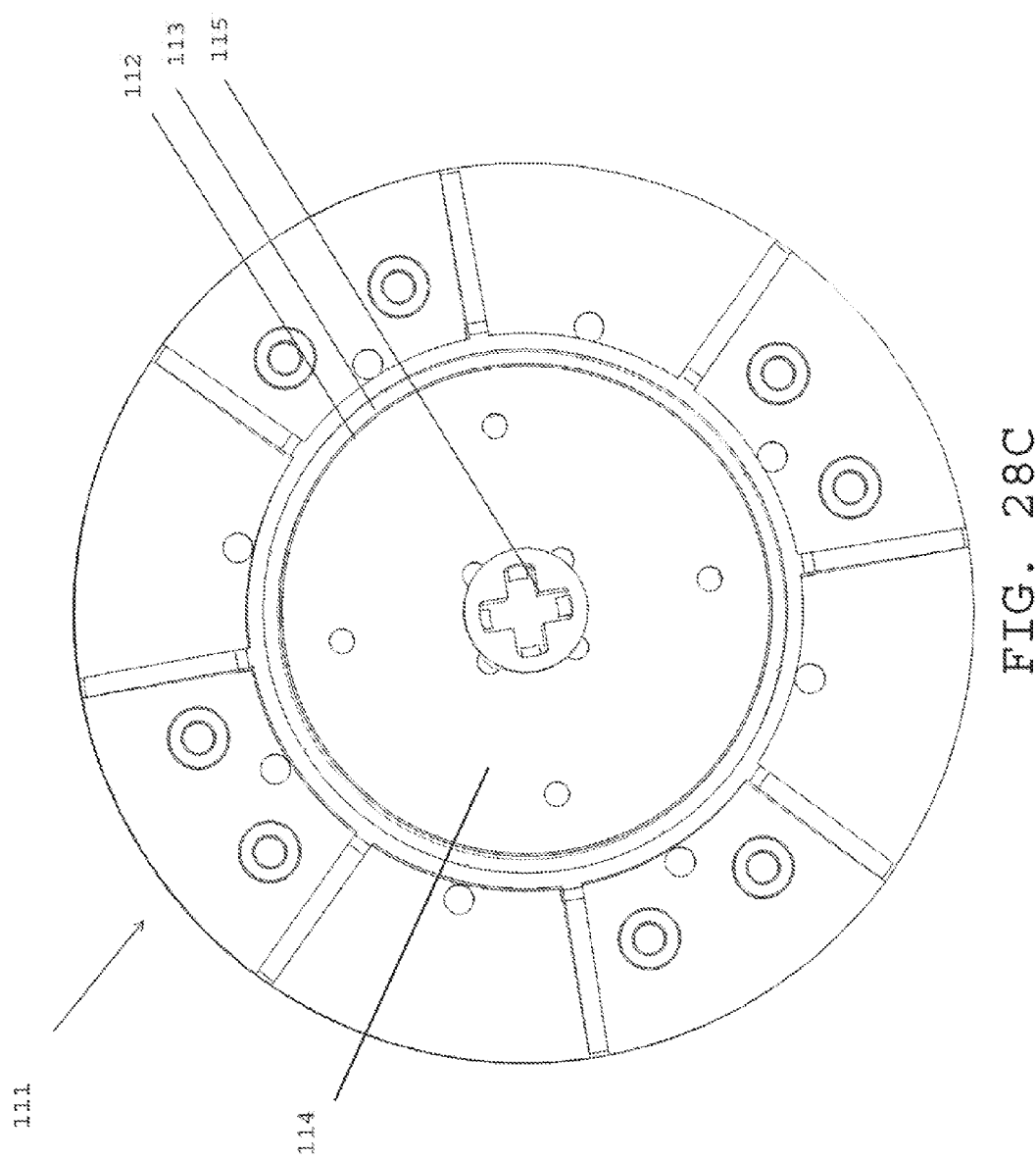
FIG. 28C is a top plan view of the base 110.

FIGS. 29A through 29E depict different views of a preferable embodiment of the cap 120 component of the apparatus 100 depicted in FIGS. 27A and 28B. Specifically, FIGS. 29A through 29E respectively depict a top perspective, bottom perspective, top plan, bottom plan, and side profile view of the cap 120. As can be seen in the referenced drawings, the cap 120 is generally a disc with a convex surface on its bottom side. Still referring to FIGS. 29A through 29E, the cap 120 may comprise: a paver support surface 121; a cylinder 122 extending from the bottom of the paver support surface 121; a convex surface 123 defining the bottom of the cylinder 122; a tile spacer receptacle 124 that is coaxial to the tile support surface 121; and, a key socket access hole 125 through the convex surface 114 along the axis of the cylinder 122.

Figure 30A:
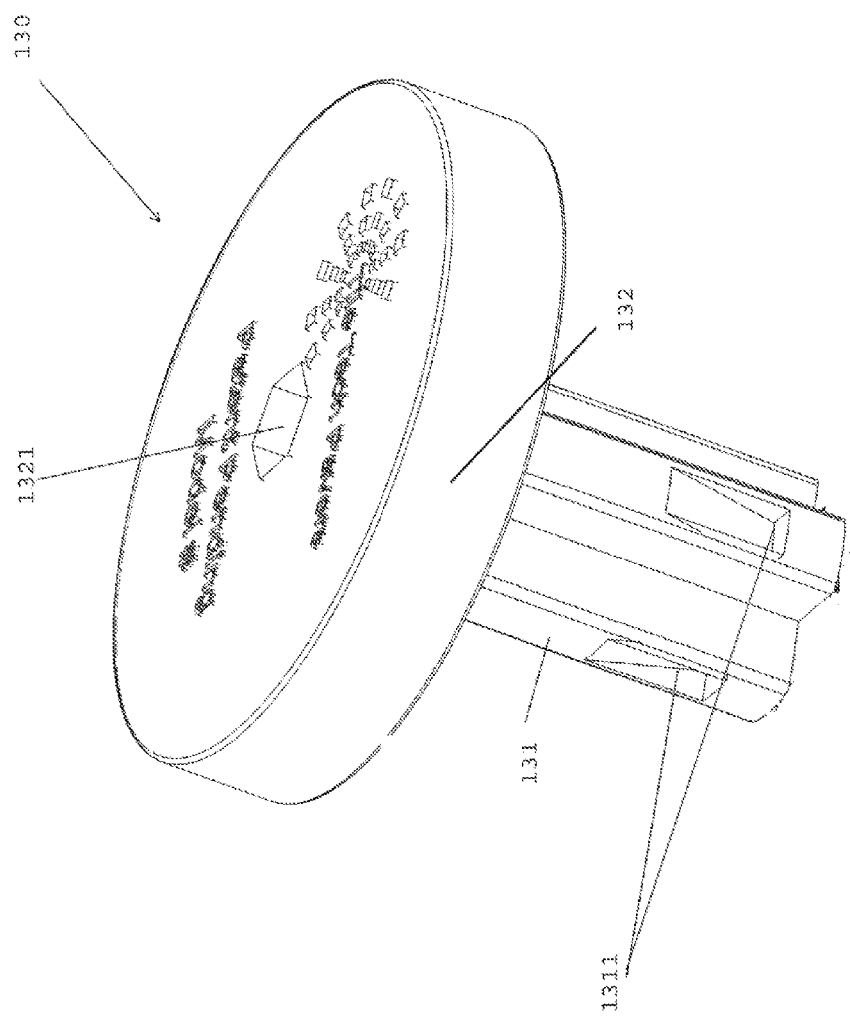
FIG. 30A is a top perspective view of a key 130.
Figure 30B:
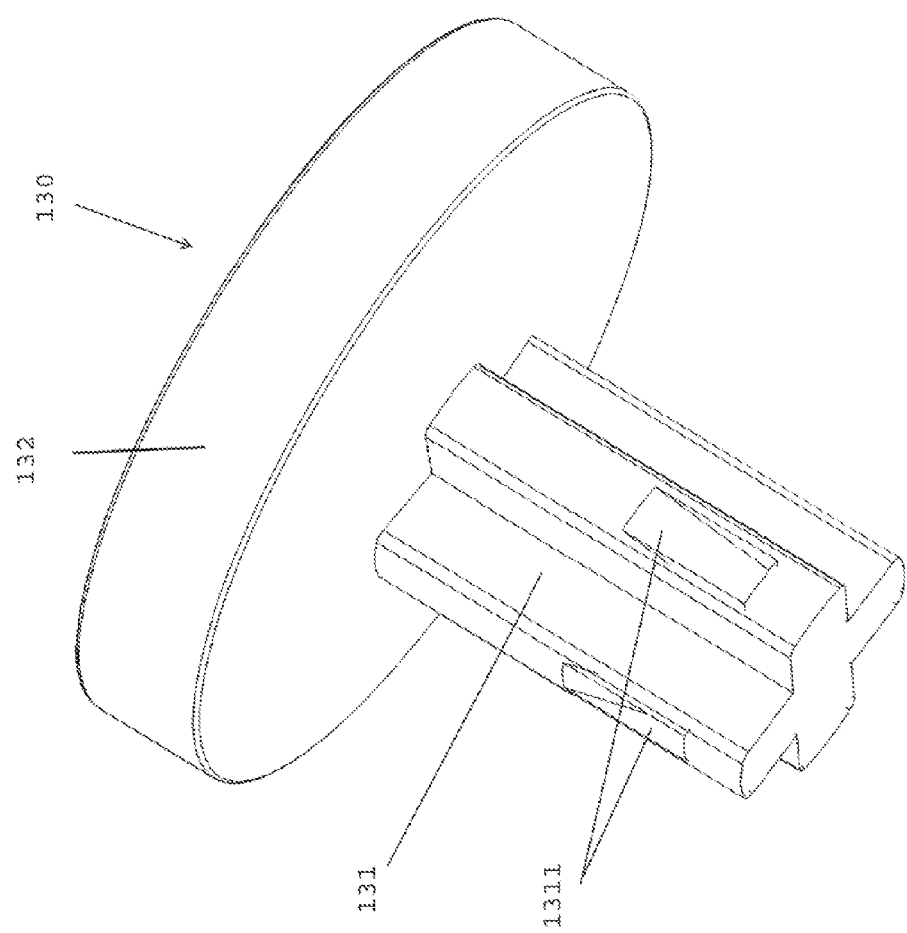
FIG. 30B is a bottom perspective view of the key 130.

FIGS. 4A through 4C depict different views of a preferable embodiment of the key 1300 component of the apparatus 1000 depicted in FIGS. 1A and 1B. Specifically, FIGS. 30A through 30C respectively depict a top perspective, bottom perspective, and side profile view of the key 130. As can be seen in the referenced drawings, the key 130 is generally an elongated x-shaped member 131 with a flange 132. Referring to FIG. 30A, the elongated x-shaped member 131 features locking lugs 131 at its lower end and the flange features a coaxial wrench socket 132.

FIGS. 31A through 31E depict different views of a preferable embodiment of the tile spacer 140 component of the apparatus 100 depicted in FIGS. 27A and 27B. Specifically, FIGS. 31A through 31E respectively depict a top perspective, bottom perspective, top plan, bottom plan, and side profile view of the spacer 140. As can be seen FIG. 1, the spacer 140 is generally a disc that features projections 141 that operate to divide the paver support surface 123 of the cap into evenly spaced paver receptacles whereby pavers provided to the assembly 100 may be uniformly oriented and spaced.

FIG. 27B shows a preferable method for assembling the assembly 100. First, the base 110 may be positioned so that the bottom side of the foot 111 interfaces with a subsurface and wherein the cylinder 112 extends outwardly and transversely relative to a plane of the subsurface. Second, the cap 120 may be positioned on top of the cylinder 112 of the base 110 so that the concave surface 114 of the base interfaces with the convex surface 123 of the cap 120 and wherein the key socket 115 of the base 100 is located within the key socket receptacle 125. Third, the x-shaped member 131 of the key 130 may be inserted through the key socket receptacle 125 and into the key socket 115 until the locking teeth 115 inside the key socket 115 interact with the locking lug 131 of the key 131 so that: (1) the key is retained inside the key socket 115; and (2) the cap 120 is movably (e.g., slidably and/or rotatably) retained between the flange 132 of the key 132 and the concave surface 114 of the base 110. Finally, the tile spacer 140 may be provided to the spacer receptacle 124 of the cap 120 whereby the spacer 140 surface and the support surface 123 of the cap 120 generally form a plane.

Referring to FIG. 27B, a paver may be supported above a subsurface via: positioning an assembly 100, foot 111 down, on the subsurface; rotating the cap 120 around the key 130 until the orientation of the projections 141 of the spacer 140 align with a planned paver surface; and providing a corner of the paver to the paver support surface 123 whereby the sides of the paver abut the projections 141. See FIGS. 55A-D wherein the depicted pavers 10 are supported, spaced, and oriented by an assembly 100 with projections 141.

It should be noted that although the spacer 140 is depicted with four projections 141 for dividing the surface 123 into quadrants, the attachment may feature less or more projections to accommodate the orientation and spacing of non-square pavers. It should further be noted that the projections 141 may feature perforations (not shown) whereby the projections 141 may be individually removed from the spacer 140. For instance, two of the four projections 141 may be removed from the attachment whereby the side of a square paver, instead of its corner, may be received by the paver support surface 124 of the cap 120. Finally: the dimensions of the assembly 100 will vary with the size of the paver to be retained by the paver support surface 123. In particular, the height of the projections may vary depending on the thickness of a paver, e.g. in a range of about 0 to 20 inches.

It should be noted that, now, and throughout the application the terms "top" and "bottom" or "lower" and "upper", or any other orientation defining term should in no way be construed as limiting of the possible orientations of the assembly 100 (i.e., the assembly may be positioned sideways, or in reversed vertical orientations even though the specification refers to a "top" and "bottom" parts).

Figure 28D:
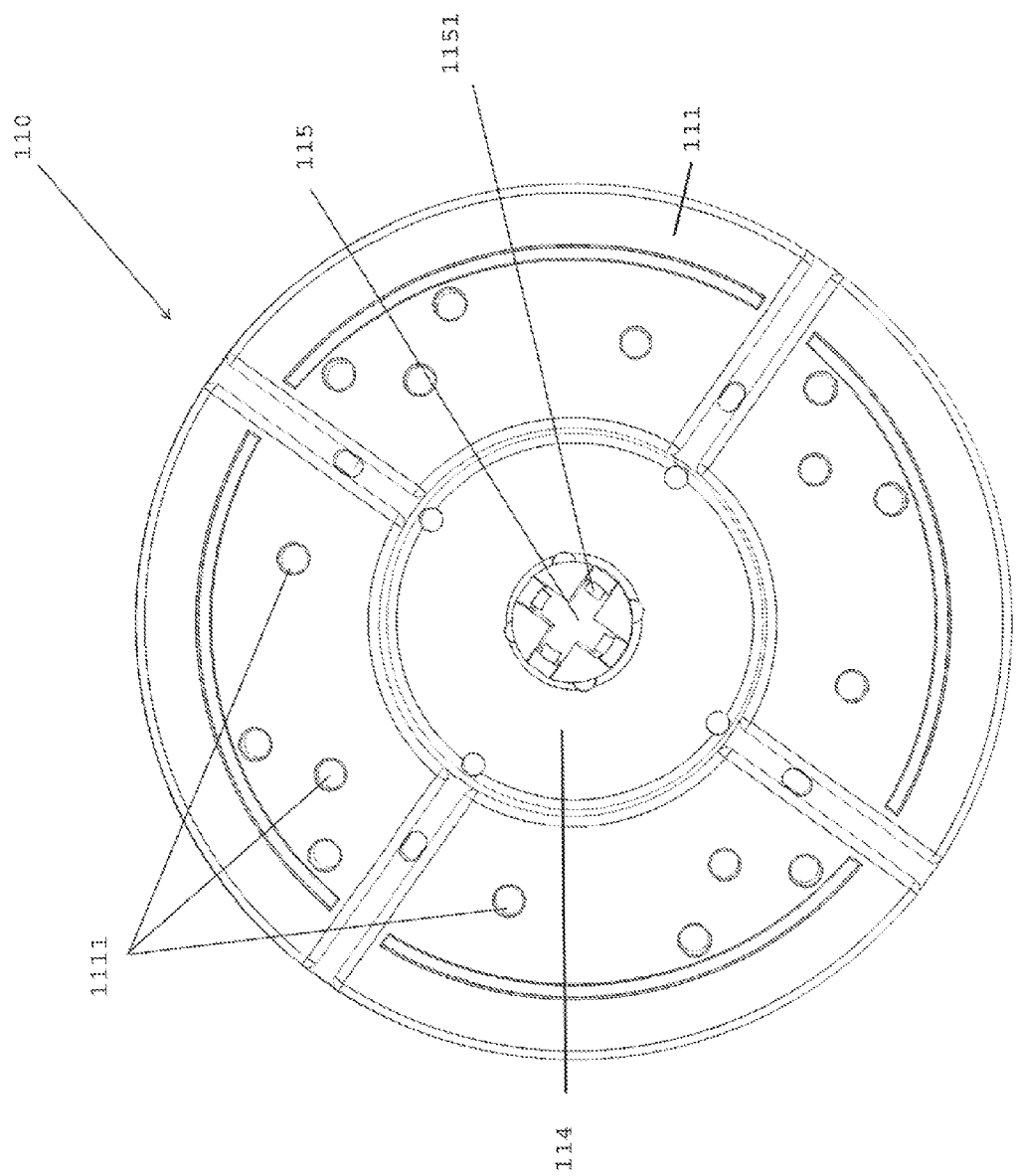
FIG. 28D is a bottom plan view of the base 110.
Figure 28E:
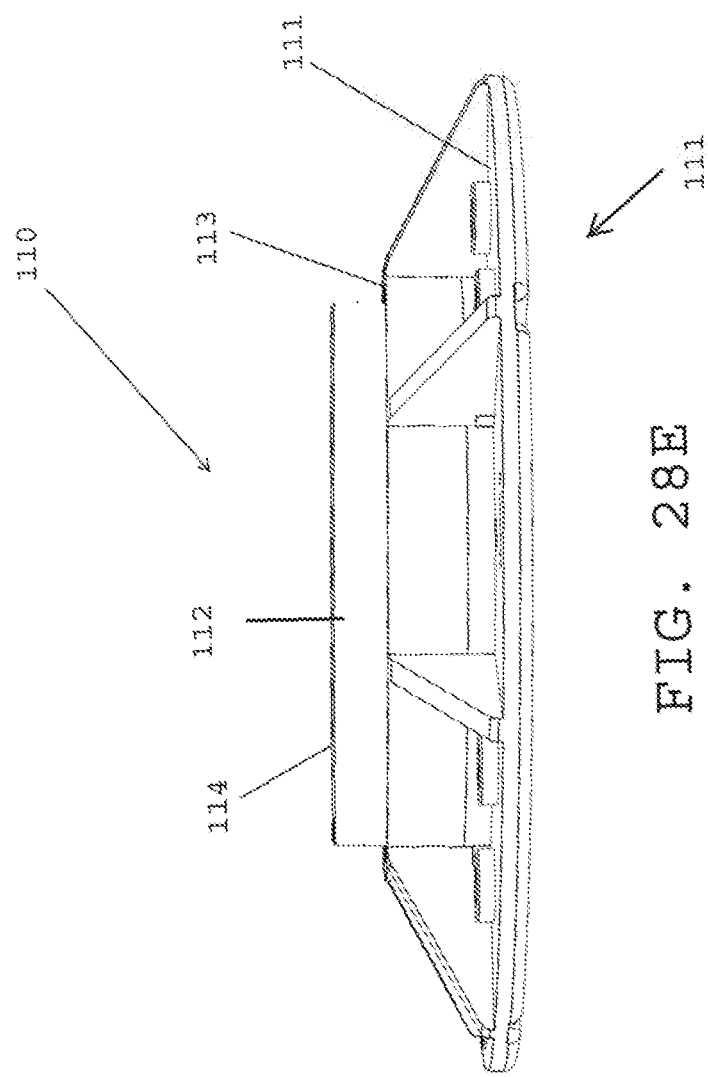
FIG. 28E is a side profile view of the base 110.
Figure 29A:
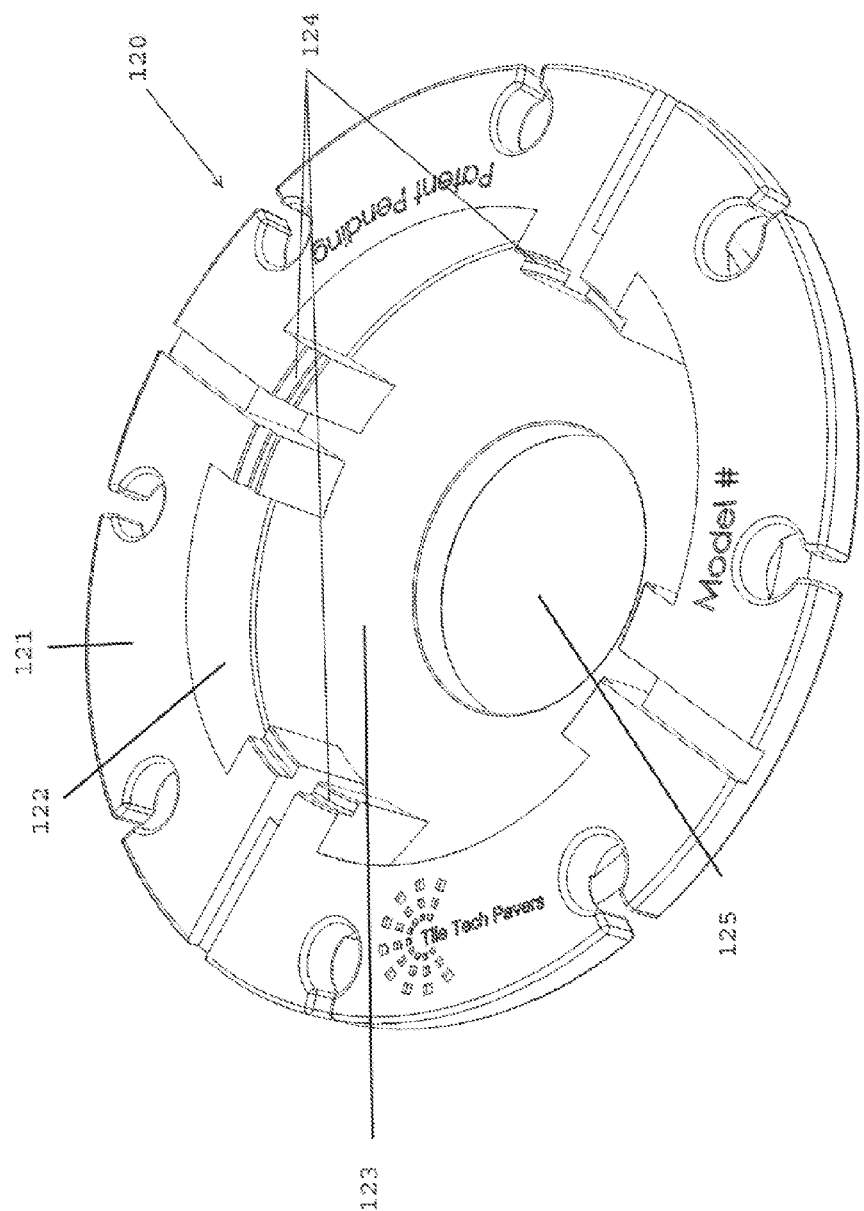
FIG. 29A is a top perspective view of a cap 120.
Figure 29B:
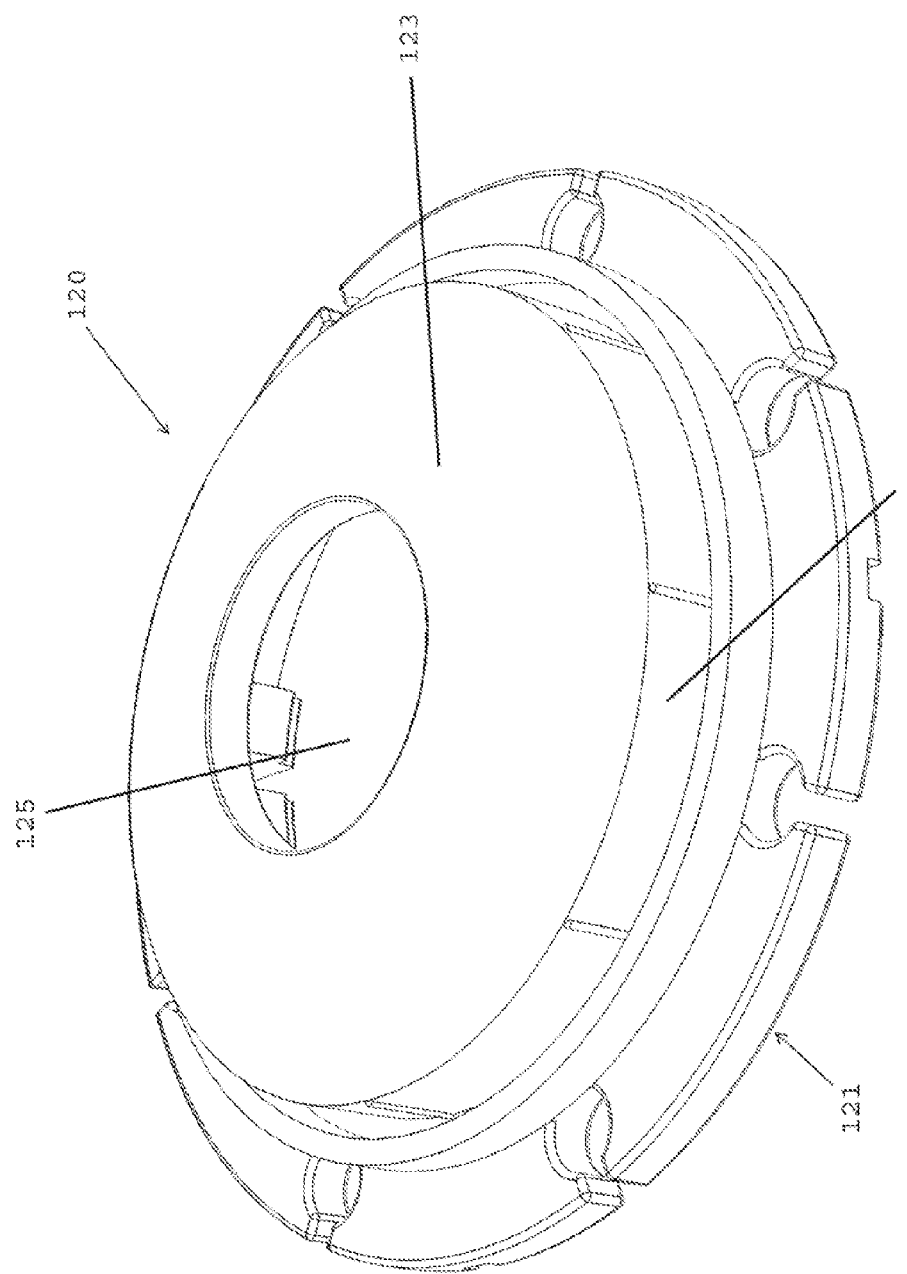
FIG. 29B is a bottom perspective view of the cap 120.
Figure 29C:
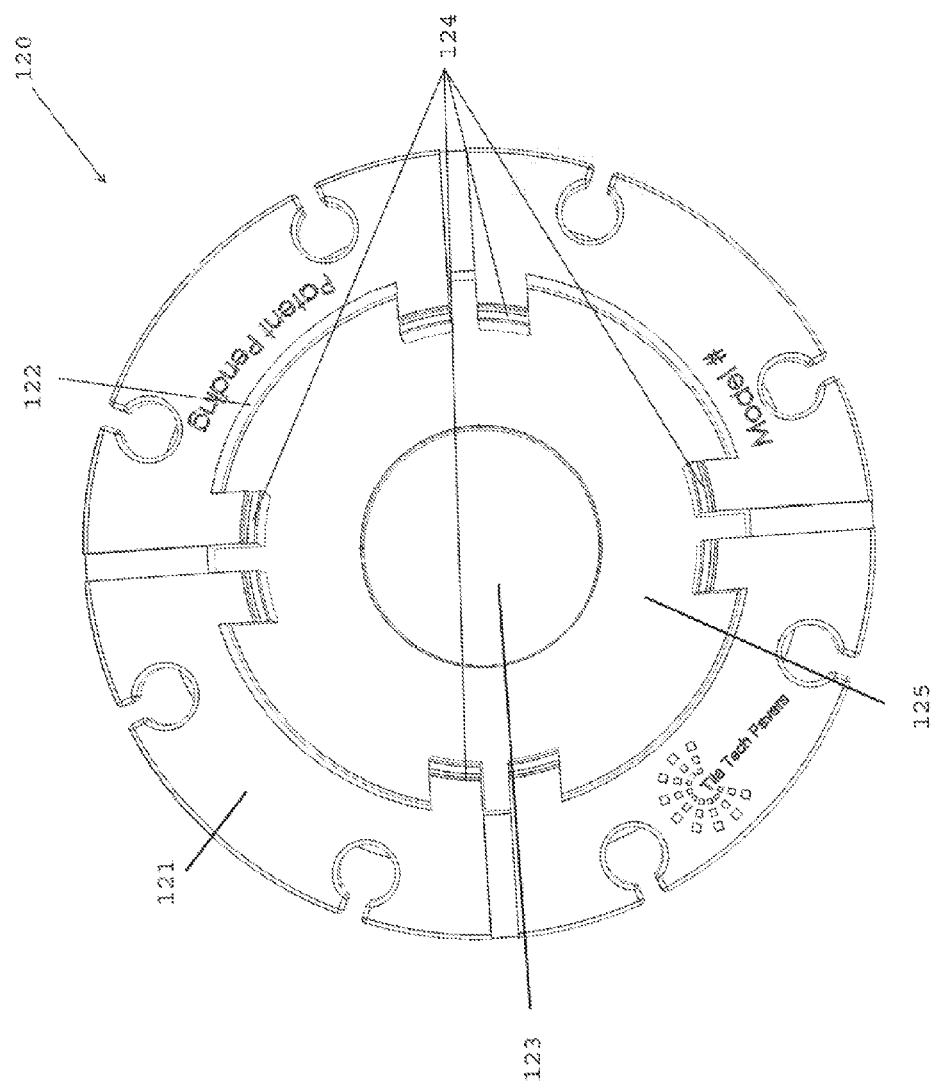
FIG. 29C is a top plan view of the cap 120.
Figure 29D:
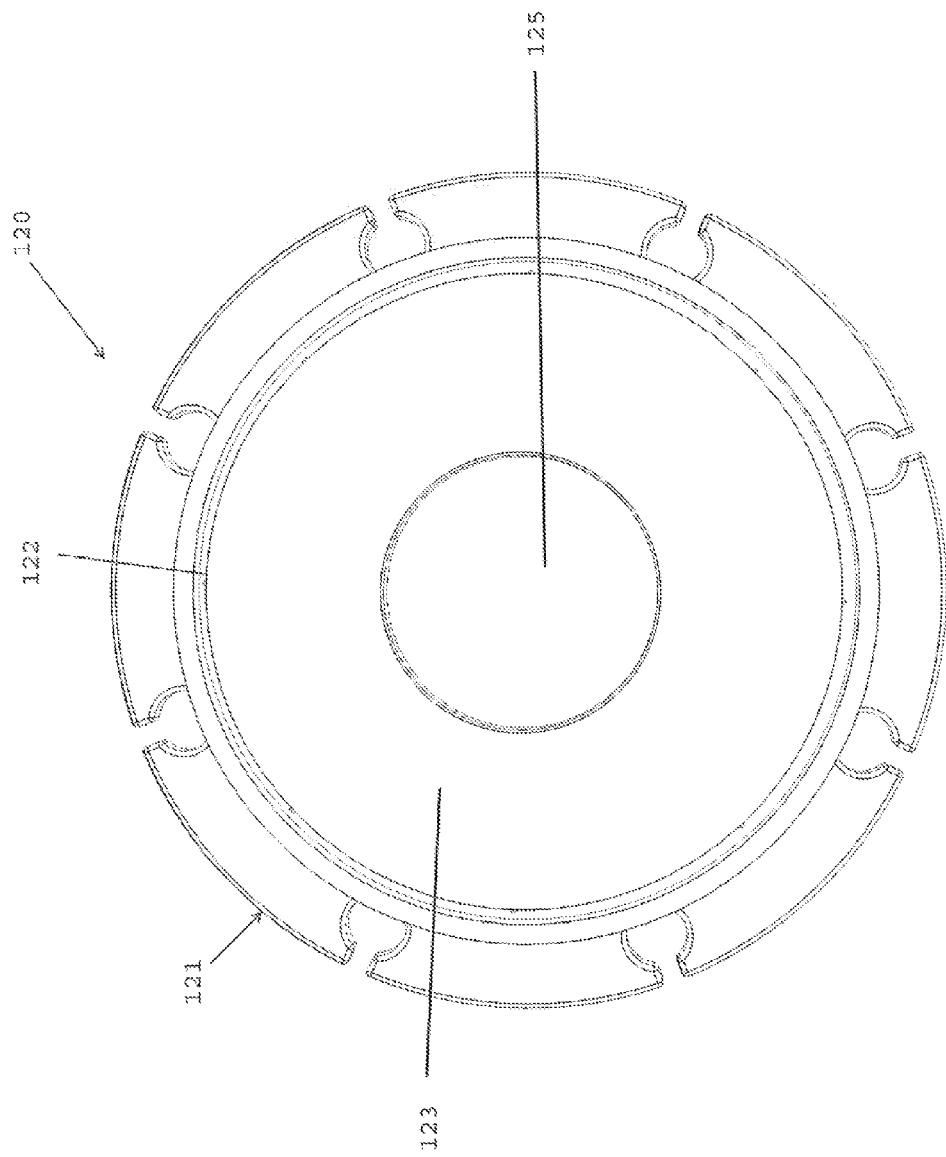
FIG. 29D is a bottom plan view of the cap 120.
Figure 31A:
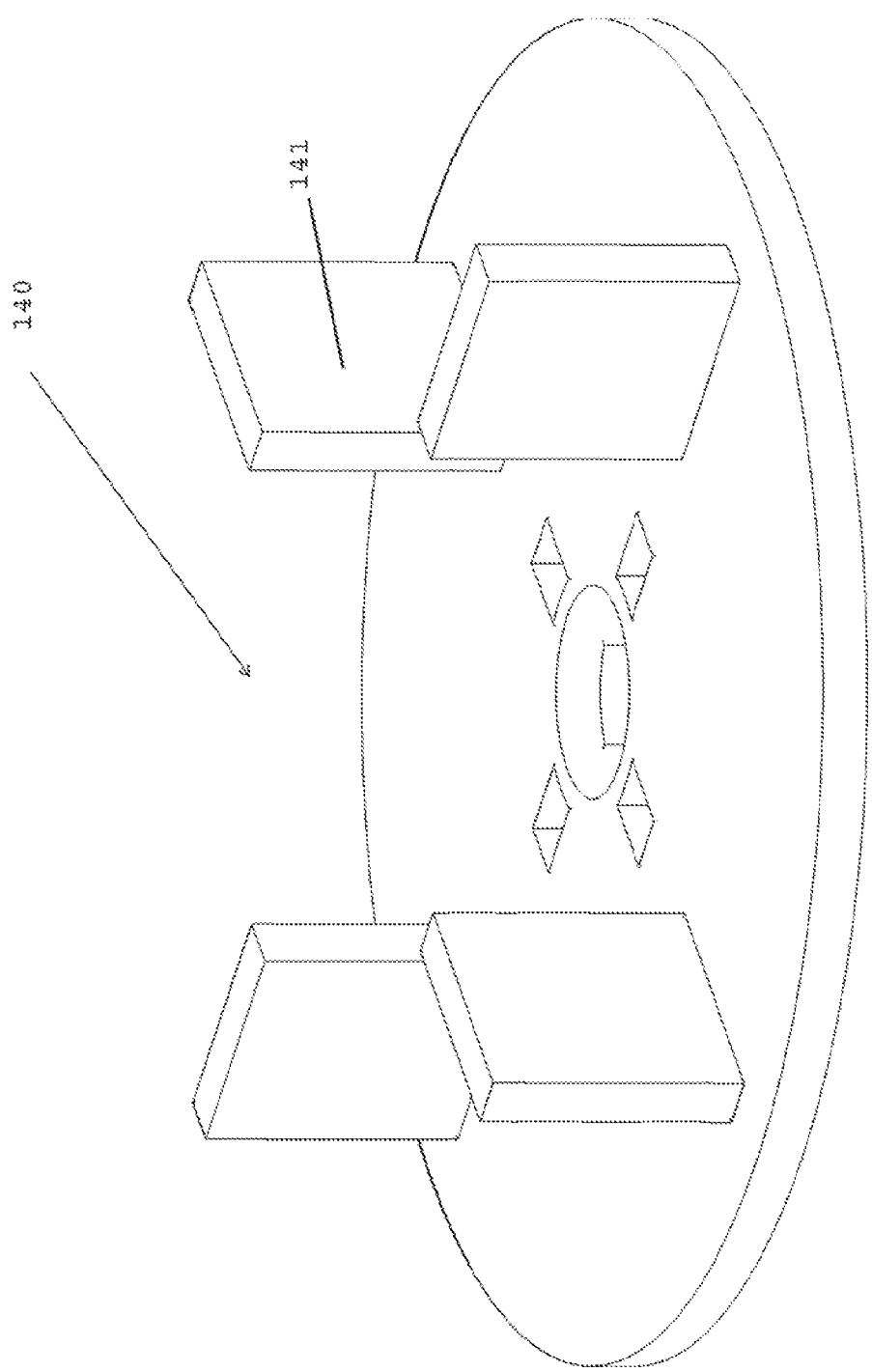
FIG. 31A is a top perspective view of a spacer 140.
Figure 31B:
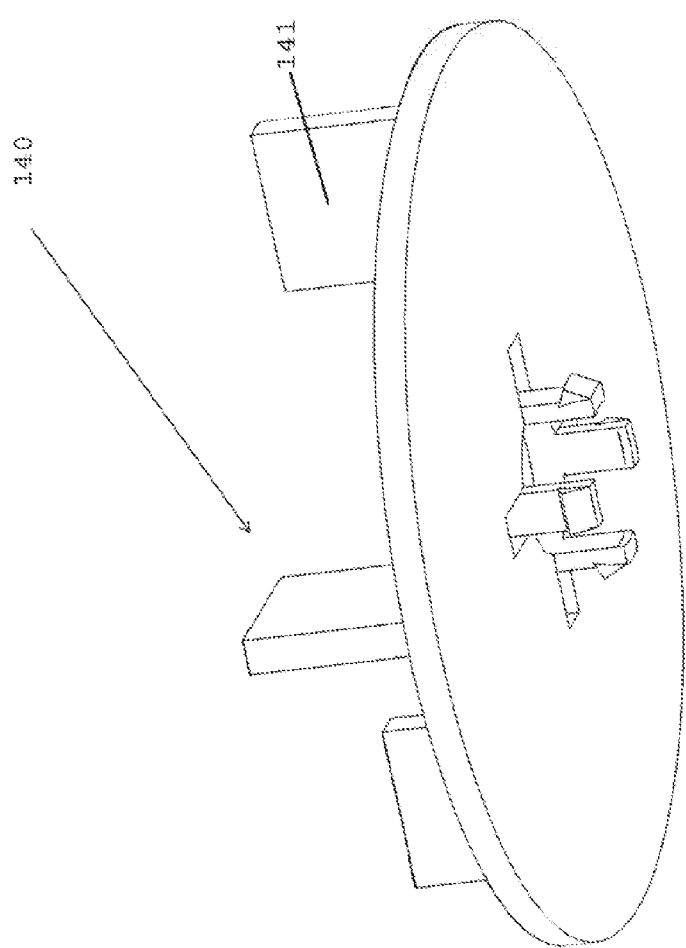
FIG. 31B is a bottom perspective view of the spacer 140.
Figure 31C:
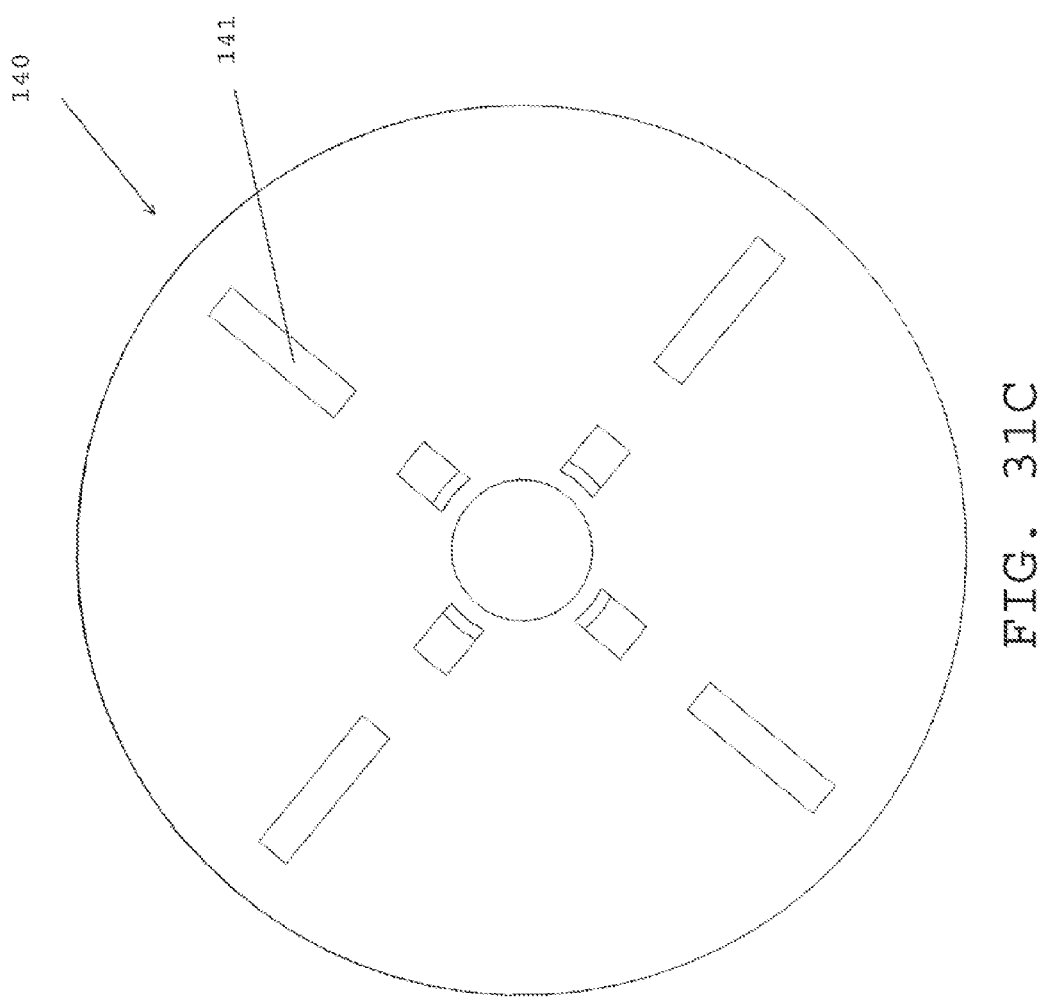
FIG. 31C is a top plan view of the spacer 140.
Figure 31D:
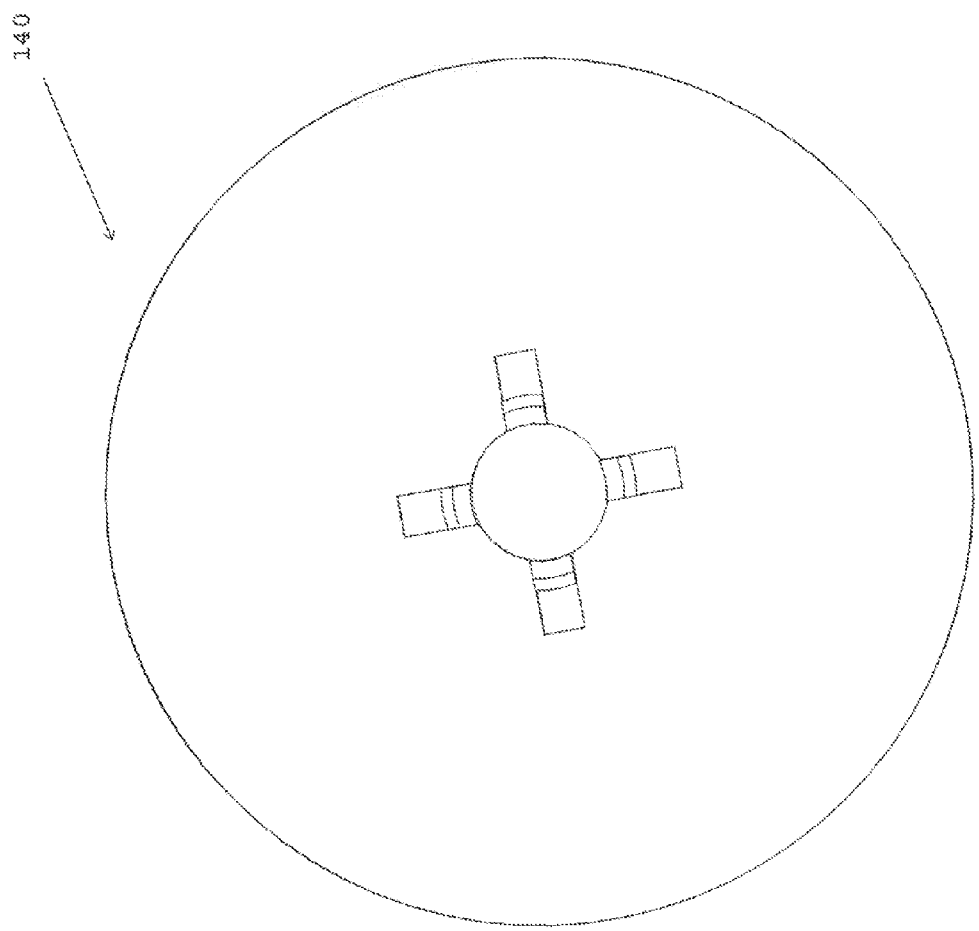
FIG. 31D is a bottom plan view of the spacer 140.
Figure 31E:
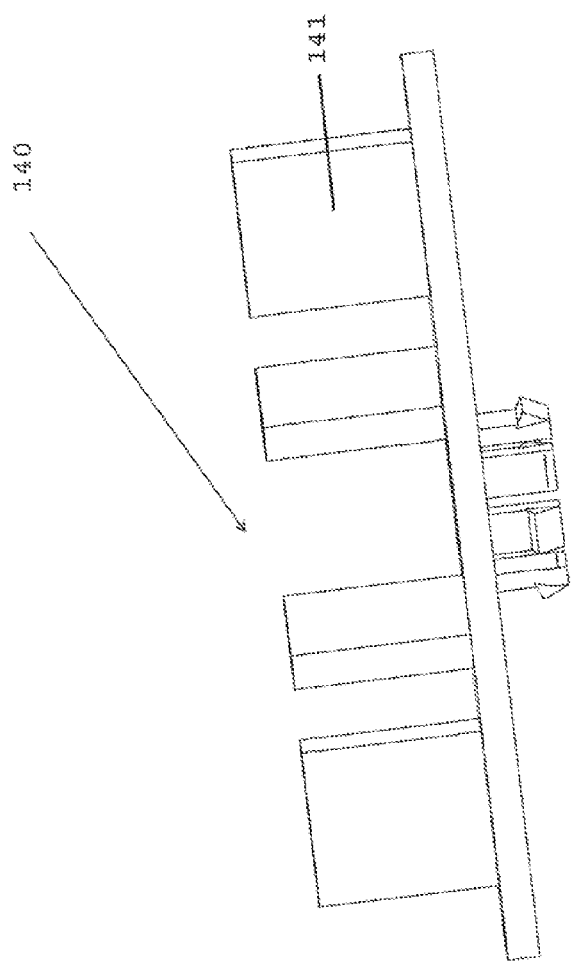
FIG. 31E is a side profile view of the spacer 140.
Figure 32B:
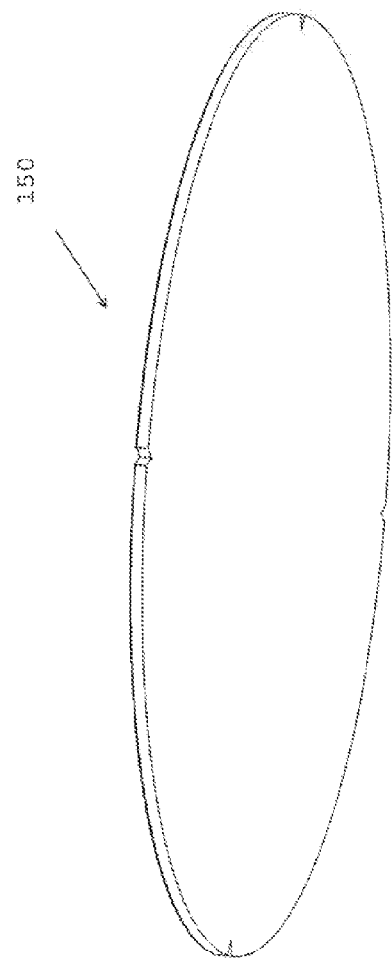
FIG. 32B is a bottom perspective view of the buffer 150.
Figure 32D:
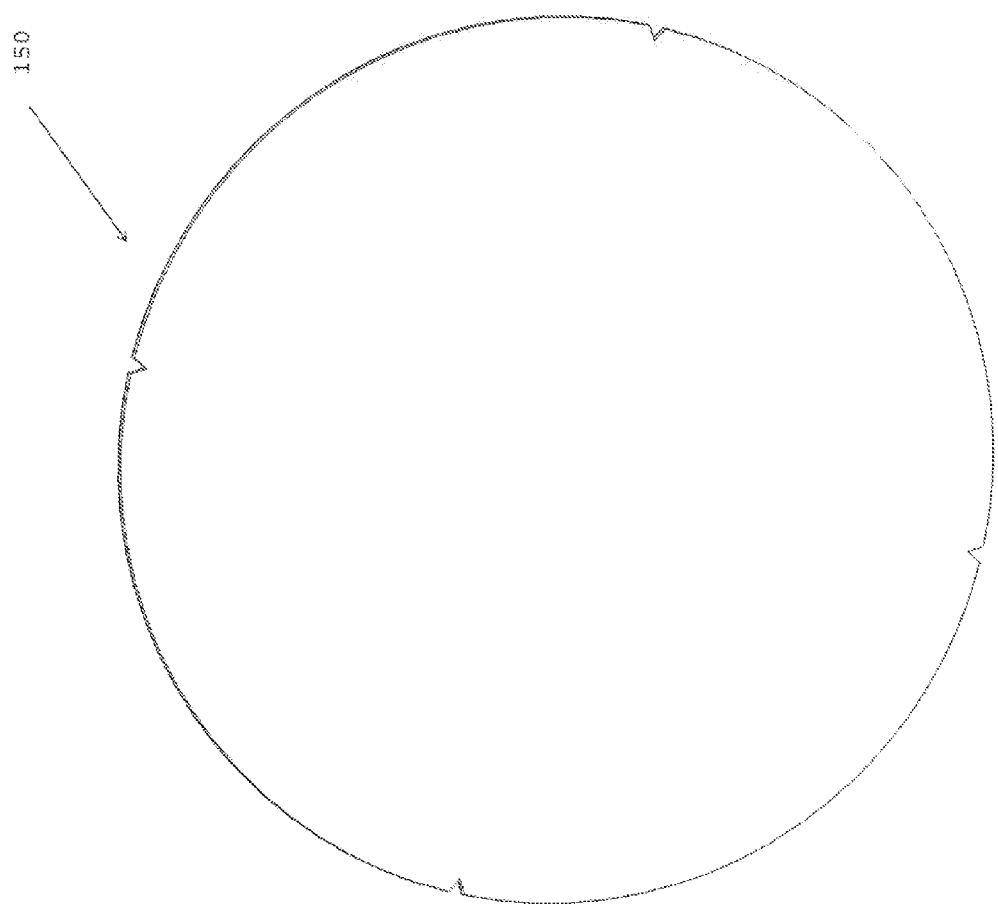
FIG. 32D is a bottom plan view of the buffer 150.

Referring still to FIG. 27A-B, the foot 111 of is adapted to support the assembly 100 on a substrate or subsurface. This said, there may be instances where the substrate may be sensitive and require a larger footprint than that provided by the foot 111. For instance, the substrate may feature a waterproofing means that may be punctured by the weight of a paver on the assembly 100. In such a circumstance, the foot print of the foot 1110 may be supplemented with a buffer 150 as best depicted in FIG. 31A, through 31E, which respectively depict a top perspective, bottom perspective, top plan, bottom plan, and side profile view of the buffer 150. Referring to FIGS. 32A and 32E, the buffer 150 may generally be a disc with an upward projection 151 of slightly larger plan than the plan of foot 111 of the assembly whereby the foot 111 may be retained therein and where the disc of the buffer 150 distributes the footprint of the assembly 100 over a wider area. In one embodiment, the underside of the foot 111, as seen in FIG. 28D, features tenons 111 which may cooperate with mortise 152, shown in FIG. 32A, so that the assembly may be positioned on the buffer 150 with greater stability. Other features of the buffer 150 will be set forth in greater detail below.

Figure 33:
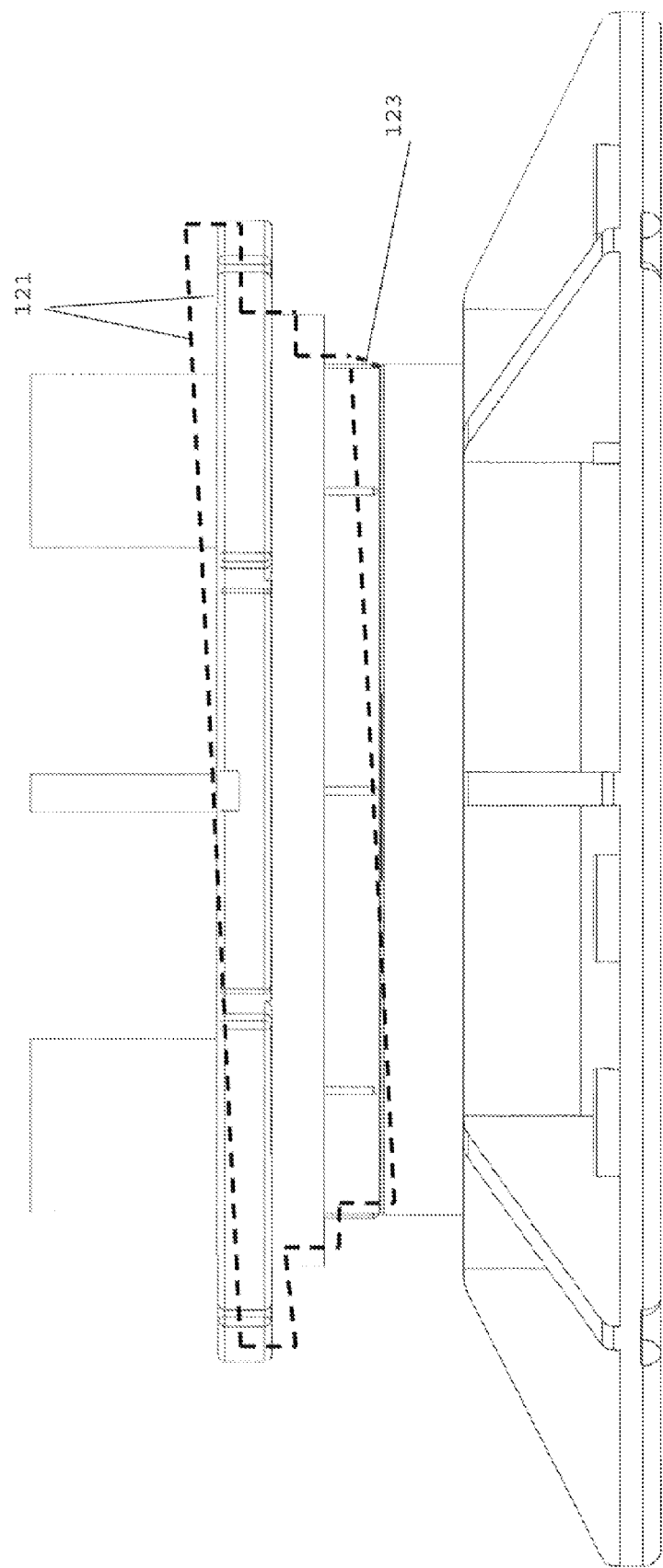
FIG. 33 depicts a side view of the assembly 100 and illustrates one mode establishing a leveled surface.
Figure 35B:
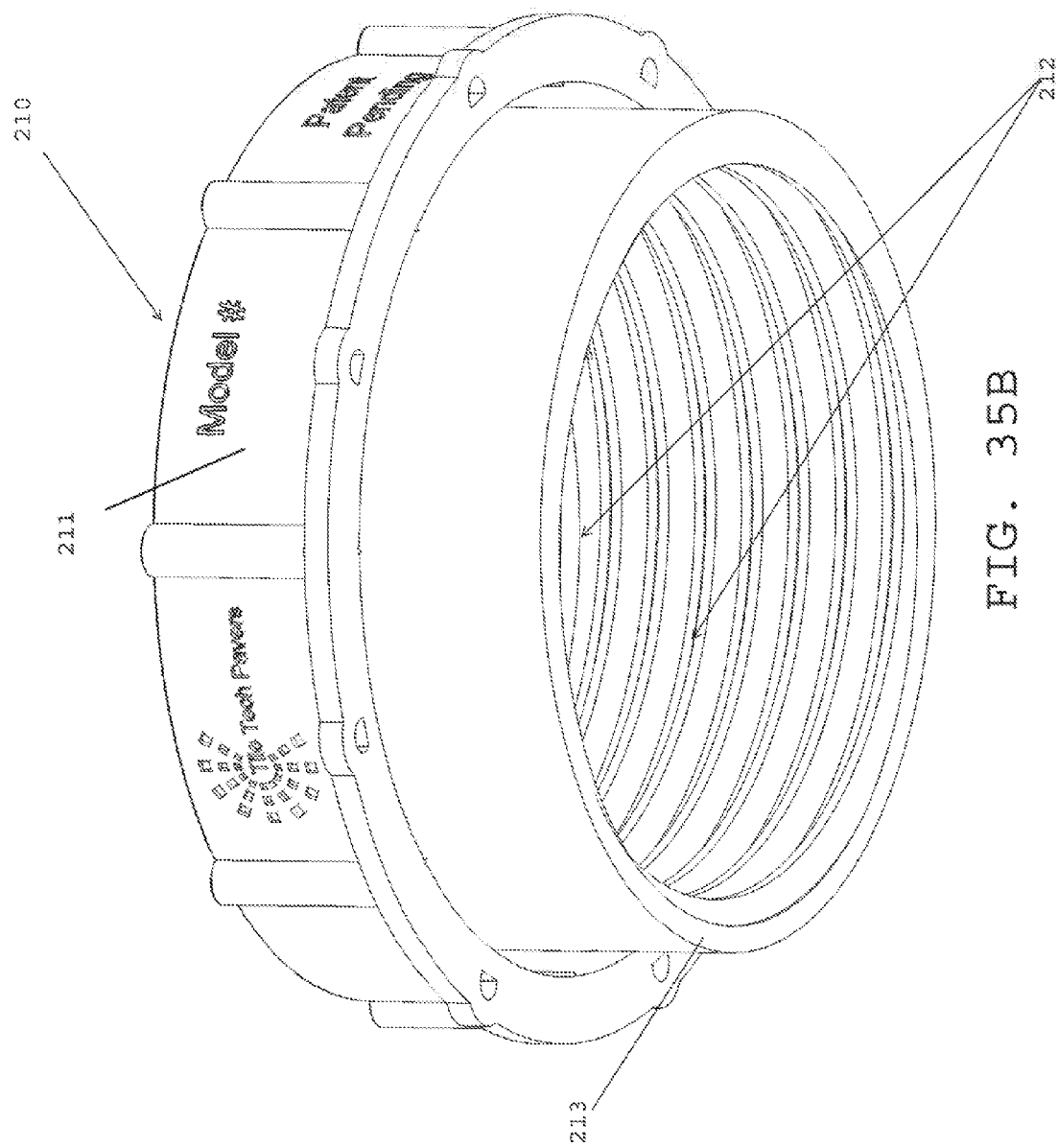
FIG. 35B is a bottom perspective view of the threaded collar 210.
Figure 35E:
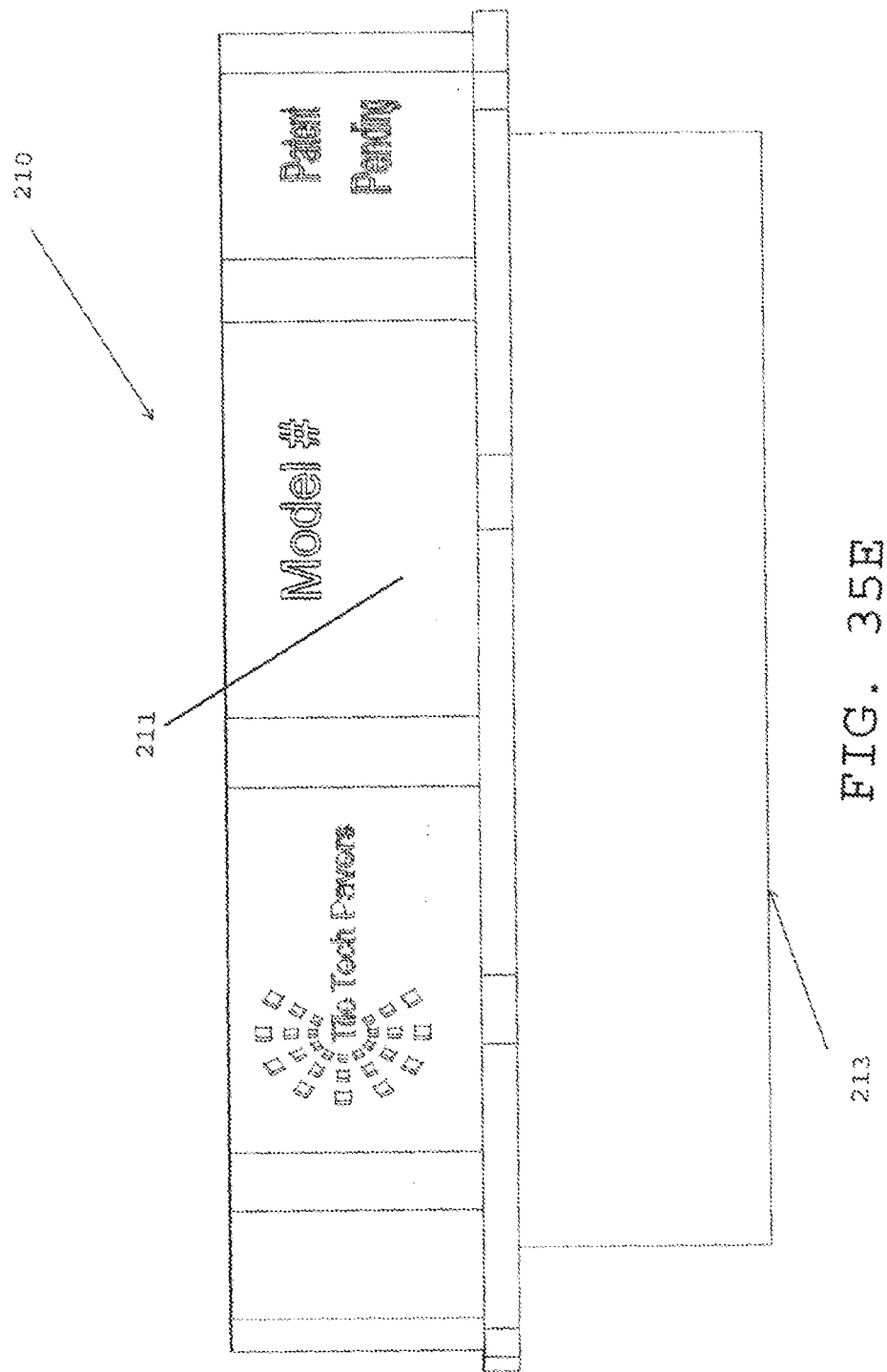
FIG. 35E is a side profile view of the threaded collar 210.

As alluded to above, the disclosed assembly may used for establishing a level paver surface over a sloped subsurface. FIG. 33 depicts a side view of the assembly 100 and illustrates one mode establishing such leveled surface. Referring first to FIGS. 33, 28A and 29E, the base 110 suitably features a concave surface 114 and the cap 120 suitably features a convex surface whereby the slope of the paver support surface 123 may be skewed in any direction relative to the plane of the foot 111 of the base 110 via sliding the convex surface 123 of the cap 120 along the concave surface 114 of the base 110. In one embodiment, the paver support surfaces 123 of four assemblies 100 positioned at the four corners of a square paver will self level with respect to one another under the weight of the pavers installed thereon the assemblies.

FIGS. 34A through 34C depict a second embodiment of an assembly 200 for facilitating the elevated and leveled placement of a paver array onto a subsurface. FIG. 34A is a perspective view of the assembly 200 in a first configuration; FIG. 34B is a perspective view of the assembly 200 in a second configuration; and FIG. 34C is an exploded view of the assembly 200. As seen in the figures the assembly 200, like the assembly of FIGS. 27A and 27B, comprises: a base 110; a cap 120; a key 130; and, a tile spacer 140. The structure and operability of those components are the same as described above in connection with the first embodiment of an assembly 100. Unlike the assembly 100 of FIGS. 27A and 27B, the assembly 200 further comprises a female threaded collar 210; and a male threaded insert 220.

FIGS. 35A through 35E depict different views of a preferable embodiment of the threaded collar 210 component of the apparatus 200 depicted in FIGS. 34A through 34C. Specifically, FIGS. 35A through 35E respectively depict a top perspective, bottom perspective, top plan, bottom plan, and side profile view of the threaded collar 210. As can be seen in the referenced drawings, the threaded collar 210 is generally a truncated tubiform with; a grip flange 211; female threads 212 on the inside of its tubiform; and a foot 213.

FIGS. 36A through 36E depict different views of a preferable embodiment of the threaded insert 220 component of the apparatus 200 depicted in FIGS. 34A through 34C. Actually, FIGS. 36A through 36E respectively depict a top perspective, bottom perspective, top plan, bottom plan, and side profile view of the threaded insert 220. As can be seen in the referenced drawings, the threaded insert is generally a truncated cylinder and may comprise: a foot 221; a male threads 222 on the outside surface of its cylinder shape; a concave surface 224 defining the top of the cylinder; and a key socket 225 through the concave surface 224 along the axis of the cylinder.

FIG. 34C shows a preferable method for assembling the assembly 100. First, the base 110 may be positioned so that the bottom side of the foot 111 interfaces with a subsurface and wherein the cylinder 112 extends outwardly and transversely relative to a plane of the subsurface. Second, a riser 420 (e.g., a pipe section) may be positioned within the riser receptacle 213 of the base 210. Third, the foot 213 of the threaded collar 210 may be provided to the top of the riser 420 so that the foot 213 of the threaded collar 410 is positioned inside of the riser 420. Fourth, the foot 221 of the threaded insert 220 may be provided to the top of the threaded collar 210 so that the threads 212 of the collar 210 and the threads 222 of the insert 220 cooperate to drive the insert 220 to within the tubiform of the collar 410. Fifth, the foot 221 of the threaded insert 220 may be provided to the top of the threaded collar 210 so that the threads 212 of the collar 210 and the threads 222 of the insert 220 cooperate to drive the insert 220 to within the tubiform of the collar 210. sixth, the cap 120 may be positioned on top of the threaded insert 220 so that the concave surface 224 of the insert 220 interfaces with the convex surface 123 of the cap 120 and wherein the key socket 225 of the insert 220 is located within the key socket receptacle 125 of the cap 120. Seventh, the x-shaped member 131 of the key 130 may be inserted through the key socket receptacle 125 and into the key socket 225 until the locking teeth 2251 inside the key socket 225 interact with the locking lug 1311 of the key 131 so that: (1) the key is retained inside the key socket 225; and (2) the cap 120 is movably (e.g., slidably and/or rotatably) retained between the flange 132 of the key 132 and the concave surface 224 of the threaded insert 220. Finally, the tile spacer 140 may be provided to the spacer receptacle 124 of the cap 120 whereby the spacer 140 surface and the support surface 123 of the cap 120 generally form a plane.

Referring to FIGS. 34A and 34B, a paver may be supported above a subsurface via: positioning an assembly 200, foot 111 down, on the subsurface; rotating the cap 120 around the key 130 until the orientation of the projections 141 of the spacer 140 align with a planned paver surface; and providing a corner of the paver to the paver support surface 123 whereby the sides of the paver abut the projections 141.

Figure 36A:
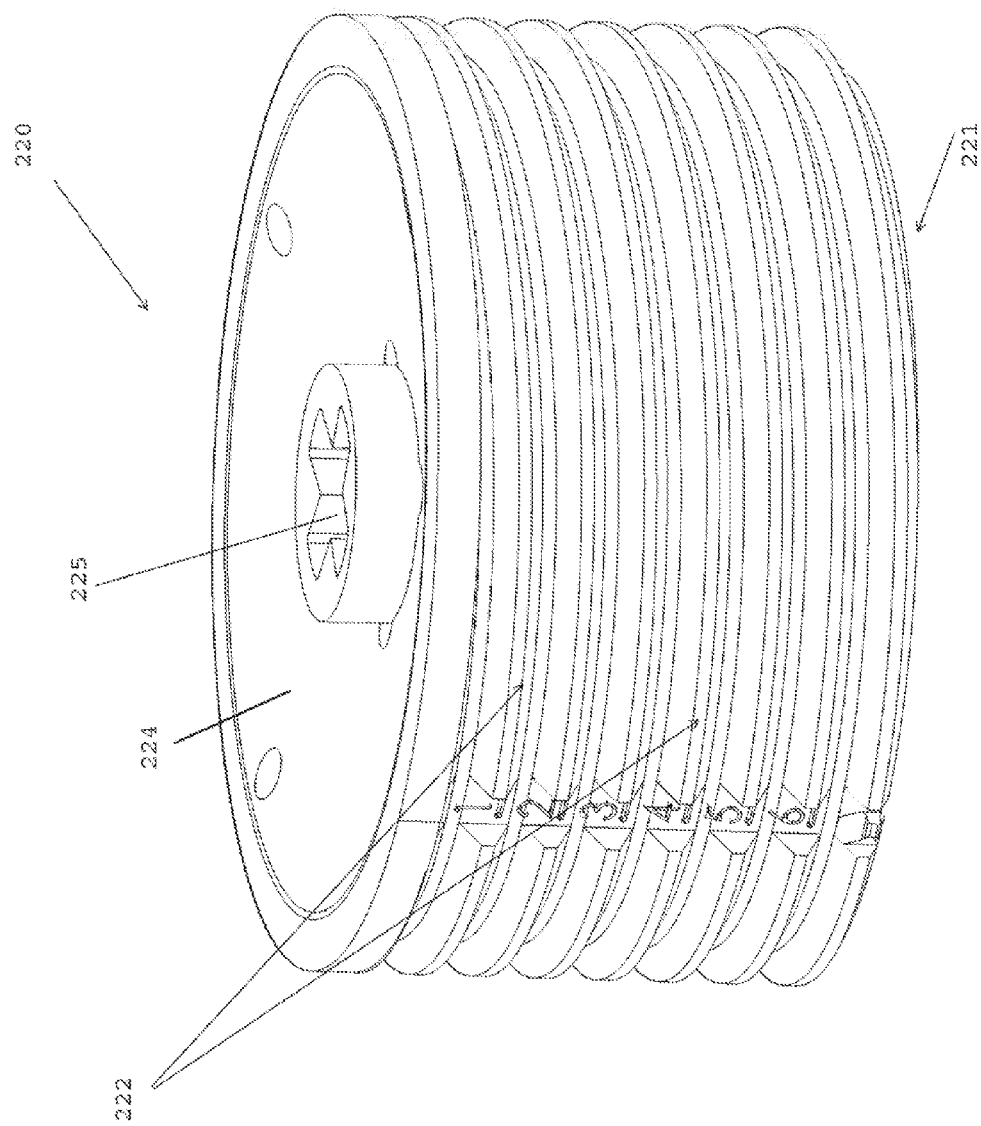
FIG. 36A is a top perspective view of a threaded insert 220.
Figure 36B:
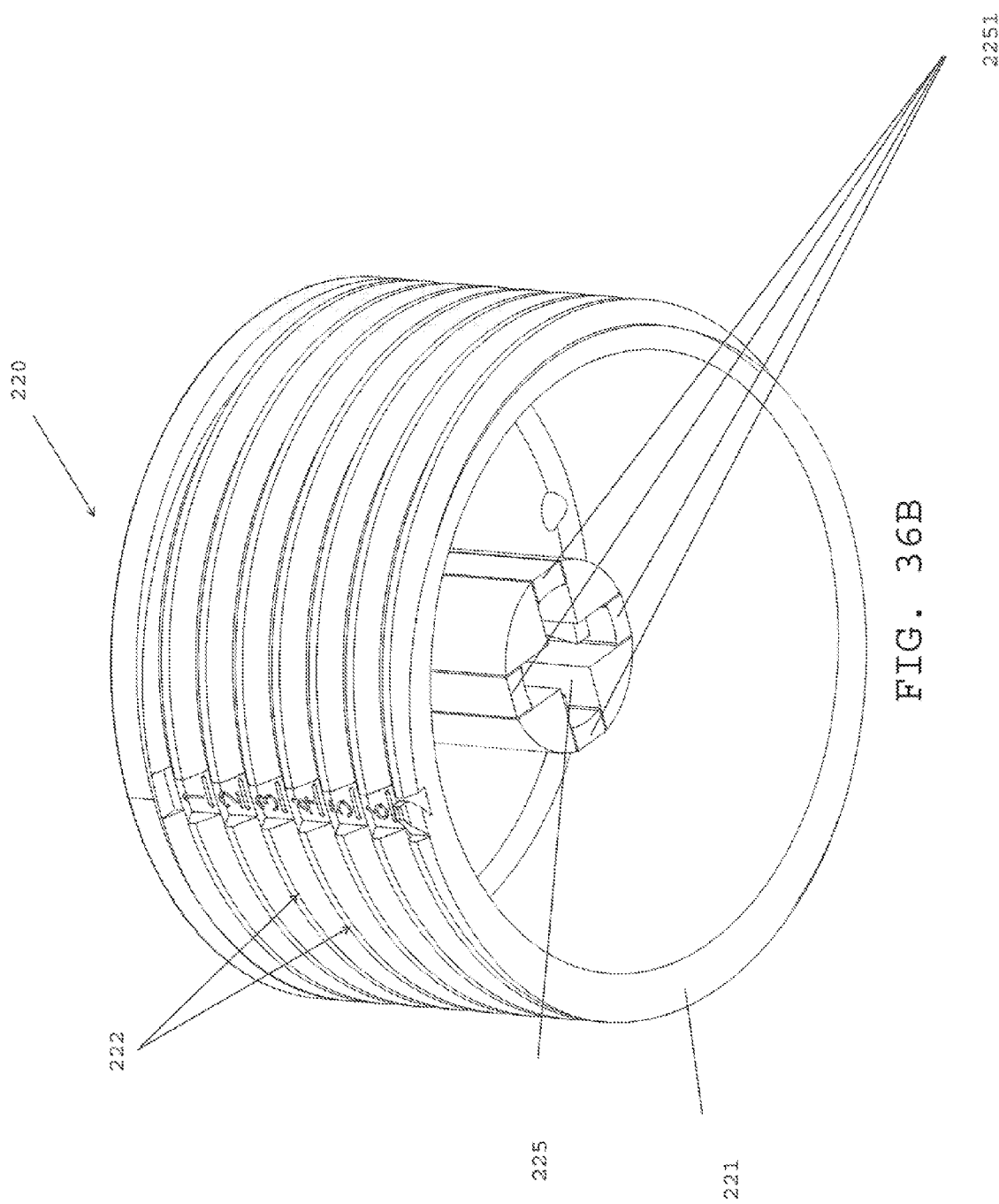
FIG. 36B is a bottom perspective view of the threaded insert 220.
Figure 36D:
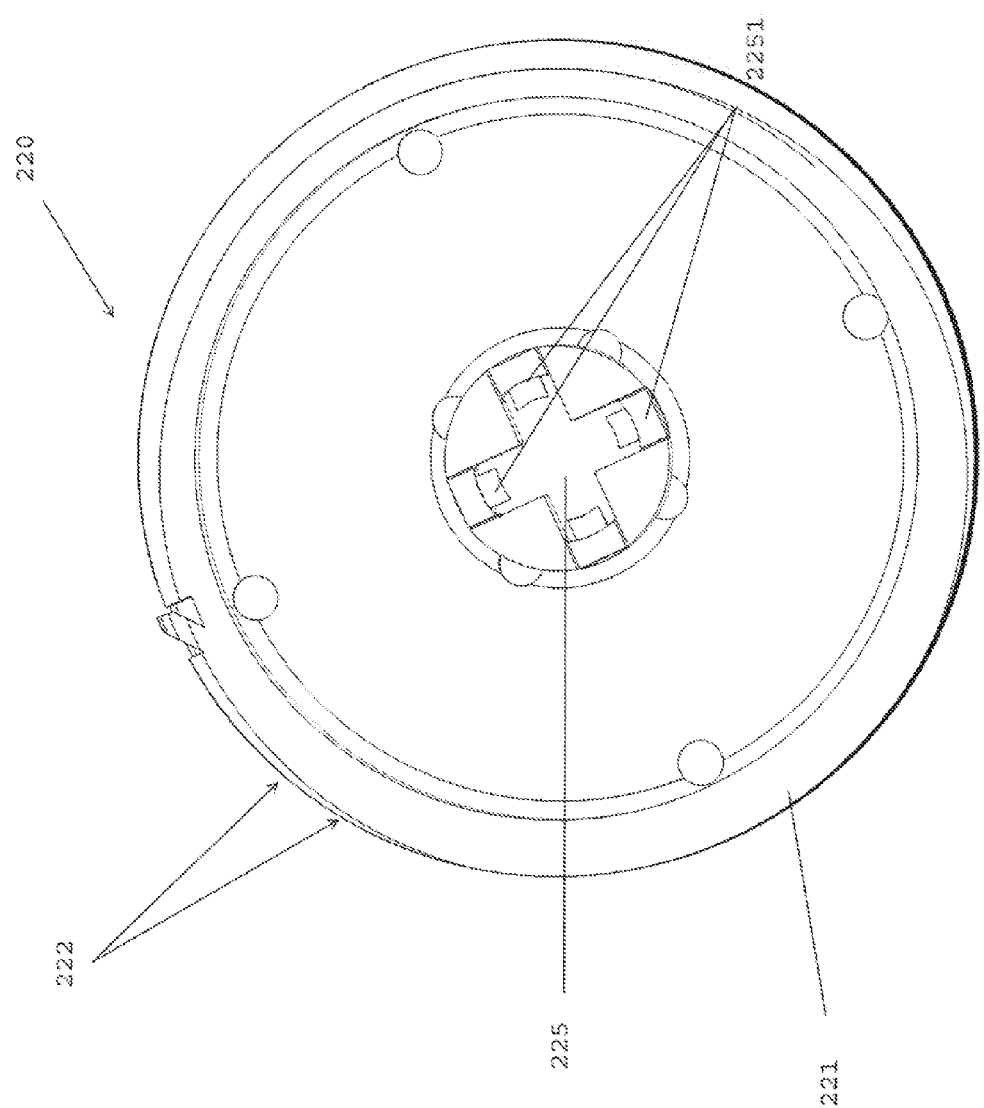
FIG. 36D is a bottom plan view of the threaded insert 220.
Figure 36E:
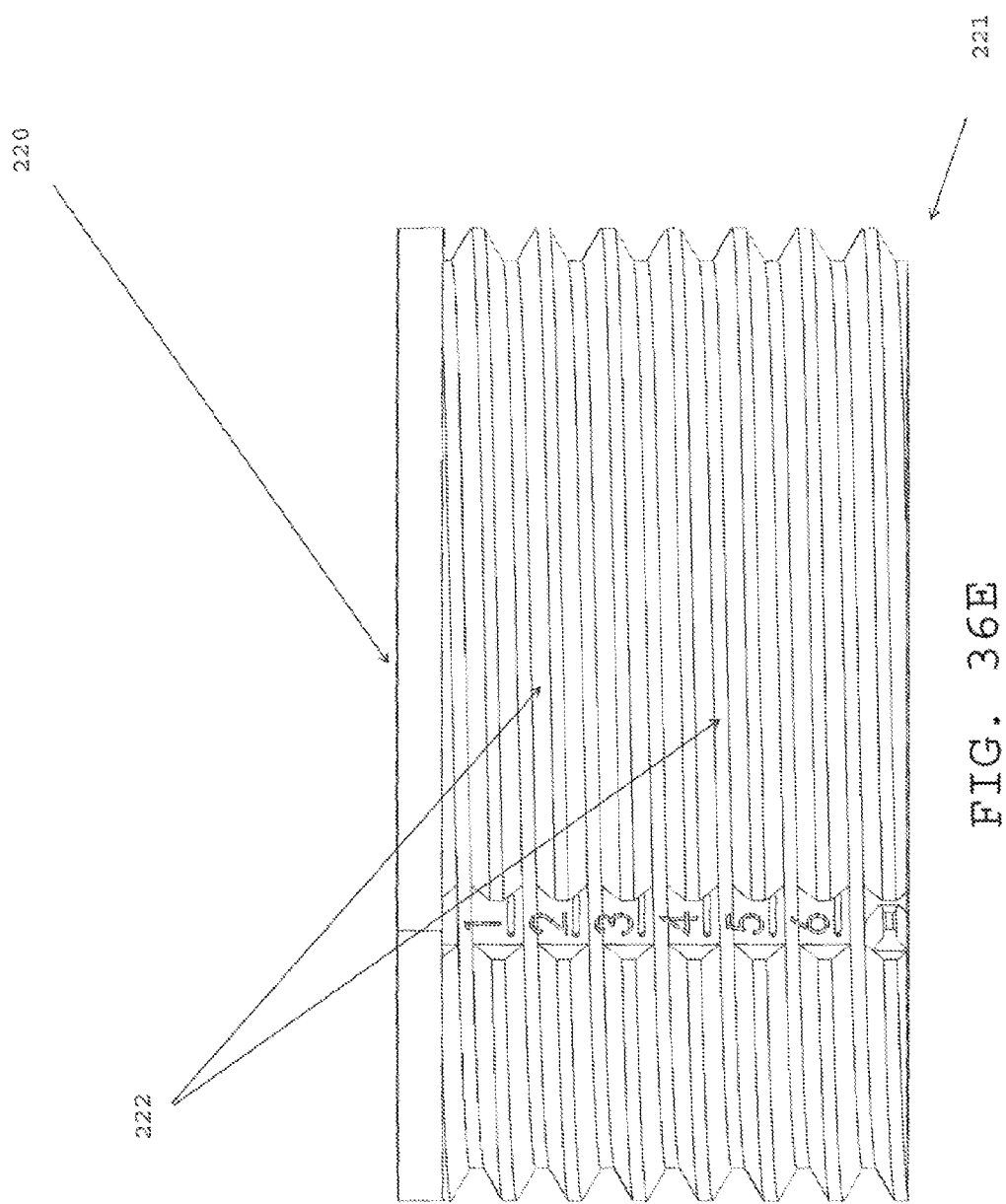
FIG. 36E is a side profile view of the threaded insert 220.
Figure 37:
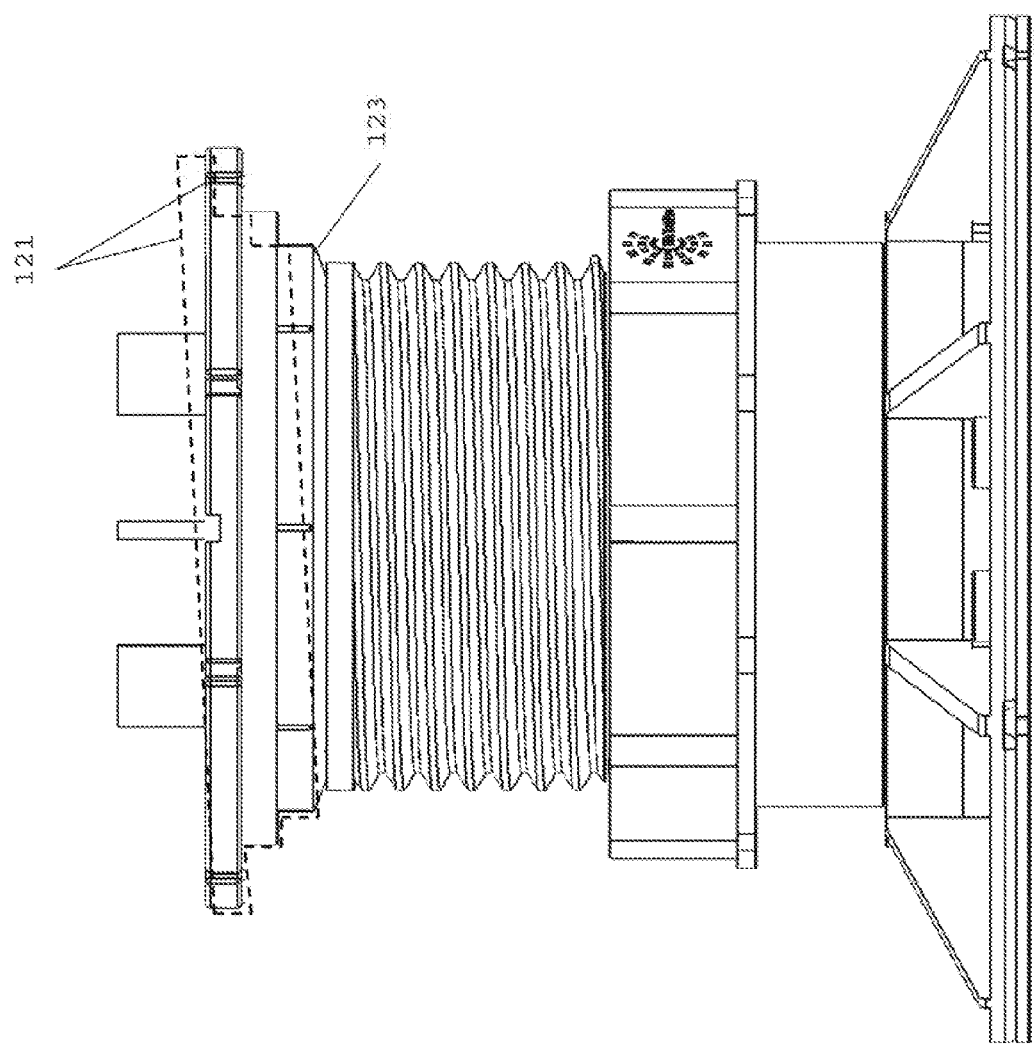
FIG. 37 depicts a side view of the assembly 200 and illustrates one mode establishing such leveled surface.
Figure 38A:
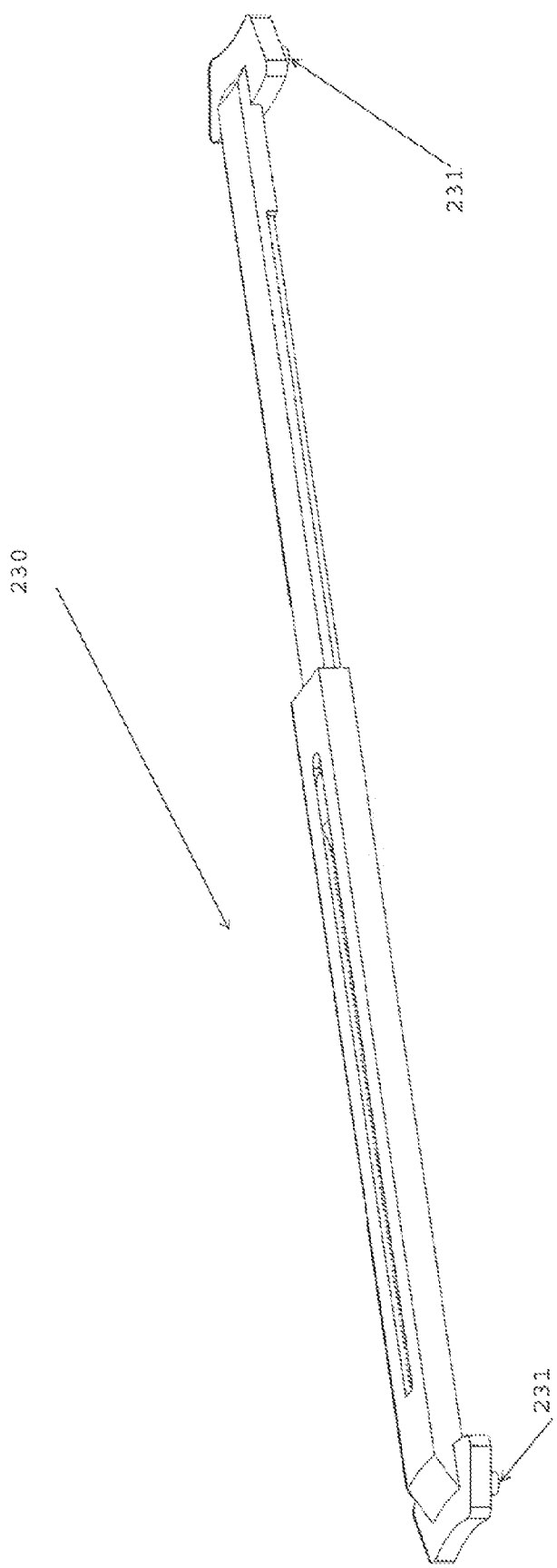
FIG. 38A is a top perspective view of an arm 230.
Figure 38B:
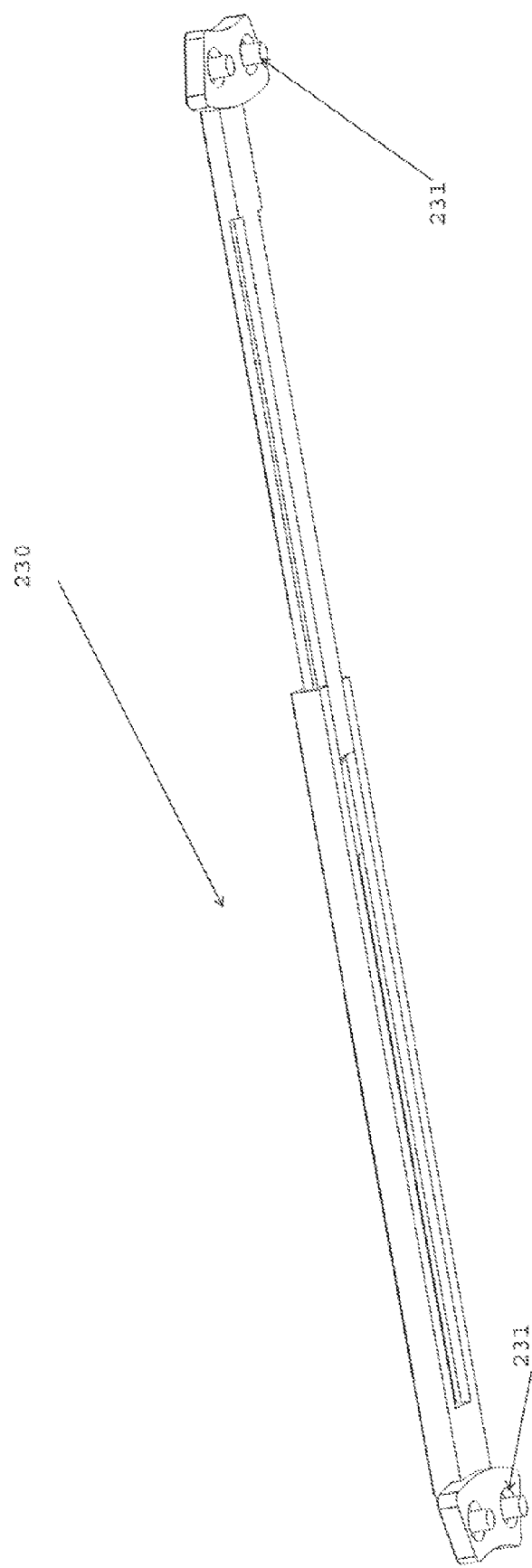
FIG. 38B is a bottom perspective view of the arm 230.
Figure 38C:
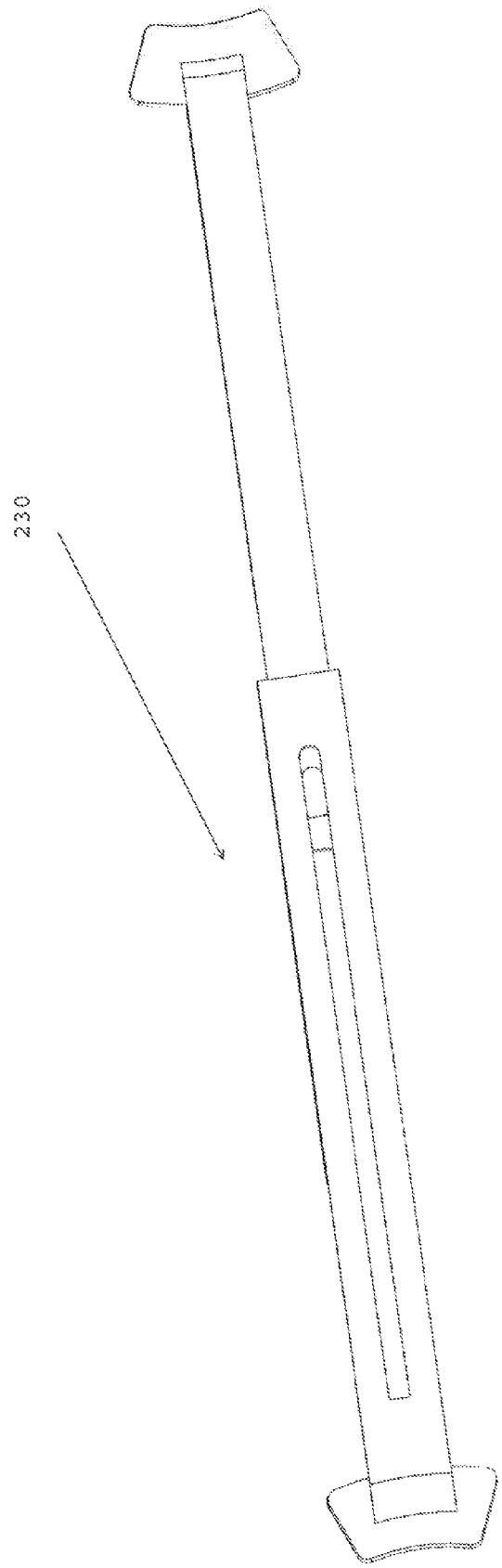
FIG. 38C is a top plan view of the arm 230.
Figure 38D:
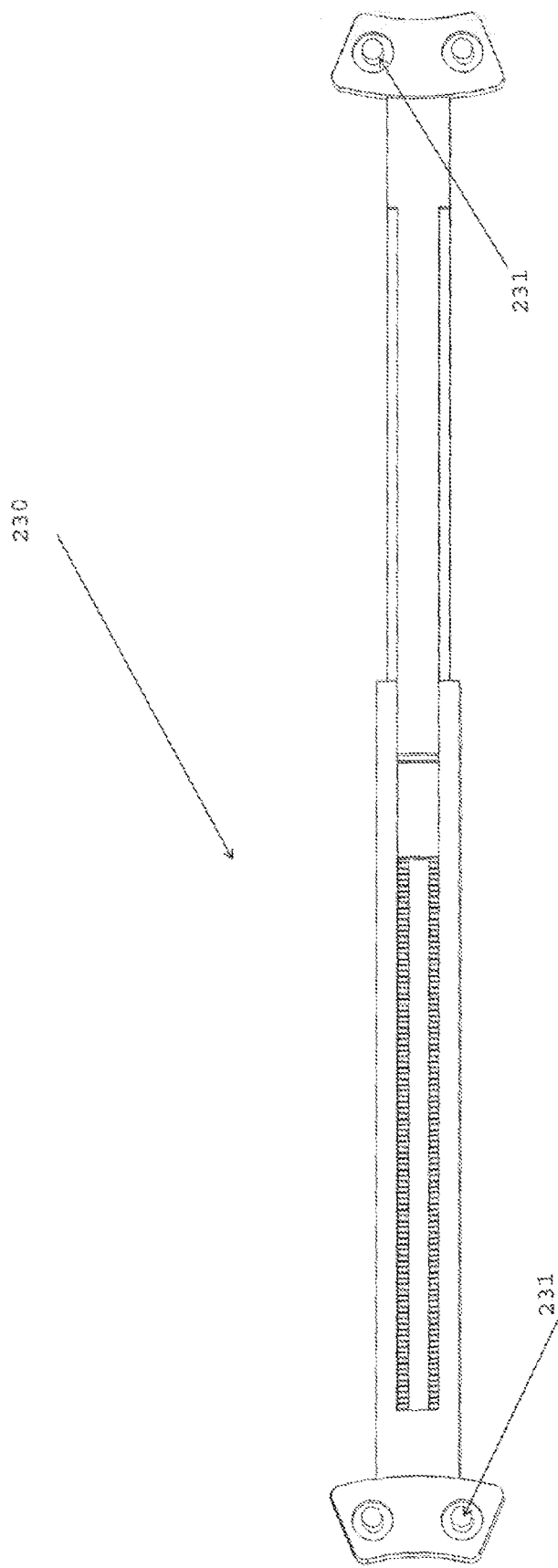
FIG. 38D is a bottom plan view of the arm 230.
Figure 38E:
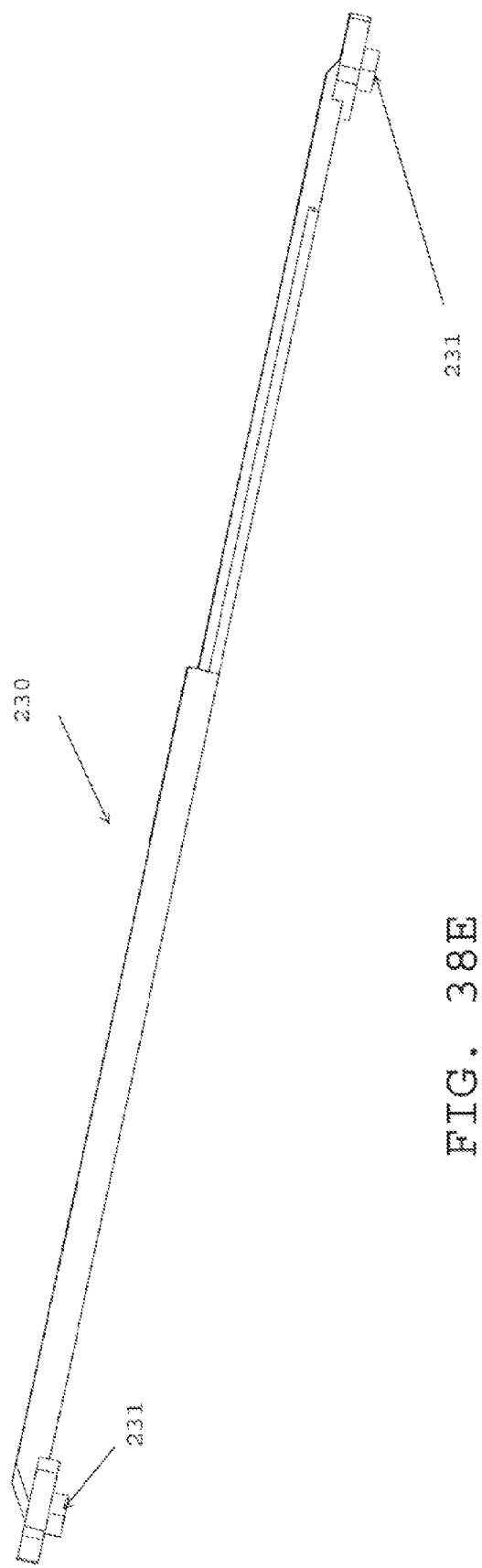

As alluded to above, the disclosed assembly may used for establishing a level paver surface over a sloped subsurface. FIG. 37 depicts a side view of the assembly 200 and illustrates one mode establishing such leveled surface. Referring first to FIGS. 36A and 29E, the threaded insert 220 suitably features a concave surface 224 and the cap 120 suitably features a convex surface 123 whereby the slope of the paver support surface 123 may be skewed in any direction relative to the plane of the foot 111 of the base 110 via sliding the convex surface 123 of the cap 120 along the concave surface 224 of the insert 220. In one embodiment, the paver support surfaces 121 of four assemblies 200 positioned at the four corners of a square paver will self level with respect to one another under the weight of the pavers installed thereon the assemblies 200.

In some instances, the caps 120 of a four assembly system cannot, without more than sliding the convex surface 123 of the cap 120 along the concave surface 224 of the insert 220, be skewed enough in the applicable direction to accomplish a level surface of a square paver because the slope of the under surface may be too drastic. In such instances, a level paver surface may be accomplished via raising or lowering one or more of the paver support surface 123 of the assemblies 220 relative to one or more of the paver support surface 123 of the other assemblies 200. In one embodiment, such raising or lowering of the paver support surface 221 of an assembly 200 may be accomplished via: (1) removing the paver spacer 140 from the assembly cap 120 of the assembly 200; (2) inserting an wrench into the wrench receptacle 1321 of the key; (3) griping the flange grip 211 of the collar 210; and (3) torqueing the wrench so that the key 130 turns the insert 220 whereby the threads of the insert 220 and collar 210 interact to drive the insert further into or out of the tubiform of the collar 210.

Figure 39:
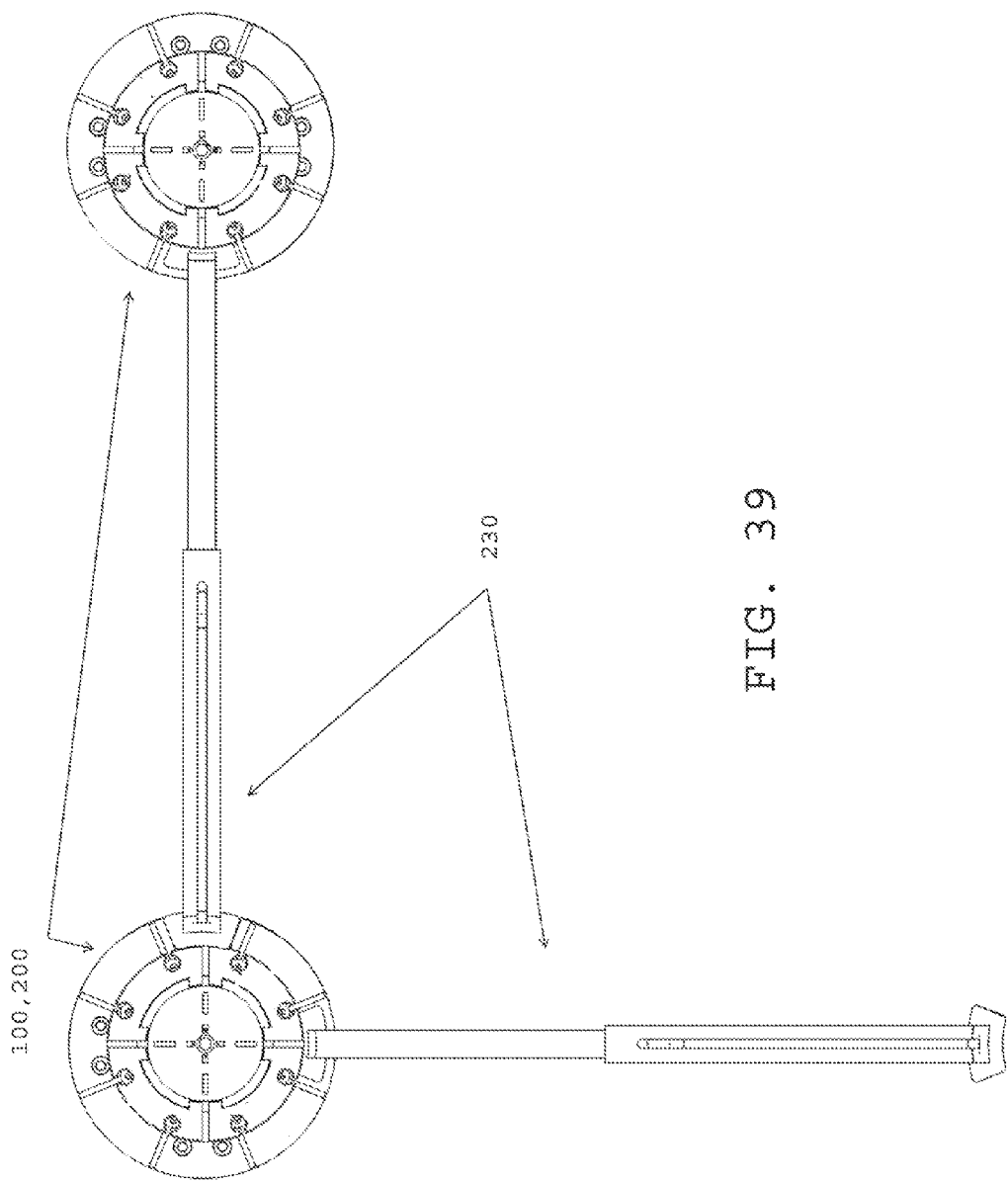
FIG. 39 is an environmental view of the arm 230 used for fixing the space between two assemblies 100, 200.

In one embodiment, a plurality of assemblies 100, 200 may be used to support a paver surface. Frequently, the plurality of assemblies 100, 200 must be fixedly positioned at specific locations relative to one another for supporting the paver surface. To facilitate such positioning, an arm may be provided that connects to two pavers whereby their relative positions are so fixed. Such an arm 230 is depicted in FIGS. 38A through 38E. Specifically, FIGS. 38A through 38E respectively depict a top perspective, bottom perspective, top plan, bottom plan, and side profile view of the arm 230. Generally referring to the figures, the arm is comprised of retractable extensions with mortise 231 on either side. FIG. 39 is an environmental view of the arm 230 used for fixing the space between two assemblies 100, 200. As shown in the figure, the mortise 231 of the arm 230 may receive tenons 2112 on the upperside of the foot 211 of the bases 210 of two adjacent assemblies 100, 200.

The components of the assemblies 100, 200, being or composing a paver load bearing apparatus, should preferably be fashioned out of materials that are capable of supporting the weight of a paver. As the weight of a paver may vary from extraordinarily heavy to very light, the materials which may be acceptable for fabricating the components will typically vary according to the applicable paver to be supported thereon the assemblies 100, 200. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies 100, 200 being or composing a paver load bearing apparatus should preferably be dimensioned to a size that renders the assemblies 100, 200 capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure.

Figure 40:
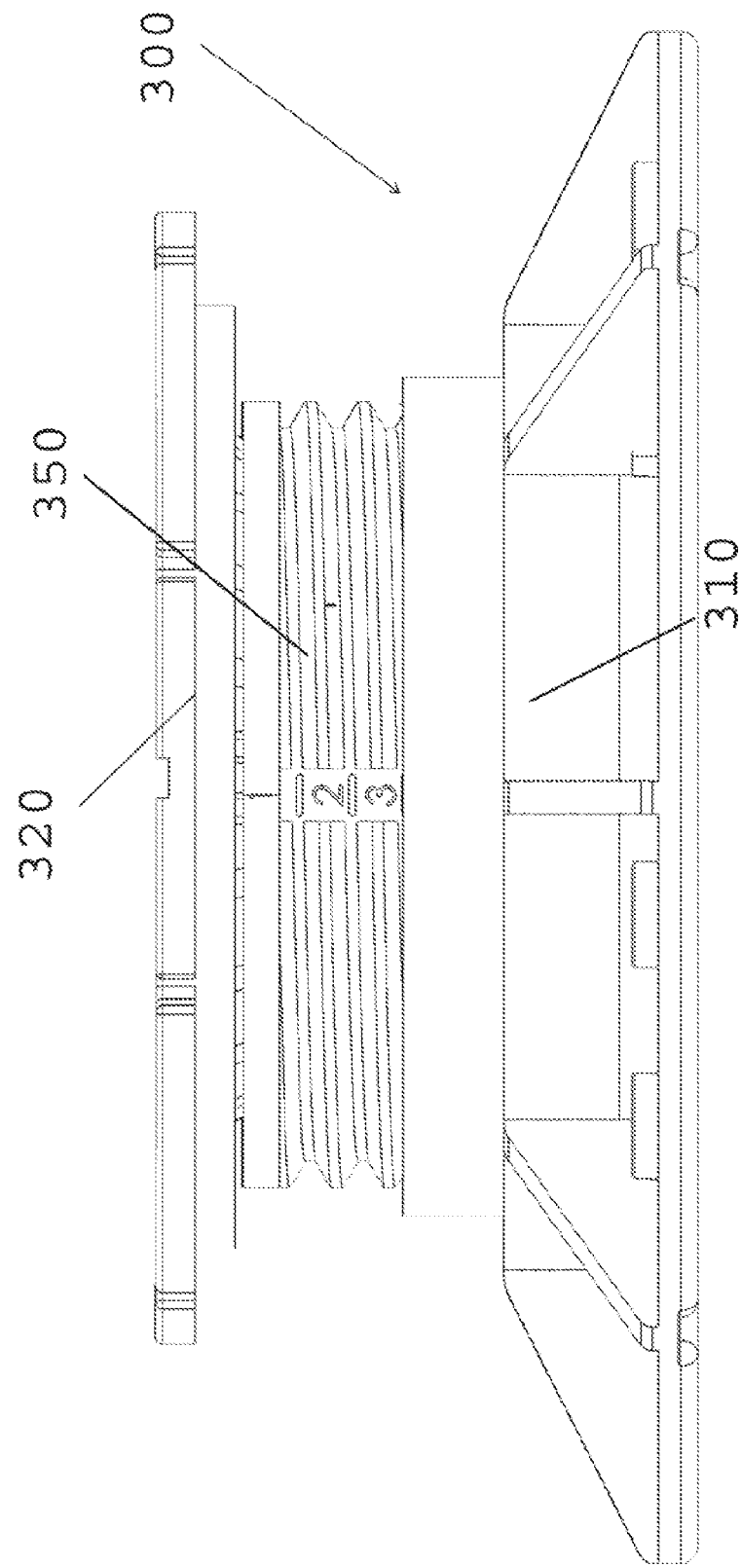
FIG. 40 is a side view of an assembly 300.
Figure 42A:
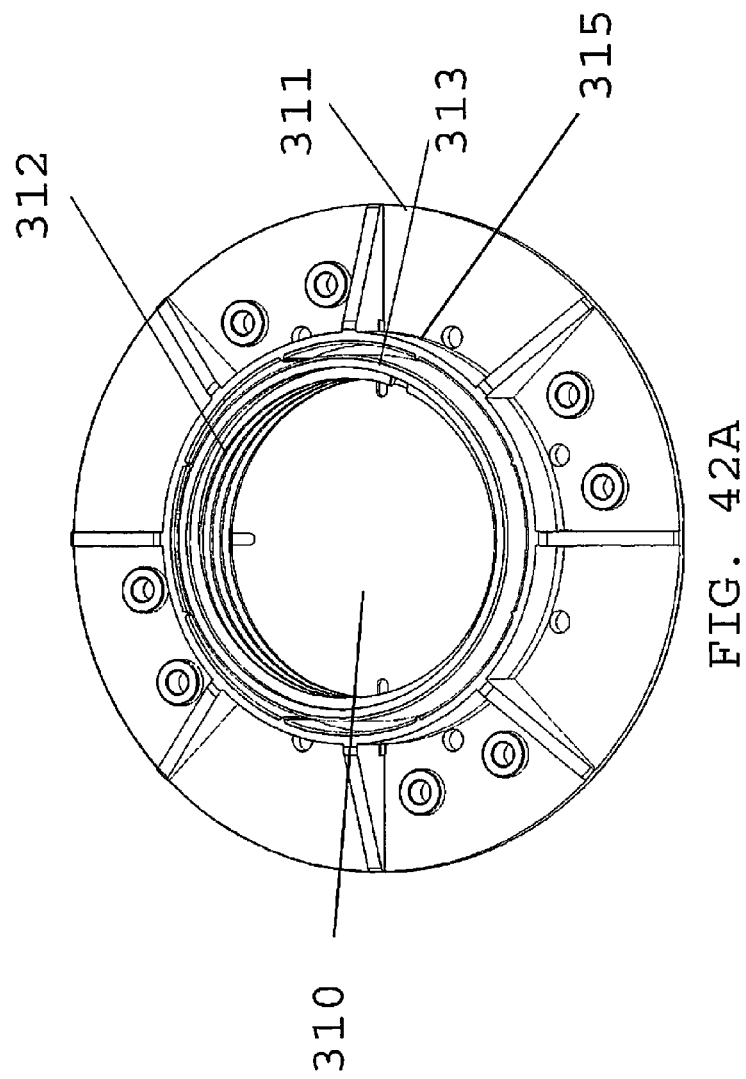
FIG. 42A is a top perspective view of a base 310.
Figure 42B:
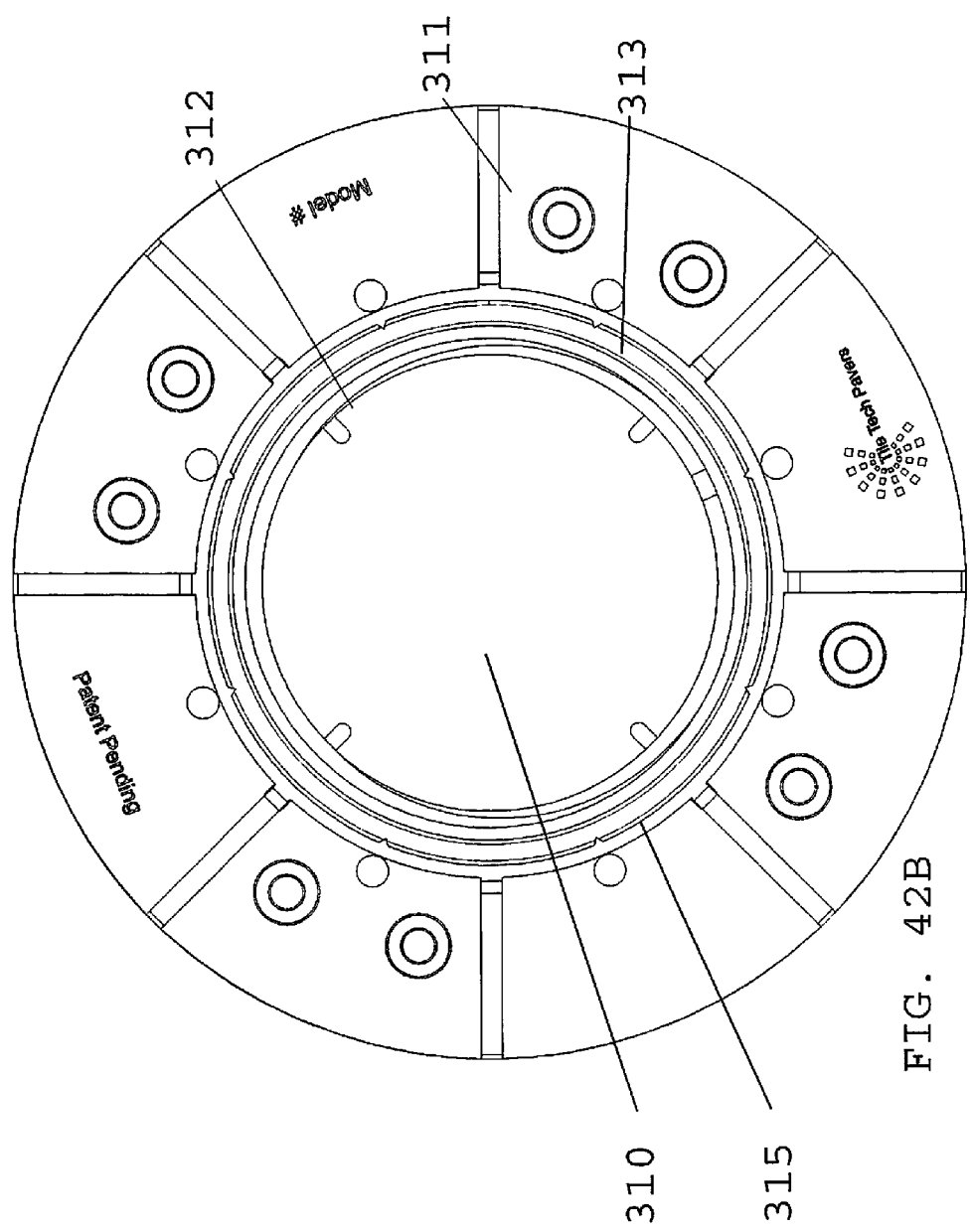
FIG. 42B is a top plan view of the base 310.
Figure 42C:
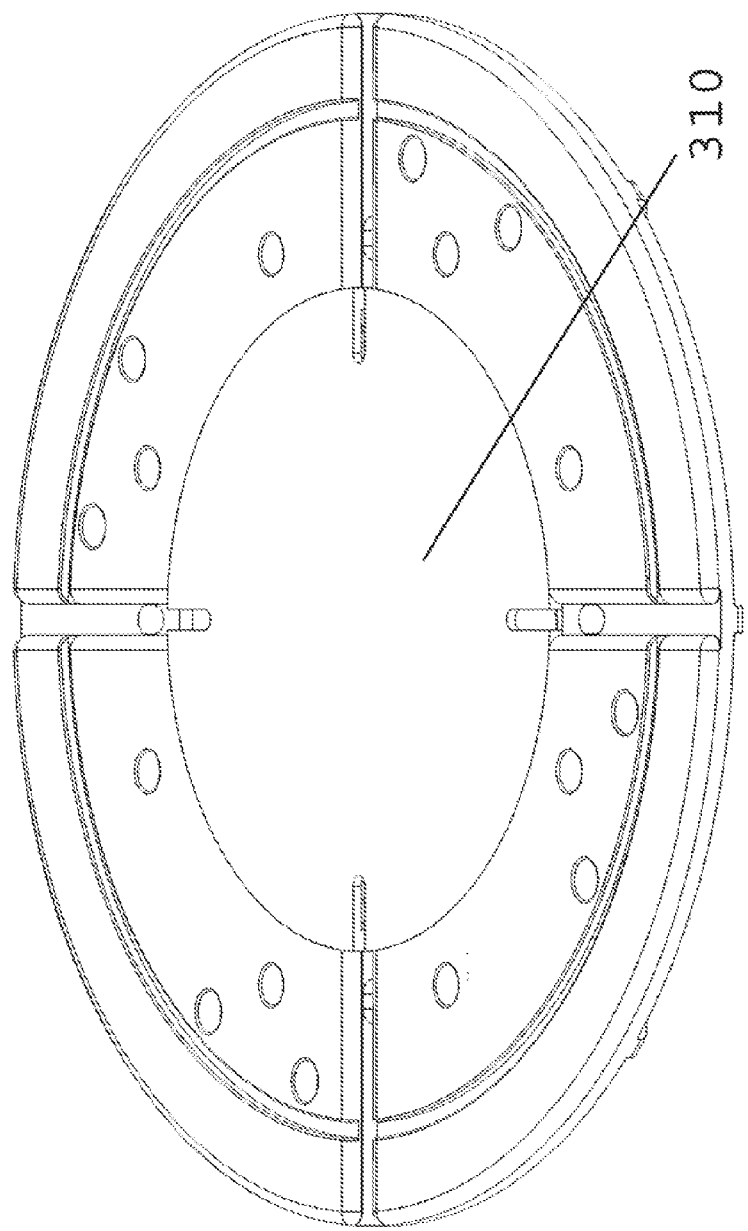
FIG. 42C is a bottom plan view of the base 310.
Figure 42D:
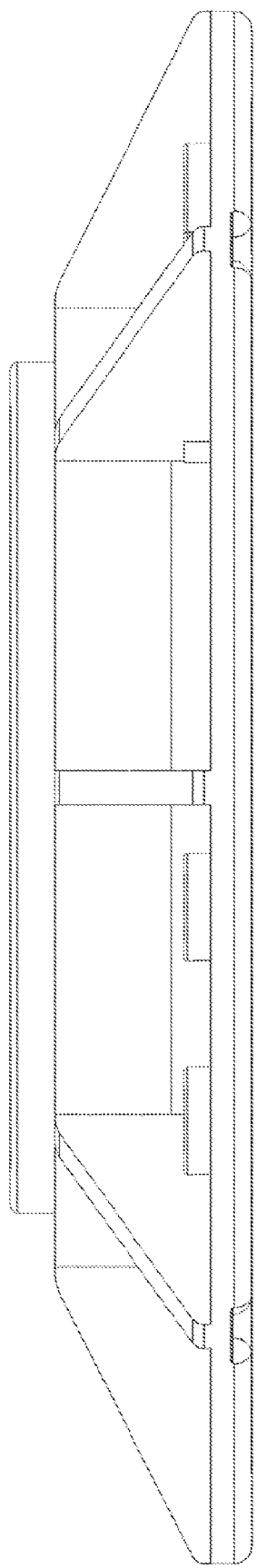
FIG. 42D is a side profile view of the base 310.
Figure 43A:
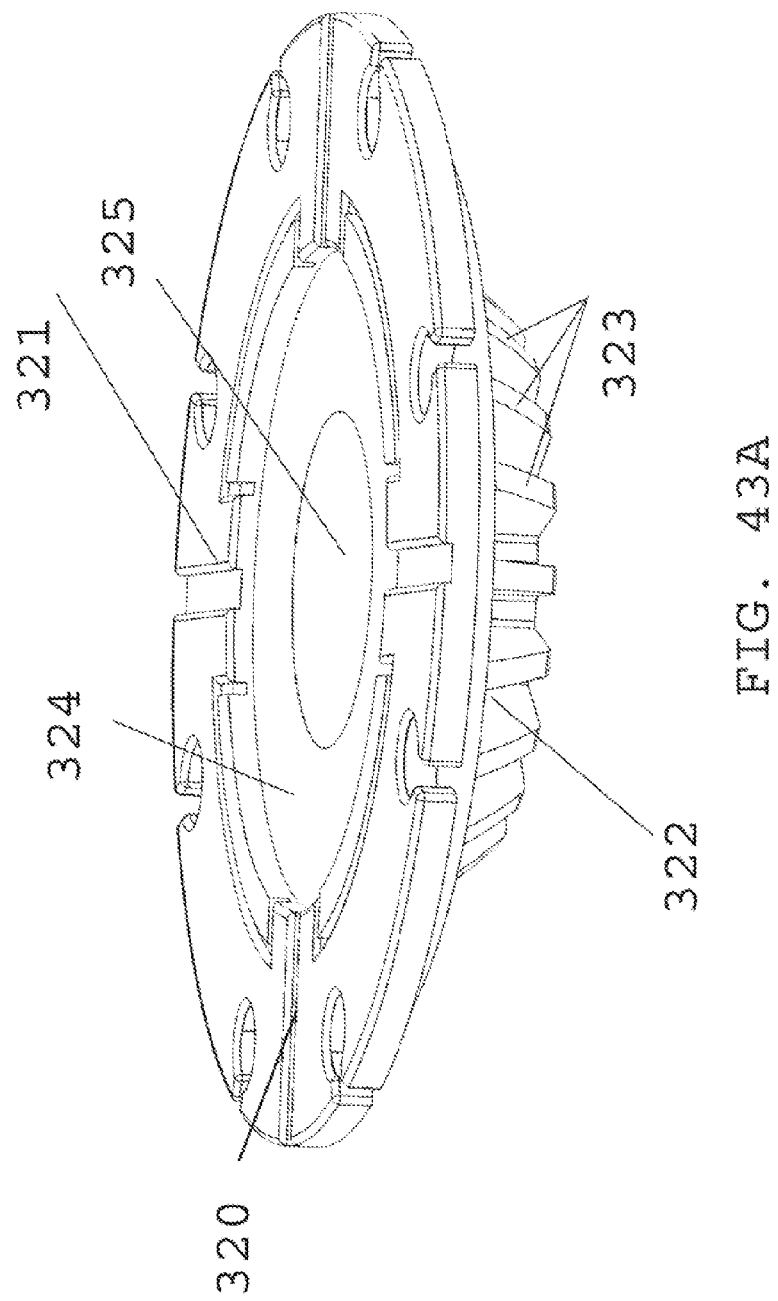
FIG. 43A is a top perspective view of a cap 320.
Figure 43C:
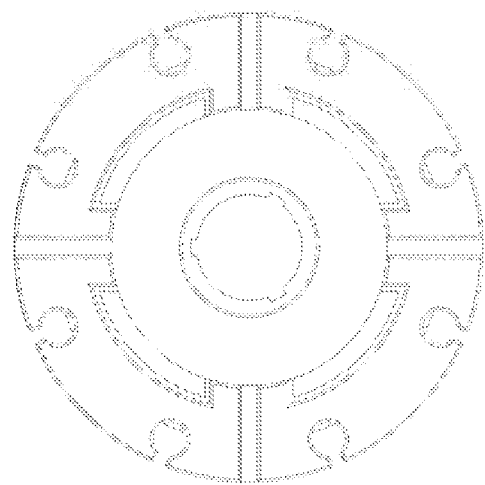
FIG. 43C is a top plan view of the cap 320.
Figure 43D:
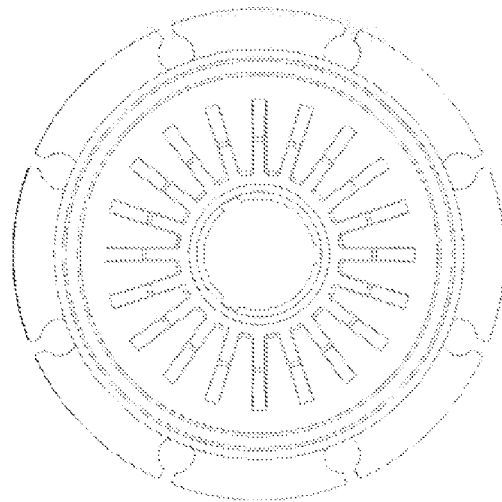
FIG. 43D is a bottom plan view of the cap 320.
Figure 43E:
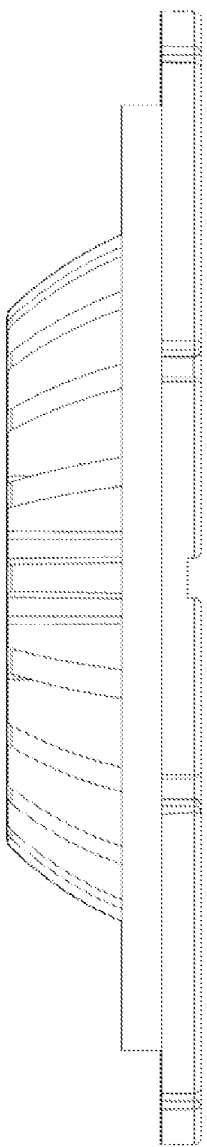
FIG. 43E is a side profile view of the cap 320.

FIGS. 40 and 41 depict a third embodiment of an assembly 300 for facilitating the elevated and leveled placement of a paver array onto a substrate. FIG. 40 is a side view of the assembly 300 and FIG. 41 is an exploded view of the same. As seen in the figures the assembly 300 comprises: a base 310; a threaded insert 350, and a cap 320.

FIGS. 42A through 42D depict different views of a preferable embodiment of the base 310 component of the apparatus 300 depicted in FIGS. 40 and 41. Specifically, FIGS. 42A through 42D respectively depict a top perspective, top plan, bottom plan, and side profile view of the base 310. As can be seen in the referenced drawings, the base is generally a truncated cylinder and may comprise: a foot 311; a femininely threaded support cylinder 312; a riser socket 313 around the cylinder and, an outer cylindrical wall 315 projecting perpendicularly upwardly from the foot, the outer cylindrical wall concentrically arranged about and spaced from the femininely threaded support cylinder to define the riser socket.

FIGS. 43A through 43E depict different views of a preferable embodiment of the cap 320 component of the apparatus 300 depicted in FIGS. 40 and 41. Specifically, FIGS. 43A through 43E respectively depict a top perspective, bottom perspective, top plan, bottom plan, and side profile view of the cap 320. As can be seen in the referenced drawings, the cap 320 is generally a disc with a convex surface on its bottom side. Still referring to FIGS. 43A through 43E, the cap 320 may comprise: a paver support surface 321; a cylinder 322 extending from the bottom of the paver support surface 321; a convex surface 323 defining the bottom of the cylinder 322; a tile spacer receptacle 324 that is coaxial to the tile support surface 321; and, a key socket access hole 325 through the convex surface 314 along the axis of the cylinder 322.

Figure 44:
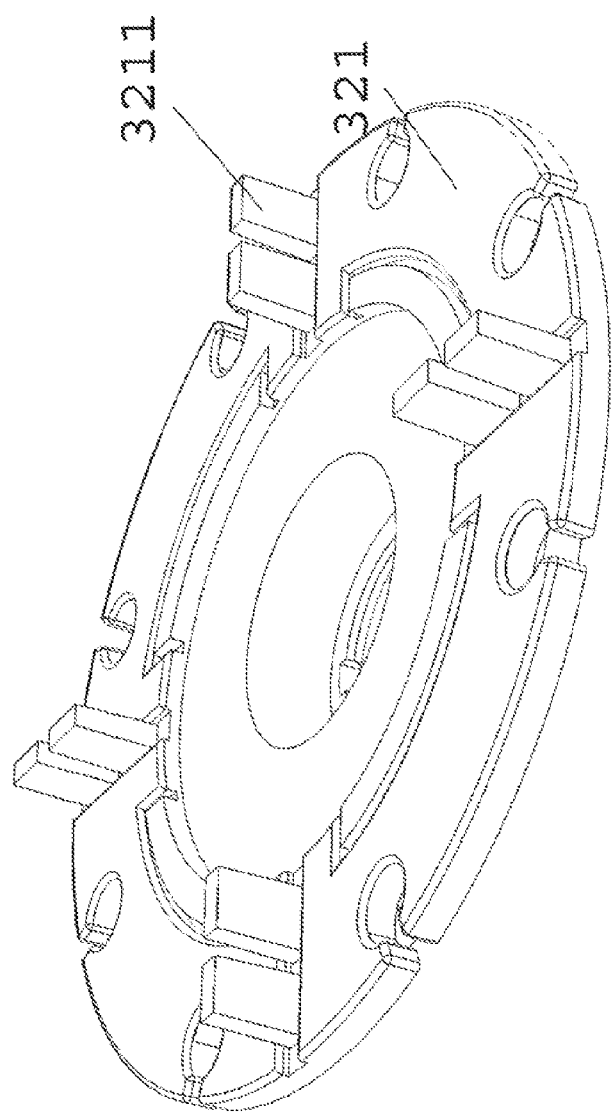
FIG. 44 is a top perspective view of an alternate embodiment of a cap 340.

FIG. 44 depicts the tile support surface 321 of the cap 320 with tile spacers 3211 provided thereto.

FIGS. 45A through 45C depict different views of a preferable embodiment of the threaded insert 350 component of the apparatus 300 depicted in FIGS. 40 through 41. Actually, FIGS. 45A through 45C respectively depict a top perspective, top plan, and side profile views of the threaded insert 350. As can be seen in the referenced drawings, the threaded insert is generally a truncated cylinder and may comprise: a foot 351; a male threads 352 on the outside surface of its cylinder shape; a concave surface 354 defining the top of the cylinder; and a key 355 extending coaxially from the concave surface 354 along the axis of the cylinder 350.

FIGS. 40 through 45C show a preferable method for assembling the assembly 300. First, the base 310 may be positioned so that the bottom side of the foot 311 interfaces with a subsurface and wherein the cylinder 312 extends outwardly and transversely relative to a plane of the subsurface. Second, the foot 351 of the threaded insert 350 may be provided to the top of the base 310 so that the threads 312 of the base 310 and the threads 322 of the insert 320 cooperate to drive the insert 320 to within the tubiform of the base 310. Fourth, the cap 320 may be positioned on top of the threaded insert 350 so that the concave surface 354 of the insert 320 interfaces with the convex surface 323 of the cap 120 and wherein the key 325 of the insert 320 is located within the key socket receptacle 325 of the cap 320 so that: (1) the key is retained inside the key socket 325; and (2) the cap 320 is movably (e.g., slidably and/or rotatably) retained between the flange of the key 355 and the concave surface 354 of the threaded insert 350.

Referring to FIGS. 40 through 45C, a paver may be supported above a subsurface via: positioning an assembly 300, foot 311 down, on the subsurface; and providing a corner of the paver to the paver support surface 323 whereby the sides of the paver abut. It should be noted that the dimensions of the assembly 300 will vary with the size of the paver to be retained by the paver support surface 323. In particular, the height of the projections may vary depending on the thickness of a paver, e.g. in a range of about 0 to 20 inches. It should be also noted that, now, and throughout the application the terms "top" and "bottom" or "lower" and "upper", or any other orientation defining term should in no way be construed as limiting of the possible orientations of the assembly 300 (i.e., the assembly may be positioned sideways, or in reversed vertical orientations even though the specification refers to a "top" and "bottom" parts).

Figure 46B:
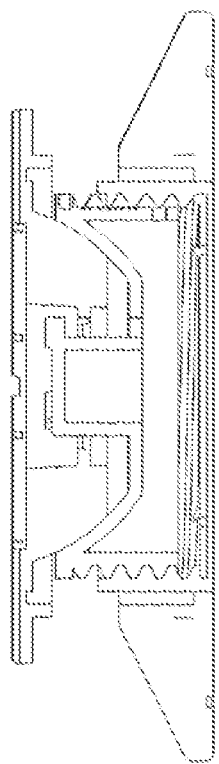
FIGS. 46A and 46B depicts a side cross-section view of the assembly 300 and illustrates one mode establishing a leveled surface.
Figure 46A:
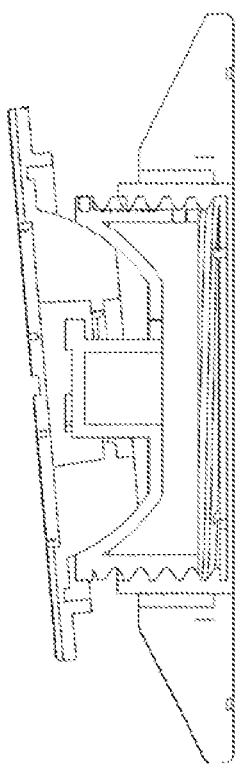

As alluded to above, the disclosed assembly may used for establishing a level paver surface over a sloped subsurface. FIGS. 46A and 46B depict side cross-section views of the assembly 300 and illustrate one mode establishing such leveled surface. Referring first to FIGS. 46A and 46B, the base 310 suitably features a concave surface 314 and the cap 320 suitably features a convex surface whereby the slope of the paver support surface 323 may be skewed in any direction relative to the plane of the foot 311 of the base 310 via sliding the convex surface 323 of the cap 320 along the concave surface 314 of the base 310. In one embodiment, the paver support surfaces 323 of four assemblies 300 positioned at the four corners of a square paver will self level with respect to one another under the weight of the pavers installed thereon the assemblies.

Figure 47A:
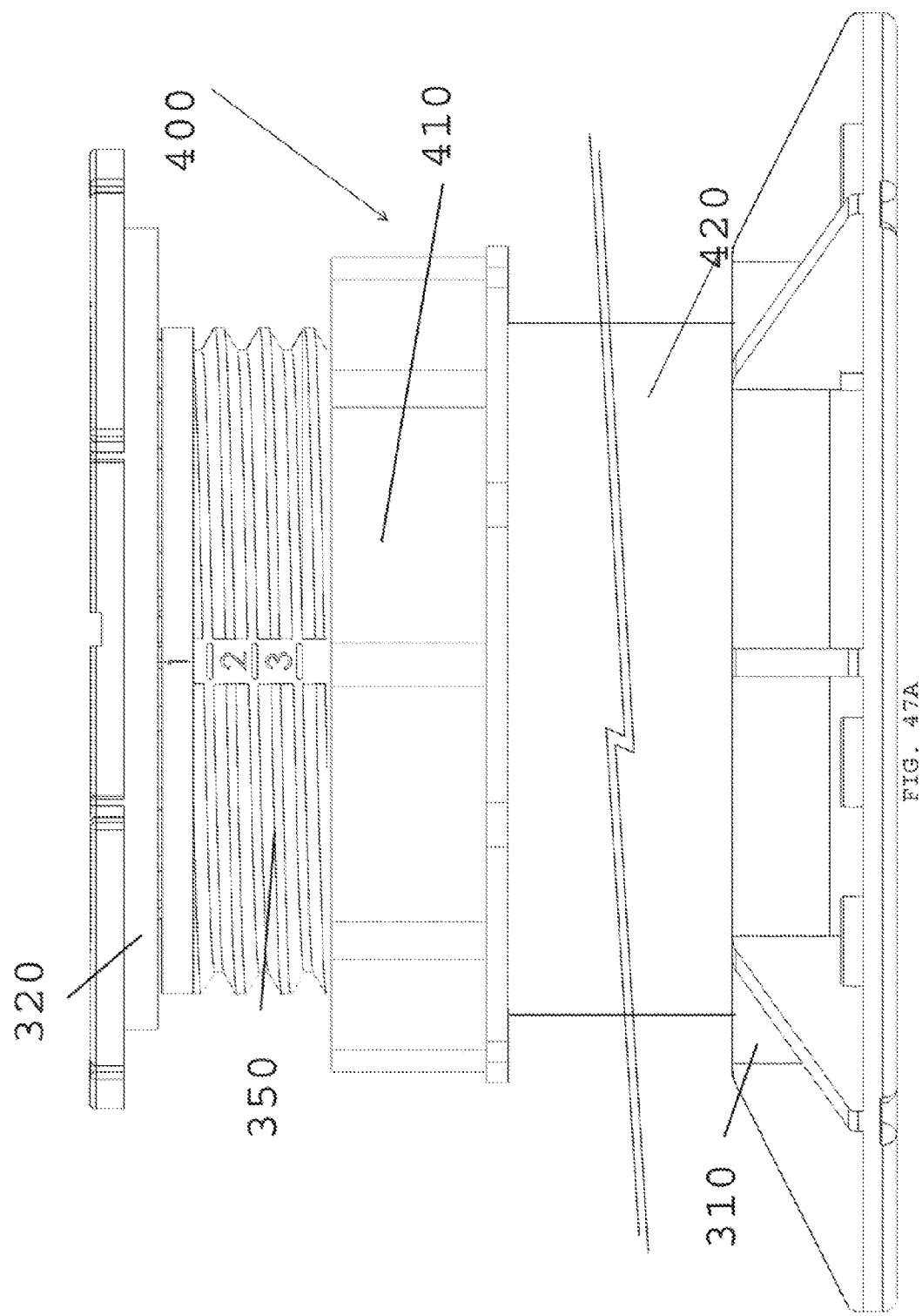
FIG. 47A is a side view of an assembly 400.
Figure 47B:
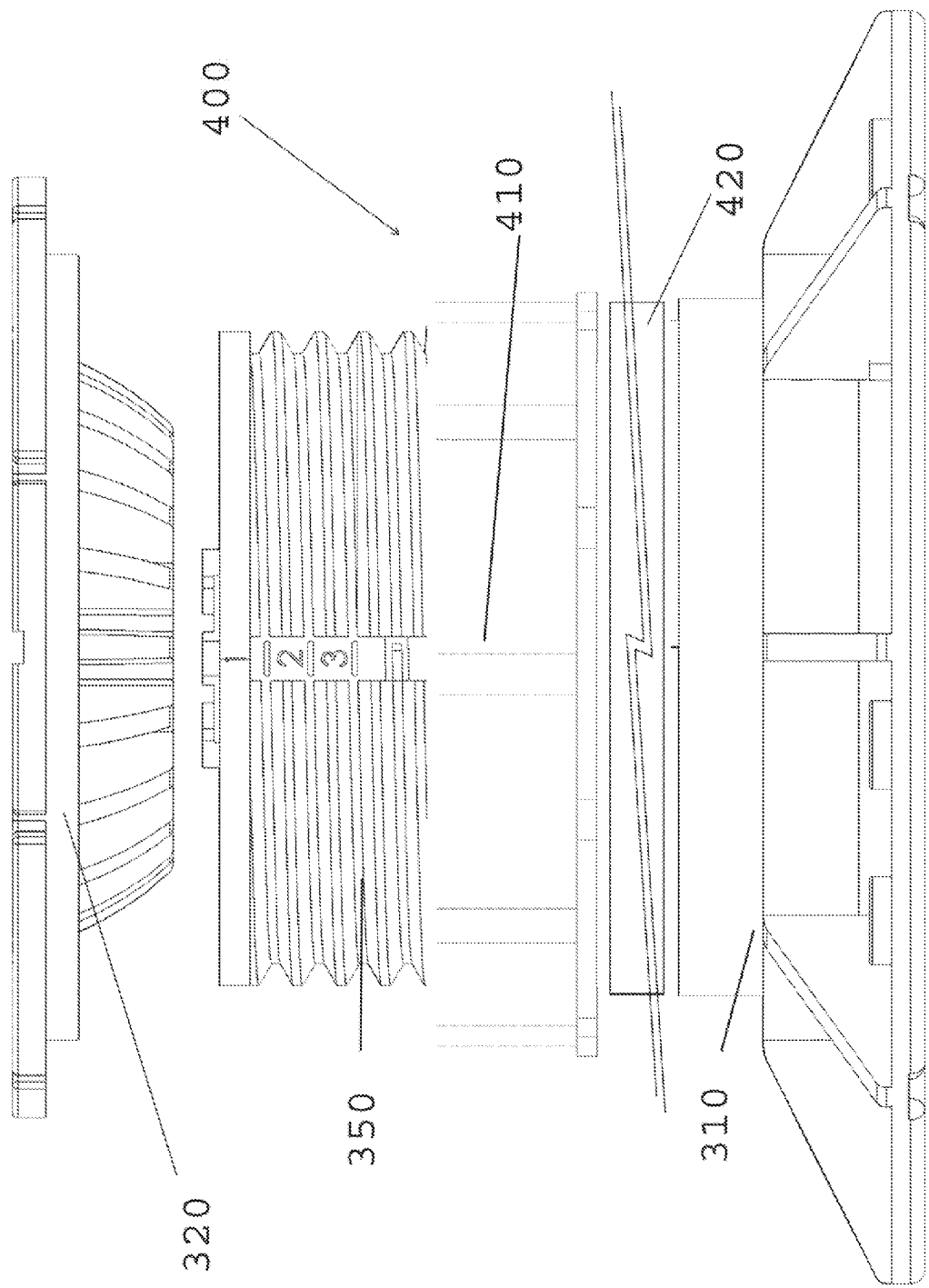
FIG. 47B is an exploded view of the assembly 400.

FIGS. 47A through 47B depict a fourth embodiment of an assembly 400 for facilitating the elevated and leveled placement of a paver array onto a subsurface. FIG. 47A is a side view of the assembly 400; FIG. 47B is an exploded side view of the assembly 400 of FIG. 47A. As seen in the figures the assembly 200, like the assembly of FIGS. 40 and 41, comprises: a base 310; a threaded insert 350, and a cap 320. The structure and operability of those components are the same as described above in connection with the third embodiment of an assembly 300 shown in FIGS. 40 and 41. Unlike the assembly 300 of FIGS. 40 and 41, the assembly 400 further comprises a female threaded collar 410 and a riser 420.

Figure 48A:
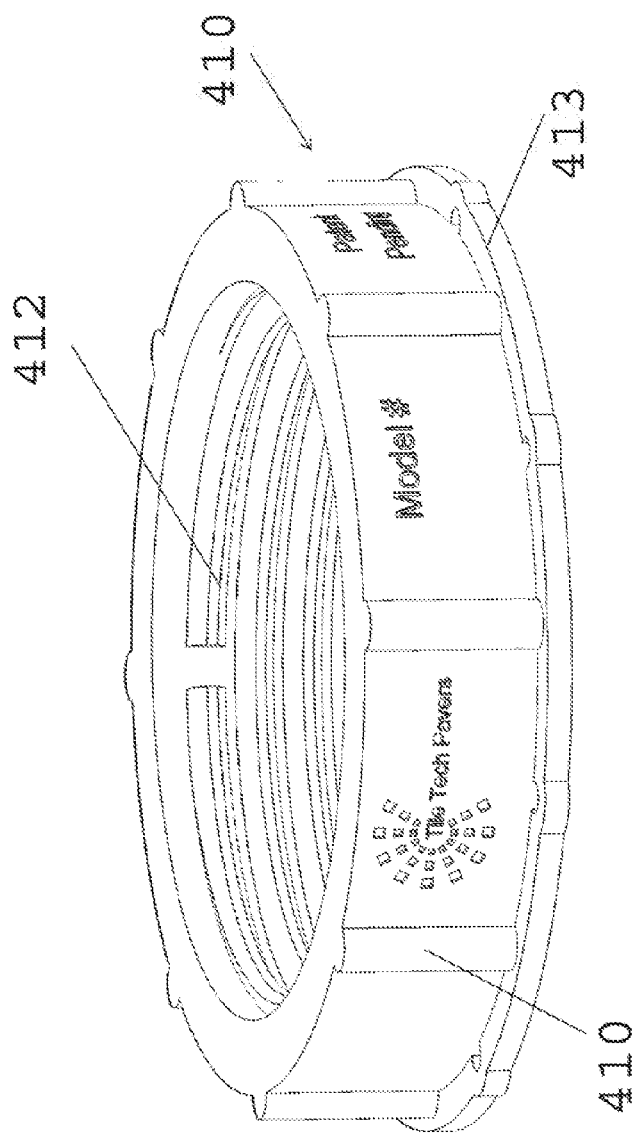
FIG. 48A is a top perspective view of a threaded collar 410.
Figure 48B:
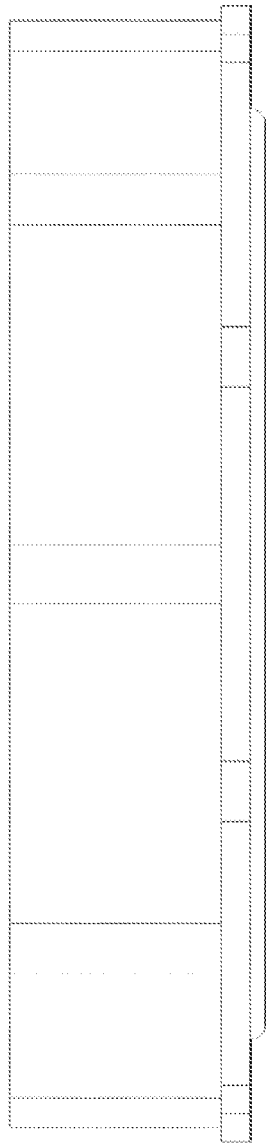
FIG. 48B is a bottom plan view of the threaded collar 410.
Figure 48C:
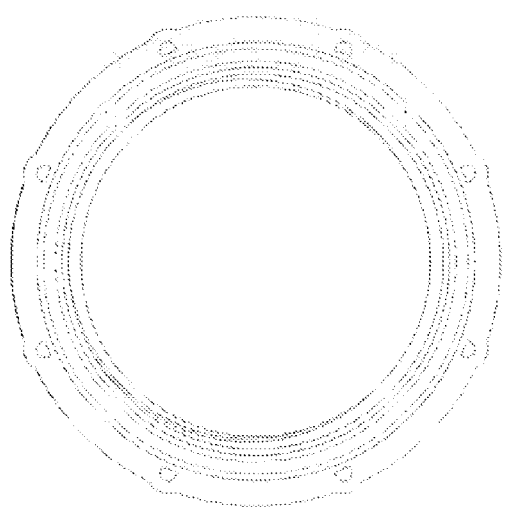
FIG. 48C is a side view of the threaded collar 410.

FIGS. 48A through 48C depict different views of a preferable embodiment of the threaded collar 410 component of the apparatus 400 depicted in FIGS. 46A through 46B. Specifically, FIGS. 46A through 46C respectively depict a top perspective, bottom plan, and side profile view of the threaded collar 410. As can be seen in the referenced drawings, the threaded collar 410 is generally a truncated tubiform with; a grip flange 411; female threads 412 on the inside of its tubiform; and a foot 413.

FIG. 47A through FIG. 48C show a preferable method for assembling the assembly 400. First, the base 410 may be positioned so that the bottom side of the foot 411 interfaces with a subsurface and wherein the cylinder 412 extends outwardly and transversely relative to a plane of the subsurface. Second, a riser 420 (e.g., a pipe section) may be positioned within the riser receptacle 313 of the base 310. Third, the foot 413 of the threaded collar 410 may be provided to the top of the riser 420 so that the foot 413 of the threaded collar 410 is positioned inside of the riser 420. Fourth, the foot 321 of the threaded insert 320 may be provided to the top of the threaded collar 410 so that the threads 412 of the collar 510 and the threads 322 of the insert 320 cooperate to drive the insert 320 to within the tubiform of the collar 410. Fifth, the cap 320 may be positioned on top of the threaded insert 320 so that the concave surface 324 of the insert 320 interfaces with the convex surface 323 of the cap 320 and wherein the key 325 of the insert 320 is located within the key socket receptacle 325 of the cap 320 and wherein the cap 120 is movably (e.g., slidably and/or rotatably) retained between the flange of the key 325 and the concave surface 324 of the threaded insert 320. Finally, the tile spacer 140 may be provided to the spacer receptacle 324 of the cap 320 whereby the spacer 140 surface and the support surface 323 of the cap 320 generally form a plane.

Referring to FIGS. 47A and 47B, a paver may be supported above a subsurface via: positioning an assembly 400, foot 311 down, on the subsurface; rotating the cap 320 around the key 325 until the orientation of the projections 141 of the spacer 140 align with a planned paver surface; and providing a corner of the paver to the paver support surface 123 whereby the sides of the paver abut the projections 141.

As alluded to above, the disclosed assembly may used for establishing a level paver surface over a sloped subsurface. FIG. 47A depicts a side view of the assembly 400 and illustrates one mode establishing such leveled surface. Referring first to FIGS. 47A and 47B, the threaded insert 320 suitably features a concave surface 324 and the cap 320 suitably features a convex surface 323 whereby the slope of the paver support surface 323 may be skewed in any direction relative to the plane of the foot 311 of the base 310 via sliding the convex surface 323 of the cap 320 along the concave surface 324 of the insert 320. In one embodiment, the paver support surfaces 321 of four assemblies 400 positioned at the four corners of a square paver will self level with respect to one another under the weight of the pavers installed thereon the assemblies 200.

In some instances, the caps 320 of a four assembly 300, 400 system cannot, without more than sliding the convex surface 323 of the cap 120 along the concave surface 354 of the insert 350, be skewed enough in the applicable direction to accomplish a level surface of a square paver because the slope of the under surface may be too drastic. In such instances, a level paver surface may be accomplished via raising or lowering one or more of the paver support surface 323 of the assemblies 300/400 relative to one or more of the paver support surface 323 of the other assemblies 300/400. In one embodiment, such raising or lowering of the paver support surface 321 of an assembly 300/400 may be accomplished via: (1) removing the paver spacer from the assembly cap 320 of the assembly 300; (2) inserting an wrench into the wrench receptacle 1321 of the key; (3) griping the flange grip 311 of the collar 310; and (3) torqueing the wrench so that the key 330 turns the insert 320 whereby the threads of the insert 320 and collar 410 interact to drive the insert further into or out of the tubiform of the collar 410.

Figure 49A:
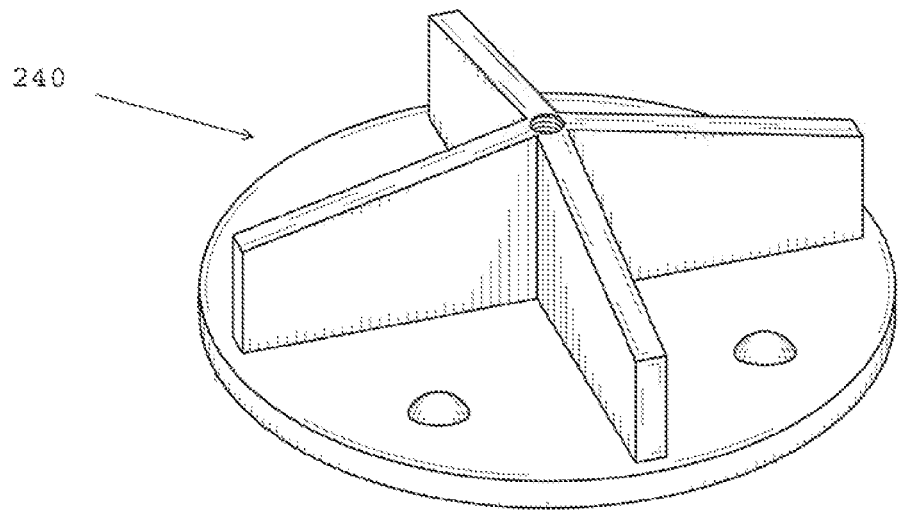
FIG. 49A through 49C are views of a top surface of a spacer 340.
Figure 50:
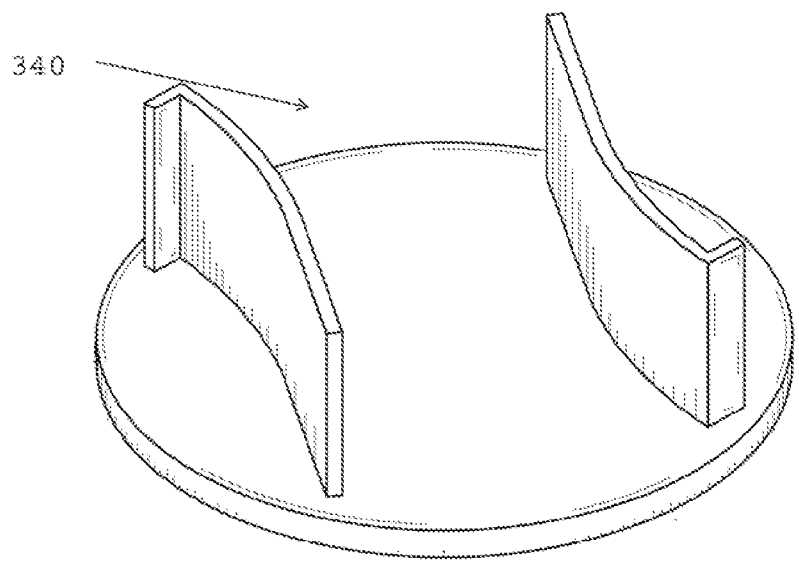
FIG. 50 is a view of a top surface of a spacer 340.
Figure 49B:
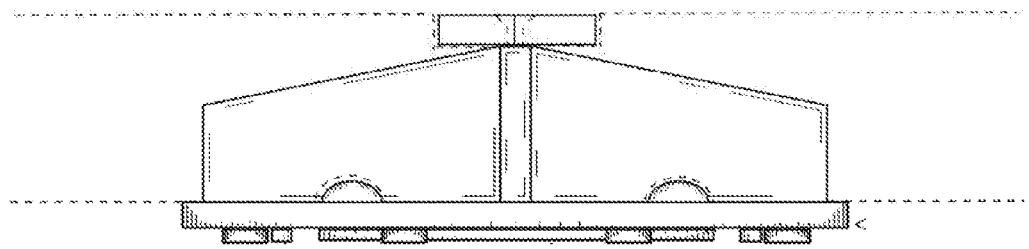
Figure 49C:
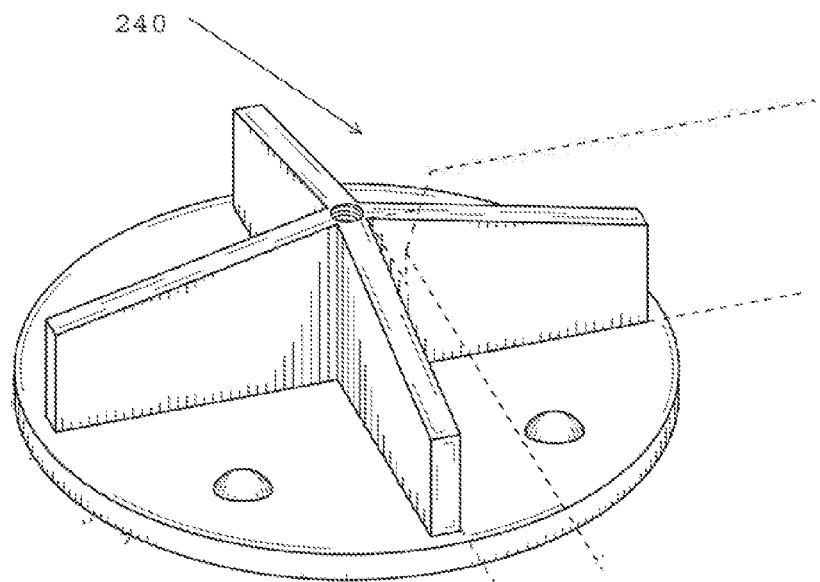

As set forth above, the pavers supported by disclosed assemblies 100-400 may suitably support pavers of various sizes and shapes. In order to account for such paver variation, multiple embodiments of the top surface of the attachment 140 may be provided. FIG. 49A through 49C are views of a top surface of a spacer 240, wherein tiles are locked in place via a vise plate. FIG. 50 is a view of a top surface of a spacer

Figure 51A:
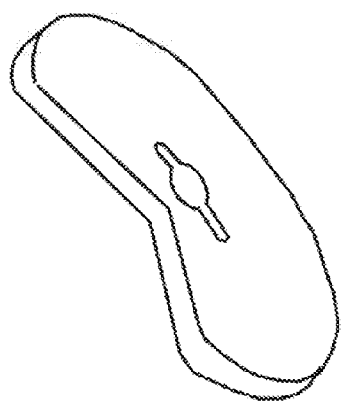
FIGS. 51A and 51B are respectively a view of an anchoring washer for securing wooden tiles and an environmental view of the same.
Figure 51B:
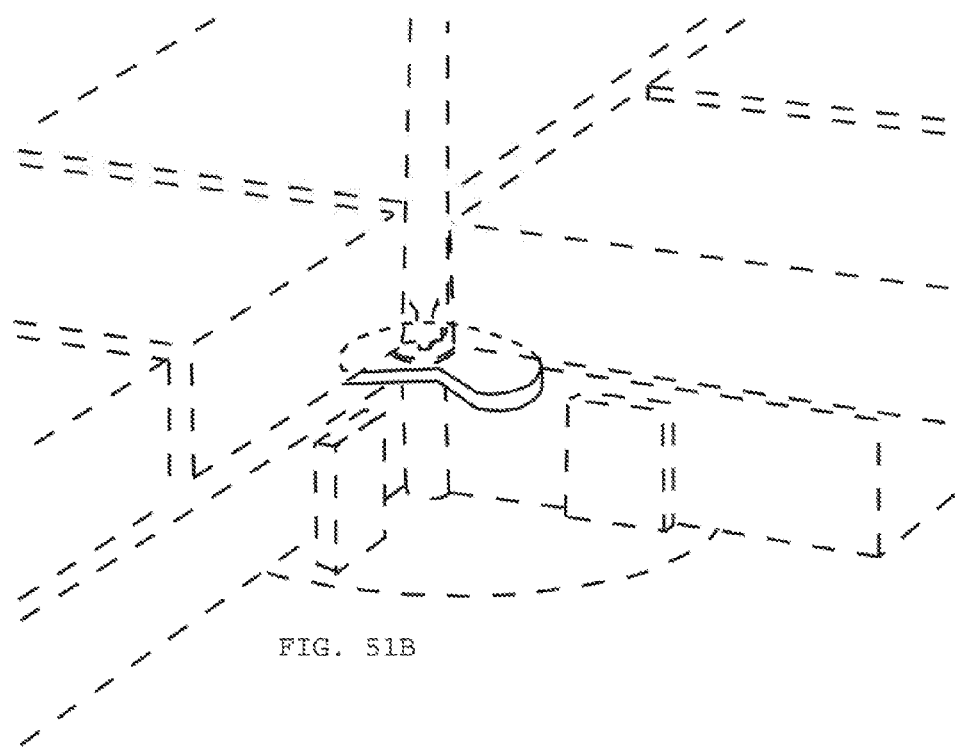
Figure 52A:
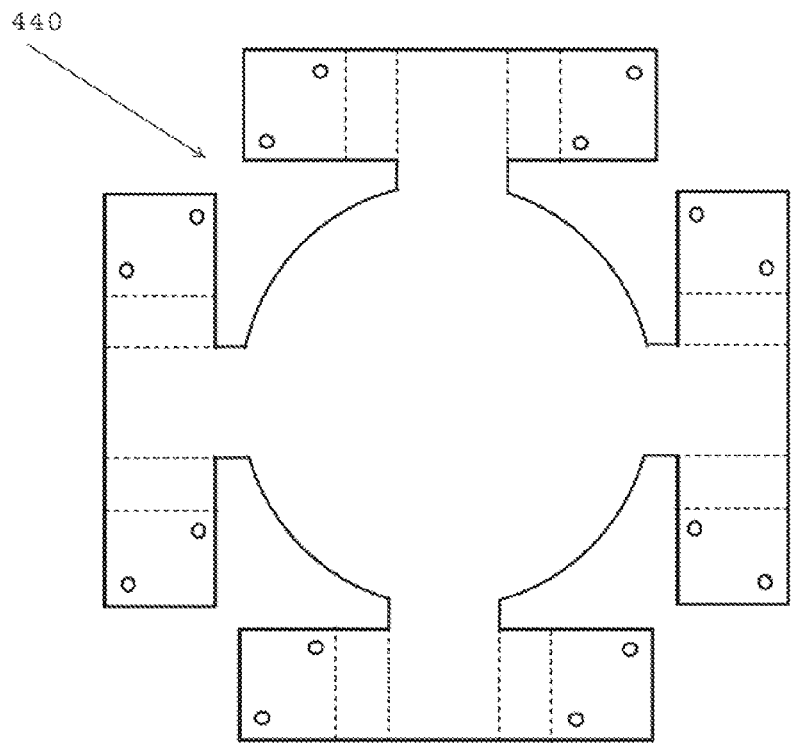
FIGS. 52A and 52B are respectively views of a top surface of a spacer 440 and environmental views of the same.
Figure 52B:
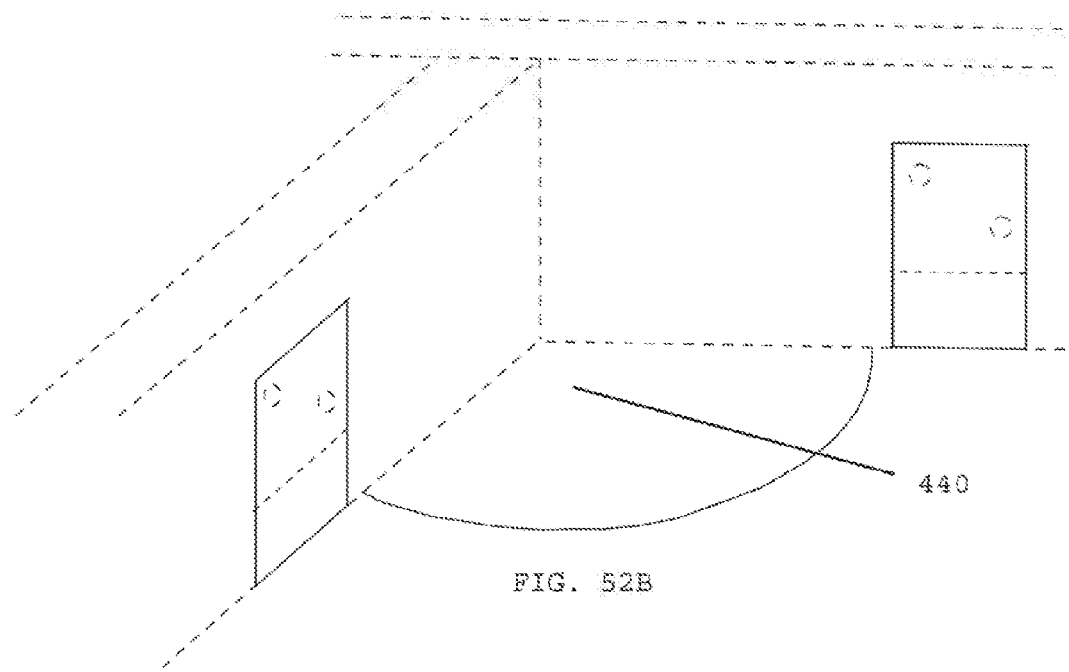
Figure 53A:
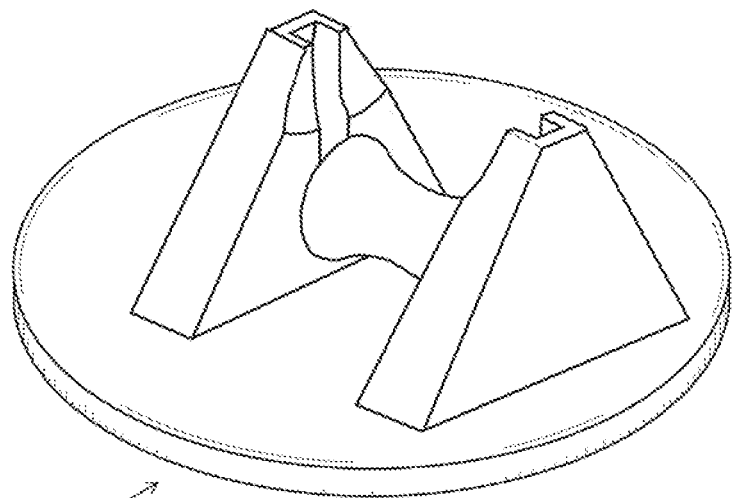
FIGS. 53A and 53B are respectively views of a top surface of a pipe riser spacer 540.
Figure 53B:
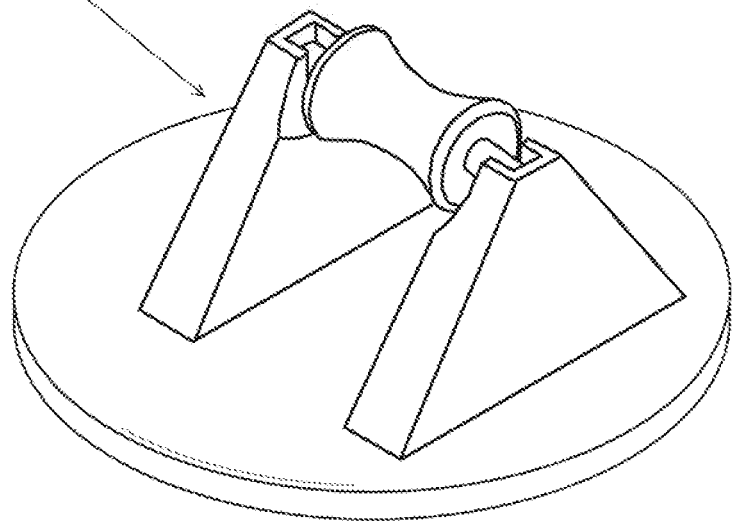
Figure 54:
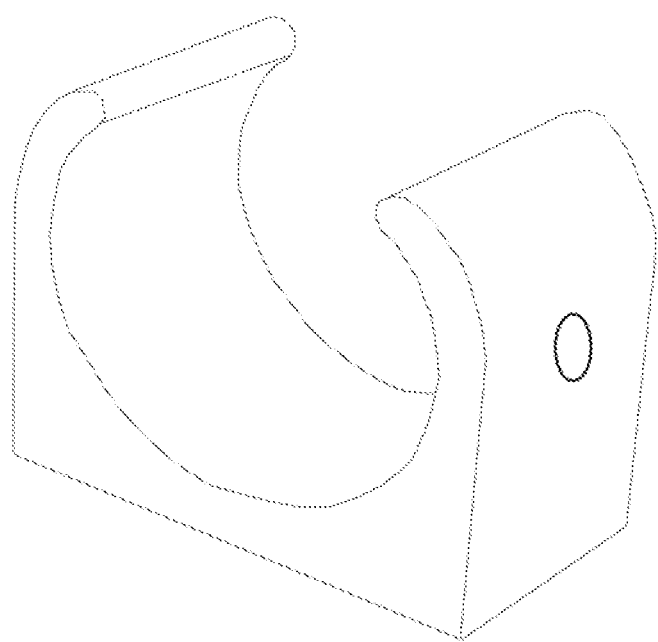
FIG. 54 is a top perspective view of a receptacle for an arm.
Figure 55D:
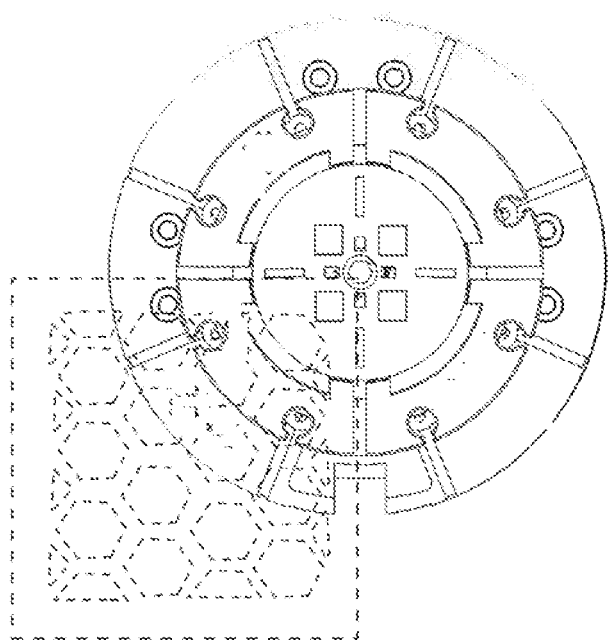
Figure 55C:
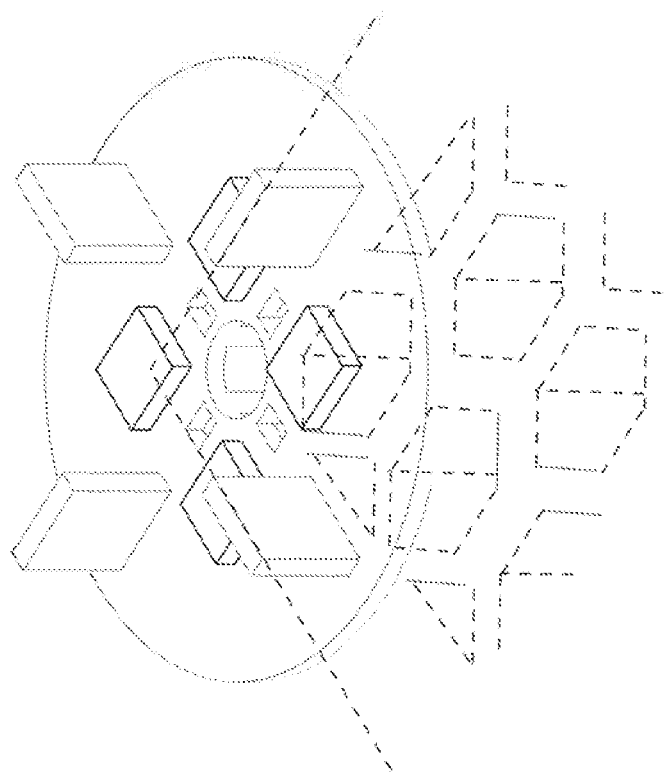

340, wherein a support beam is disposed between two curved walls. FIGS. 51A and 51B are respectively a view of an anchoring washer for securing wooden tiles and an environmental view of the same. FIGS. 52A and 52B are respectively views of a top surface of a spacer 440 and environmental views of the same. FIGS. 53A and 53B are respectively views of a top surface of an adjustable pipe riser spacer 540.

In one embodiment, a plurality of assemblies 300, 400 may be used to support a paver surface. Frequently, the plurality of assemblies 300, 400 must be fixedly positioned at specific locations relative to one another for supporting the paver surface. To facilitate such positioning, an arm may be provided that connects to two pavers whereby their relative positions are so fixed. Such an arm may be a pipe section provided between two pipe receptacles on the foot of a base 310 of an assembly. One embodiment, a pipe receptacle 500 is provided in FIG. 54. Generally referring to the figures, a pipe may be provided between two pipe receptacles to establish an arm. The arm may suitably be fixedly retained within the pipe receptacles via providing a screw through the side of the pipe receptacle and into a retained pipe.

FIGS. 55A through 55D illustrate the system disclosed by U.S. Pat. No. 8,128,312 (generally disclosed at http://silcasystem.com/ or http://www.pierdex.com/) might be incorporated into the above described system.

The components of the assemblies 100-400, being or composing a paver load bearing apparatus, should preferably be fashioned out of materials that are capable of supporting the weight of a paver. As the weight of a paver may vary from extraordinarily heavy to very light, the materials which may be acceptable for fabricating the components will typically vary according to the applicable paver to be supported thereon the assemblies 100-400. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies 100-400 being or composing a paver load bearing apparatus should preferably be dimensioned to a size that renders the assemblies 100-400 capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure An apparatus comprised of an above disclosed component may be used to compensate for variations in the slope of the undersurface with regard to the leveling of a paver surface. It should be noted that FIGS. 27A through 55D and the associated description are of illustrative importance only. In other words, the depiction and descriptions of the present invention should not be construed as limiting of the subject matter in this application. Additional modifications may become apparent to one skilled in the art after reading this disclosure.

I claim:

1. A paver array supporting component, said component comprising:
   a. a femininely threaded support cylinder;
   b. a riser socket around the support cylinder;
   c. foot; and
   d. an outer cylindrical wall projecting perpendicularly upwardly from the foot, the outer cylindrical wall concentrically arranged about and spaced from the femininely threaded support cylinder to define the riser socket.

2. The component of claim 1 wherein a first end of a riser is removably installed in the riser socket and around the femininely threaded support cylinder.

3. The component of claim 2 wherein a second component is removably mounted on a second end of the riser.

4. The component of claim 2 wherein the riser is a pipe.

5. The component of claim 4 wherein the pipe is a PVC pipe.

6. The component of claim 1 further comprising a male threaded insert removably positioned within the femininely threaded support cylinder.

7. The component of claim 6 wherein the male threaded insert mechanically supports a paver.

8. A paver array supporting apparatus for facilitating an elevated and leveled placement of a paver array onto a subsurface, comprising a component, said component comprising:
   a. a femininely threaded support cylinder; and
   b. an outer cylindrical wall concentrically arranged about and spaced from the femininely threaded support cylinder to define a riser socket around the femininely threaded support cylinder.

9. The apparatus of claim 8 further comprising a slope compensation pad supporting said component.

10. The apparatus of claim 9 wherein the compensation pad comprises a first compensation disk having a top surface defining a top surface plane; and a bottom surface defining a bottom surface plane, wherein the top surface plane is angled relative to the bottom surface plane.

11. The apparatus of claim 10 wherein the compensation pad comprises a second compensation disk having a top surface defining a top surface plane, and a bottom surface defining a bottom surface plane, wherein the top surface plane of the second compensation disk is angled relative the bottom surface of the second compensation disk.

12. The apparatus of claim 11 wherein the first compensation disk is stackable on top of the second compensation disk in various configurations, wherein in a first configuration, the top surface plane of the first compensation disk is parallel to the bottom surface plane of the second compensation disk, and in a second configuration, the top surface plane of the first compensation disk is angled relative to the bottom surface plane of the second compensation disk.

13. The apparatus of claim 12 further comprising a male threaded insert removably fastenable within the femininely threaded support cylinder.

14. The apparatus of claim 13 wherein the male threaded insert mechanically supports a paver.

15. The apparatus of claim 14 further comprising a riser having a first end receivable into the riser socket when the male threaded insert is removed from the femininely threaded support cylinder, wherein the male threaded insert is mountable on the riser at a second end opposite the first end.

16. The apparatus of claim 8 further comprising a male threaded insert removably fastenable within the femininely threaded support cylinder.

17. The apparatus of claim 16 wherein the male threaded insert mechanically supports a paver.

18. The apparatus of claim 17 further comprising a riser having a first end receivable into the riser socket when the male threaded insert is removed from the femininely threaded support cylinder, wherein the male threaded insert is mountable on the riser at a second end opposite the first end.

19. The apparatus of claim 18 further comprising a slope compensation pad supporting said component.

20. The apparatus of claim 19 wherein the compensation pad comprises a first compensation disk having a top surface defining a top surface plane; and a bottom surface defining a bottom surface plane, wherein the top surface plane is angled relative to the bottom surface plane.

21. The apparatus of claim 20 wherein the compensation pad comprises a second compensation disk having a top surface defining a top surface plane, and a bottom surface defining a bottom surface plane, wherein the top surface plane of the second compensation disk is angled relative the bottom surface of the second compensation disk.

22. The apparatus of claim 21 wherein the first compensation disk is stackable on top of the second compensation disk in various configurations, wherein in a first configuration, the top surface plane of the first compensation disk is parallel to the bottom surface plane of the second compensation disk, and in a second configuration, the top surface plane of the first compensation disk is angled relative to the bottom surface plane of the second compensation disk.

\* \* \* \* \*